US012003907B2

(12) United States Patent
Hanna et al.

(10) Patent No.: US 12,003,907 B2
(45) Date of Patent: Jun. 4, 2024

(54) SHOWER ASSEMBLY

(71) Applicant: Kohler Co., Kohler, WI (US)

(72) Inventors: Kenneth Scott Hanna, Bellingham, WA (US); Michael James Soetaert, Sheboygan, WI (US); Keith Scott Ruh, Elkhart Lake, WI (US); William Clement Kuru, Plymouth, WI (US)

(73) Assignee: Kohler Co., Kohler, WI (US)

( * ) Notice: Subject to any disclaimer, the term of this patent is extended or adjusted under 35 U.S.C. 154(b) by 174 days.

(21) Appl. No.: 17/157,192

(22) Filed: Jan. 25, 2021

(65) Prior Publication Data

US 2021/0219036 A1 Jul. 15, 2021

Related U.S. Application Data

(63) Continuation of application No. 14/470,761, filed on Aug. 27, 2014, now Pat. No. 10,945,059, which is a continuation-in-part of application No. 13/605,587, filed on Sep. 6, 2012, now abandoned.

(60) Provisional application No. 61/871,054, filed on Aug. 28, 2013, provisional application No. 61/637,009, filed on Apr. 23, 2012, provisional application No. 61/631,912, filed on Jan. 13, 2012, provisional application No. 61/573,448, filed on Sep. 6, 2011.

(51) Int. Cl.
*B05B 1/18* (2006.01)
*H04R 1/02* (2006.01)

(52) U.S. Cl.
CPC ............... *H04R 1/026* (2013.01); *B05B 1/18* (2013.01); *B05B 1/185* (2013.01); *H04R 2201/021* (2013.01)

(58) Field of Classification Search
CPC .... H04R 1/026; H04R 2201/021; B05B 1/18; B05B 1/185
See application file for complete search history.

(56) References Cited

U.S. PATENT DOCUMENTS 1,947,407 A 2/1934 Cornell, Jr.
2,281,499 A 4/1942 Herzbrun et al.
(Continued)

FOREIGN PATENT DOCUMENTS

CN 1500312 5/2004
CN 3618397 3/2007
(Continued)

OTHER PUBLICATIONS

Chinese Patent Office Action for Application No. 201280009728.X dated Jul. 8, 2021 (26 pages, Statement of Relevance included).
(Continued)

*Primary Examiner* — Qingzhang Zhou
(74) *Attorney, Agent, or Firm* — Michael Best & Friedrich LLP

(57) ABSTRACT

A shower assembly. The assembly may include a shower device including a device housing defining an inlet communicating with an inlet chamber, an outlet and a waterway communicating between the inlet chamber and the outlet, the device housing further defining a receptacle having a closed end and an open end, the inlet chamber being behind the closed end, the waterway extending along the receptacle from the closed end toward the open end; and a second device supportable in the receptacle. The outlet may define an outlet plane, and the second device may include a housing providing an outlet, the outlet being one of aligned with and positioned forwardly of the outlet plane when the speaker is supported in the receptacle. The assembly may further include a magnetic connecting structure operable to releasably connect the second device and the shower device.

24 Claims, 49 Drawing Sheets

(56) References Cited

U.S. PATENT DOCUMENTS 3,710,224 A 1/1973 Daniels
4,121,741 A 10/1978 Adamson
4,468,321 A 8/1984 St. John
4,478,367 A 10/1984 Petursson
4,964,181 A 10/1990 Alpret
D326,854 S 6/1992 Terk et al.
5,140,254 A 8/1992 Katzman
D329,233 S 9/1992 Miura
5,228,625 A 7/1993 Grassberger
5,329,650 A 7/1994 Zaccai et al.
5,647,007 A 7/1997 Wooderson et al.
5,664,015 A 9/1997 Ford et al.
5,868,439 A 2/1999 Schmidt
6,021,960 A * 2/2000 Kehat .................... B05B 15/00 239/18
6,061,457 A 5/2000 Stockhamer
6,135,408 A 10/2000 Richter
6,182,910 B1 2/2001 Huen
D440,277 S 4/2001 Slothower
D440,278 S 4/2001 Slothower
6,446,278 B1 * 9/2002 Lin .......................... E03C 1/06 4/615
6,473,979 B2 11/2002 Lu
6,509,716 B2 1/2003 Yi
D495,776 S 9/2004 Blomstrom
6,823,536 B2 11/2004 Yip
D500,839 S 1/2005 Blomstrom
6,879,818 B2 4/2005 Wageneck
6,892,952 B2 5/2005 Chang et al.
D507,820 S 7/2005 Blomstrom
D511,810 S 11/2005 Hanna
D524,412 S 7/2006 Blomstrom
D526,308 S 8/2006 Kasden
D530,308 S 10/2006 Topping
7,178,746 B2 * 2/2007 Gross ..................... B05B 15/00 239/18
7,242,165 B2 7/2007 Lee et al.
7,269,862 B2 9/2007 Rooke et al.
D559,357 S 1/2008 Wang
D560,273 S 1/2008 Hanna
7,412,206 B1 8/2008 Hutchings et al.
7,611,073 B2 11/2009 Crutcher
7,711,316 B2 5/2010 Bae
D618,303 S 6/2010 Zhang
D619,202 S 7/2010 Zhang
D619,218 S 7/2010 Lee
7,753,079 B2 7/2010 Nelson
7,761,937 B2 7/2010 Foutz et al.
D633,078 S 2/2011 Lewis
D634,810 S 3/2011 Yoo et al.
7,906,936 B2 3/2011 Azancot et al.
7,909,061 B2 3/2011 Nelson
D652,106 S 1/2012 Yoo
D678,468 S 3/2013 Hanna
8,627,850 B1 1/2014 Booker
8,702,018 B1 4/2014 Rivera
D707,329 S 6/2014 Hanna et al.
D707,794 S 6/2014 Hanna
8,855,354 B2 10/2014 He
9,088,640 B2 7/2015 Staebler
9,095,862 B2 8/2015 Hanna et al.
9,143,861 B2 9/2015 Schul
D745,948 S 12/2015 Hanna
D762,815 S 8/2016 Hanna et al.
D762,816 S 8/2016 Hanna et al.
9,735,587 B2 8/2017 Niizuma
D804,611 S 12/2017 Hanna
10,296,040 B2 5/2019 Park et al.
10,298,037 B2 5/2019 Wang et al.
2003/0041372 A1 3/2003 Yang
2003/0125842 A1 7/2003 Chang et al.
2003/0211838 A1 * 11/2003 Wageneck ............ H04R 5/023 455/344
2003/0232530 A1 12/2003 Vista, Jr. et al.
2004/0078891 A1 * 4/2004 Yip ....................... H04R 5/023 4/615
2004/0255377 A1 12/2004 Mueller et al.
2006/0283511 A1 12/2006 Nelson
2007/0022528 A1 2/2007 Gilbert
2009/0007330 A1 1/2009 Genord et al.
2009/0031492 A1 2/2009 Foutz et al.
2009/0041267 A1 2/2009 Lee et al.
2009/0052721 A1 2/2009 Dabrowski
2009/0156249 A1 6/2009 Ruckart
2009/0245567 A1 10/2009 Egyud et al.
2009/0323761 A1 12/2009 Tsai
2010/0043135 A1 2/2010 Patterson et al.
2010/0102182 A1 4/2010 Lin
2010/0170588 A1 7/2010 Nelson
2010/0213278 A1 8/2010 Zan
2010/0237166 A1 9/2010 Nelson
2011/0031331 A1 2/2011 Klicpera
2011/0067815 A1 3/2011 Iizuka et al.
2011/0162743 A1 7/2011 Nelson
2011/0210188 A1 9/2011 Yao et al.
2012/0042973 A1 2/2012 Ko
2013/0062437 A1 3/2013 Hanna
2013/0279724 A1 10/2013 Stafford et al.
2014/0183279 A1 7/2014 Hanna et al.
2014/0241555 A1 8/2014 Terlizzi
2014/0314265 A1 10/2014 Freund
2017/0215004 A1 7/2017 Wengreen

FOREIGN PATENT DOCUMENTS

CN 3637897 4/2007
CN 300718588 12/2007
CN 300755086 3/2008
CN 300822364 8/2008
CN 300991690 8/2009
CN 300997525 9/2009
CN 301006088 9/2009
CN 301063028 11/2009
CN 301067033 11/2009
CN 301130555 2/2010
CN 101689047 3/2010
CN 201470506 5/2010
CN 301238499 5/2010
CN 301264979 6/2010
CN 301410164 12/2010
CN 301605047 7/2011
CN 301626438 7/2011
CN 301914213 5/2012
CN 102572054 7/2012
CN 102792665 11/2012
CN 202516713 11/2012
CN 103152465 6/2013
CN 203635370 6/2014
DE 4242034 3/1994
EP 1958700 8/2008
EP 2218512 8/2010
JP 200818922 5/2009
KR 3020080026963 2/2009
WO WO2007051367 5/2007
WO WODM/070414 8/2008
WO WOCM/070423 1/2009
WO WO2009051347 4/2009
WO WO2009080079 7/2009
WO WO2012010072 1/2012

OTHER PUBLICATIONS

Chinese Patent Office Action for Application No. 202110362019.0 dated Apr. 12, 2022 (22 pages including English translation).

International Search Report and Written Opinion for Application No. PCT/US2012/053953 dated Jan. 25, 2013 (10 pages).

Notice of Allowance from the United States Patent and Trademark Office for U.S. Appl. No. 29/418,868 dated Oct. 23, 2012 (6 pages).

Smartak Audio Wireless Waterproof Shower Speaker with Dock Transmitter known at least sa early as Jul. 12, 2011.

Sangean Digital Shower Radio known at least as early as Jul. 12, 2011.

(56) References Cited

OTHER PUBLICATIONS

Sony AM/FM/Weather Shower DC Clock Radio known at least as early as Jul. 12, 2011.
Notification of First Office Action from The State Intellectual Property Office of the People's Republic of China for Application No. 201430121787.8 dated Jul. 1, 2014 (3 pages).
Evaluation Report of Design Patent from the State Intellectual Property Office of the People's Republic of China for Application No. ZL201330110255.X dated Jan. 2, 2014 (22 pages).
Evaluation Report of Design Patent from the State Intellectual Property Office of the People's Republic of China for Application No. ZL201330110628.3 dated Jan. 2, 2014 (20 pages).
Evaluation Report of Design Patent from the State Intellectual Property Office of the People's Republic of China for Application No. ZL201230426055.0 dated Dec. 27, 2013 (24 pages).
Search Report and Written Opinion from the Intellectual Property Office of the United Kingdom for Application No. 14152136 dated Mar. 2, 2015 (3 pages).
Extended European Search Report for Application No. 12830807.9 dated May 4, 2015 (5 pages).
Office Action from The State Intellectual Property Office of the People's Republic of China for Application No. 201280009728.X dated Jul. 13, 2015 (13 pages).
Notice of Allowance from the United States Patent and Trademark Office for U.S. Appl. No. 14/200,540 dated Jun. 5, 2015 (15 pages).
Extended European Search Report from the European Patent Office for Application No. 15152751.2 dated Jun. 30, 2015 (8 pages).
Office Action from the United States Patent and Trademark Office for U.S. Appl. No. 29/514,526 dated Dec. 9, 2015 (7 pages).
Office Action from the United States Patent and Trademark Office for U.S. Appl. No. 29/514,525 dated Dec. 7, 2015 (7 pages).
Search Report from the United Kingdom Intellectual Property Office for Application No. GB1415213.6 dated May 6, 2016 (3 pages).
Final Office Action from the United States Patent and Trademark Office for U.S. Appl. No. 13/605,587 dated Aug. 5, 2016 (12 pages).
Extended European Search Report from the European Patent Office for Application No. 16173829.9 dated Sep. 16, 2016 (6 pages).
Third Office Action with English translation from the State Intellectual Property Office of the People's Republic of China for Application No. 201280009728.X dated Sep. 23, 2016 (17 pages).
Search Report and Written Opinion from the National Industrial Property Institute of the French Republic for Application No. FR1458084 dated Jun. 29, 2016 (6 pages).
Search Report and Written Opinion from the National Industrial Property Institute of the French Republic for Application No. FR1552505 dated Jun. 29, 2016 (6 pages).
Office Action from the United States Patent and Trademark Office for U.S. Appl. No. 14/606,831 dated Jan. 5, 2017 (11 pages).
Office Action from the United States Patent and Trademark Office for U.S. Appl. No. 14/470,761 dated Oct. 25, 2016 (10 pages).
First Office Action from the State Intellectual Property Office of the People's Republic of China for Application No. 201510041205.9 dated Mar. 27, 2017 (9 pages).
Office Action from the United States Patent Office for U.S. Appl. No. 29/548,511 dated Apr. 12, 2017 (6 pages).
Final Office Action from the United States Patent and Trademark Office for U.S. Appl. No. 14/606,831 dated Aug. 9, 2017 (12 pages).
Office Action from the United States Patent and Trademark Office for U.S. Appl. No. 14/470,761 dated Oct. 18, 2017 (13 pages).
Office Action from the United States Patent and Trademark Office for U.S. Appl. No. 15/345,210 dated Oct. 18, 2017 (9 pages).
Office Action from the United States Patent and Trademark Office for U.S. Appl. No. 15/345,210 dated Apr. 25, 2018 (13 pages).
Chinese Patent Office Action for Application No. 201510041205.9 dated Jun. 5, 2018 (9 pages, English translation included).
Chinese Patent Office Action for Application No. 201280009728.X dated Apr. 28, 2018 (13 pages, statement of relevance included).
Chinese Patent Office Notice of Reexamination for Application No. 201280009728.X dated Jan. 13, 2021 (12 pages, statement of relevance included).
European Patent Office Action for Application No. 16173829.9 dated Feb. 26, 2020 (9 pages).
United States Patent Office Action for U.S. Appl. No. 16/237,254 dated Apr. 3, 2020 (9 pages).
United States Patent Office Action for U.S. Appl. No. 14/470,761 dated Jun. 1, 2020 (15 pages).
United States Patent Office Notice of Allowance for U.S. Appl. No. 15/345,210 dated Jun. 12, 2020 (10 pages).
United States Patent Office Action for U.S. Appl. No. 16/237,254 dated Oct. 15, 2020 (10 pages).
United States Patent Office Notice of Allowance for U.S. Appl. No. 14/470,761 dated Nov. 2, 2020 (8 pages).
Chinese Patent Office Action for Application No. 202110362019.0 dated Sep. 7, 2022 (9 pages, including an English translation).

* cited by examiner

SHOWER ASSEMBLY

CROSS REFERENCE TO RELATED APPLICATION

The present application is a Continuation Application of U.S. patent application Ser. No. 14/470,761, filed Aug. 27, 2014, which claims priority to U.S. Provisional Application No. 61/871,054, filed Aug. 28, 2013, and claims priority to and is a Continuation-In-Part (CIP) of U.S. patent application Ser. No. 13/605,587, filed Sep. 6, 2012 (abandoned), which claims priority to U.S. Provisional Application No. 61/573,448, filed Sep. 6, 2011, and to U.S. Provisional Application No. 61/631,912, filed Jan. 13, 2012, and to U.S. Provisional Application No. 61/637,009, filed Apr. 23, 2012, the entire contents of all of which are hereby incorporated by reference.

FIELD

The present invention generally relates to shower devices and, more particularly, to an assembly of a shower device and a second device, such as a speaker, a light source, etc.

SUMMARY

In one independent embodiment, a shower assembly may include a shower device with a waterway assembly defining an inlet chamber communicating with an inlet, an outlet chamber and a waterway communicating between the inlet chamber and the outlet chamber, the waterway assembly defining a receptacle having a closed end and an open end, the inlet chamber being behind the closed end, the waterway extending along the receptacle from the closed end toward the open end, the waterway assembly including an outlet member defining a plurality of outlets communicating with the outlet chamber, the outlets being positioned circumferentially about the receptacle; and a second device supported in the receptacle. The second device may include one of an entertainment device, a light source, a time keeping device, a dispenser.

In another independent embodiment, a shower assembly may include a shower device; a second device removably supportable on and completely separable from the shower device; and a magnetic connecting structure operable to releasably connect the shower device and the second device. The connecting structure may include a magnet supported by one of the shower device and the second device, the magnet interacting with the other of the shower device and the second device to releasably connect the shower device and the second device. The connecting structure may include a second magnet supported on the other of the shower device and the second device.

In yet another independent embodiment, a speaker assembly may include a speaker with a housing, speaker components operable to output audio, and a power source operable to power the speaker components; and a support; and a magnetic connecting structure operable to releasably connect the speaker and the support. The support may include a shower component, a non-shower component, and a support external to a shower.

In a further independent embodiment, a shower assembly may include a speaker with a housing, speaker components operable to output audio, and a power source operable to power the speaker components; and a shower device with a waterway assembly defining an inlet chamber communicating with an inlet, an outlet chamber and a waterway communicating between the inlet chamber and the outlet chamber, the inlet chamber being behind the speaker, the waterway extending along the speaker, the waterway assembly including an outlet member defining a plurality of outlets communicating with the outlet chamber, the outlets being positioned circumferentially about the speaker. The speaker may be one of removably supported by the shower device and non-removably supported by the shower device.

In another independent embodiment, a shower assembly may include a shower device with a waterway assembly defining an outlet and a waterway communicating between the outlet and an inlet, the outlet including a plurality of outlet openings and defining an outlet plane; and a second device supported by the shower device, the second device including a second device housing having a periphery and providing a second device outlet, the second device outlet being positioned forwardly of the outlet plane. The outlet openings may be positioned about the periphery of the second device housing and oriented to direct water flow outside of the periphery of the second device.

In yet another independent embodiment, a shower assembly may include a housing having a plurality of housing threads; a first waterway assembly including an inner waterway member and an outer waterway member, the waterway members cooperating to define an inlet chamber communicating with a shower inlet, an annular outlet chamber and a waterway communicating between the inlet chamber and the outlet chamber, the first waterway assembly defining a first receptacle having a closed end and an open end, the inlet chamber being behind the closed end, the waterway extending around and along the first receptacle from the closed end toward the open end, the inner waterway member defining a plurality of outlet openings communicating with the outlet chamber, the outlet openings being positioned circumferentially about the first receptacle, the first waterway assembly having a plurality of first waterway threads; and a second waterway assembly including an inner waterway member and an outer waterway member, the waterway members cooperating to define an inlet chamber communicating with a shower inlet, an annular outlet chamber and a waterway communicating between the inlet chamber and the outlet chamber, the second waterway assembly defining a second receptacle having a closed end and an open end, the inlet chamber being behind the closed end, the waterway extending around and along the second receptacle from the closed end toward the open end, the inner waterway member defining a plurality of outlet openings communicating with the outlet chamber, the outlet openings being positioned circumferentially about the second receptacle, the second waterway assembly having a plurality of second waterway threads, the second waterway assembly having a configuration different that the first waterway assembly. The housing may be selectively and alternatively threadedly connectable to each of the first waterway assembly and the second waterway assembly.

In a further independent embodiment, a shower assembly may include a first housing having a first configuration and a plurality of first housing threads; a second housing having a second configuration and a plurality of second housing threads, the second configuration being different than the first configuration; and a waterway assembly including an inner waterway member and an outer waterway member, the waterway members cooperating to define an inlet chamber communicating with a shower inlet, an annular outlet chamber and a waterway communicating between the inlet chamber and the outlet chamber, the waterway assembly defining a receptacle having a closed end and an open end, the inlet chamber being behind the closed end, the waterway extending around and along the receptacle from the closed end toward the open end, the inner waterway member defining a plurality of outlet openings communicating with the outlet chamber, the outlet openings being positioned circumferentially about the receptacle, the waterway assembly having a plurality of waterway threads. The first housing and the second housing may each be selectively and alternatively threadedly connectable to the waterway assembly.

DETAILED DESCRIPTION

Figure 1A:
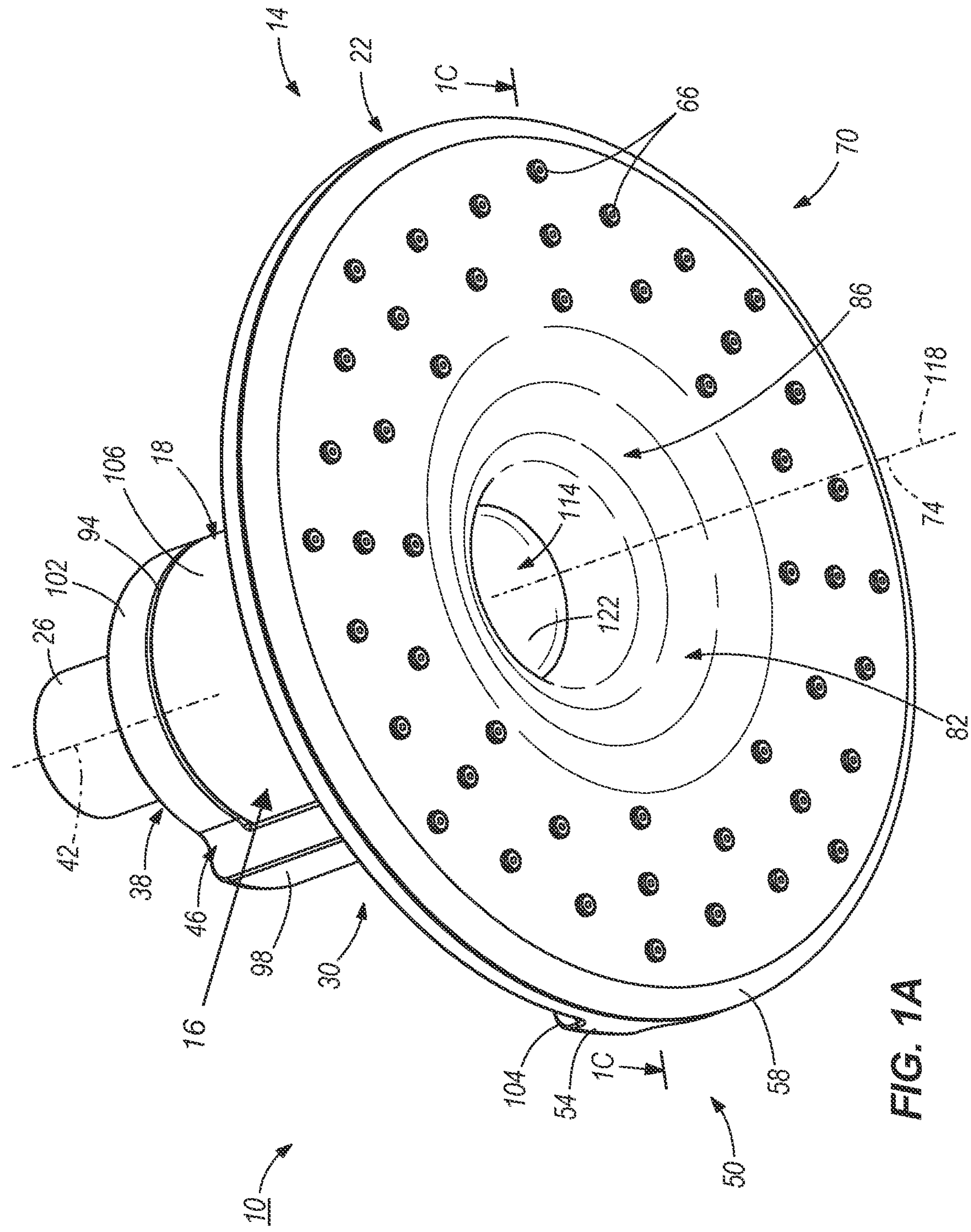
FIGS. 1A-1D are views of a shower assembly.
Figure 1B:
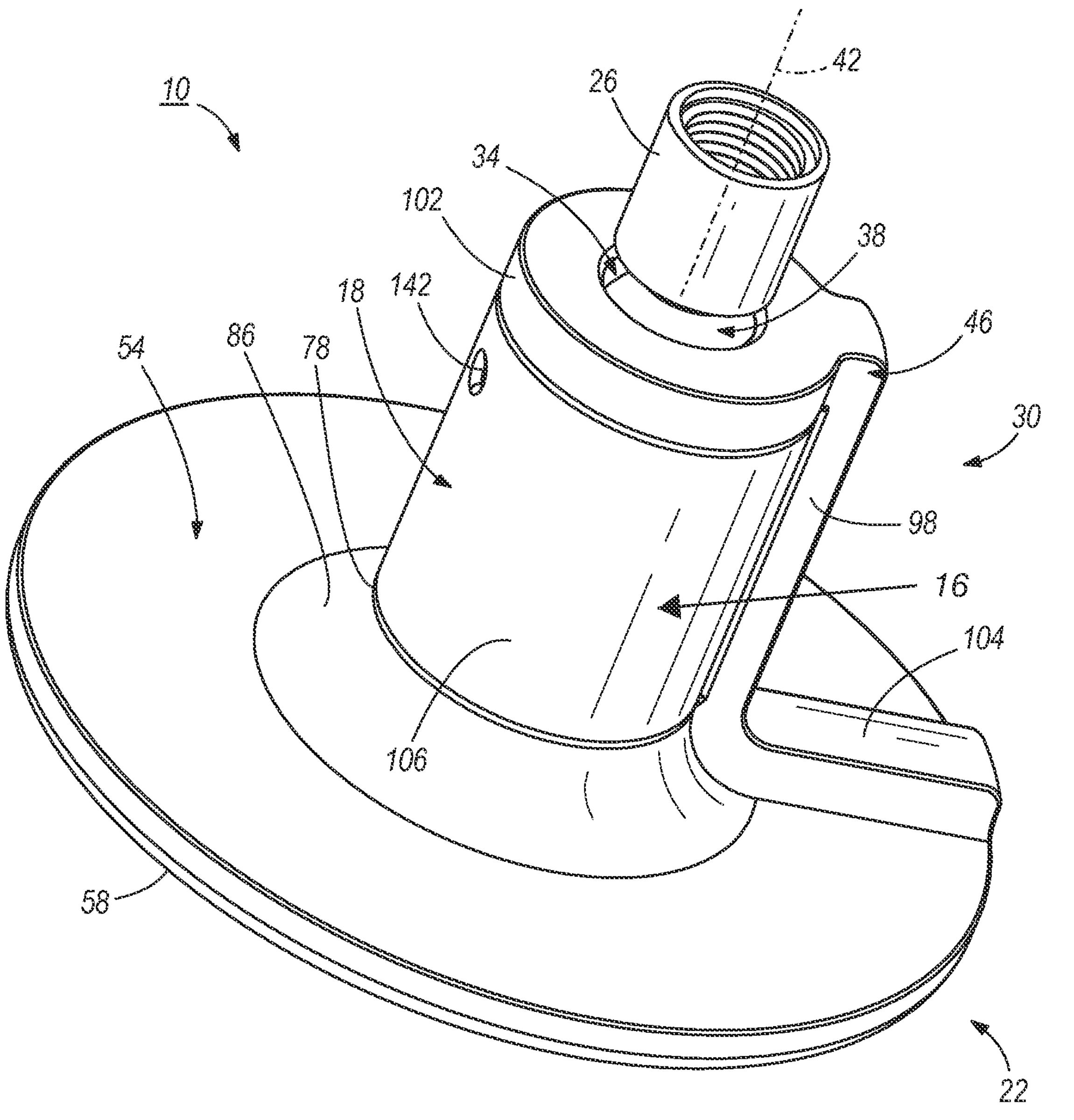

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

A shower assembly 10 is shown in FIGS. 1A-1D. The assembly 10 generally includes a shower device 14 and a second device 16, such as an entertainment device (e.g., a speaker 18, a display, a bubble blower, etc.), a light source, a time keeping device (e.g., a clock, a timer), a dispenser (e.g., of shampoo, soap, aroma, essential oils, softeners, purifiers, etc.) or a combination of such devices.

In the illustrated construction, the shower device 14 includes a showerhead 22. In other constructions (not shown), the assembly 10 may include another shower device having a configuration different than the showerhead 22, such as, for example, a different type of showerhead, a rain can, a hand shower, a wall-mounted water tile, etc., with the second device.

The showerhead 22 includes an inlet connector 26 for threaded connection to a water supply pipe (not shown) of a water supply (e.g., household/residential, commercial, etc.). The showerhead 22 also includes a housing 30, and a ball joint 34 is provided between the housing 30 and the inlet connector 26. The housing 30 has an inlet 38 extending along an inlet axis 42. A waterway 46 extends from the inlet 38 to a showerhead outlet assembly 50.

The outlet assembly 50 includes a back plate 54 and a face plate 58 defining an annular outlet chamber 62 communicating with the waterway 46. Nozzles or outlets 66 are provided on the face plate 58. Water flows through the outlets 66 to define a curtain or envelope 70 (partially shown in FIG. 1A) of water. The illustrated envelope 70 of water is generally conical (extending along an outlet axis 74) and surrounds an open center. The envelope 70 may have other shapes.

The plates 54, 58 define aligned central openings 78, 82, respectively, such that the outlet assembly 50 has a generally annular, doughnut shape. A flared surface 86 extends from the opening 78 to a plane 90 of the face plate 58. In the illustrated construction, the plane 90 is aligned with a front surface of the face plate 58, and the outlets 66 project forwardly of the plane 90.

The housing 30 defines a receptacle 94 for the second device 16. In the illustrated construction, the receptacle 94 is provided along the inlet and outlet axes 42, 74. To accommodate the receptacle 94, the waterway 46 includes a diverted portion 98. The housing 30 defines an inlet chamber 102 behind the receptacle 94, and the diverted portion 98 communicates between the chambers 102, 62. The front wall of the inlet chamber 102 provides a back wall of the receptacle 94. The peripheral surface around the opening 78 in the back plate 54 provides a front surface of the receptacle 94. The outer wall of the diverted portion 98 provides a lateral wall of the receptacle 94. A radial portion 104, formed with the diverted portion 98, extends radially along the back plate 54.

The second device 16 is supported by the showerhead housing 30 and includes a housing 106, in the illustrated construction, removably supportable in the receptacle 94. In other constructions, the second device 16 may not be removable from the shower device 14 (e.g., formed with the shower device 14 as a unit, formed separately and then non-removably attached to the shower device 14, etc.).

The housing 106 defines a container for components/materials associated with the second device 16 (e.g., power components 138, output components 110, material to be dispensed, etc.). With a speaker 18, the housing 106 supports speaker components 110 for producing an output (e.g., audio, sound, etc.) through an outlet 114 along an output axis 118. The speaker 18 is supported in the receptacle 94 with the output axis 118 aligned and co-axial with the outlet axis 74 to project sound through the openings 78, 82.

A sound permeable and substantially water impermeable cover or screen 122 covers the speaker outlet 114. The speaker outlet 114 is arranged in a plane 126, and, in the illustrated construction, the speaker plane 126 is recessed from the plane 90 of the face plate 58 which may also inhibit water from entering the speaker 18.

As shown in FIG. 1A, the outlets 66 surround the output of the second device 16 (the speaker outlet 114). The outlets 66 are arranged in multiple rings on the face plate 58 about the periphery of the speaker outlet 114. The resulting envelope 70 has multiple layers surrounding the output of the second device 16 (e.g., the speaker 18). The face plate 58 and other components of the showerhead 22 may be formed of a material, such as hard plastic, silicone, etc., which may enhance the sound output of the speaker 18.

The illustrated showerhead 22 is designed for use with the second device 16 to enhance the output by the second device 16 (e.g., sound output of the speaker 18) and/or the experience of the user. For example, components of the illustrated showerhead 22 may have a shape and/or construction (e.g., the flared surface 86, the output/pattern of the outlets 66, etc.), may operate (e.g., the envelope 70 resulting from the water flow) and/or may be formed of materials to obtain or promote the desired output/experience. Other design factors (e.g., the combination of the showerhead 22 and the second device 16) may also be considered.

Figure 1C:
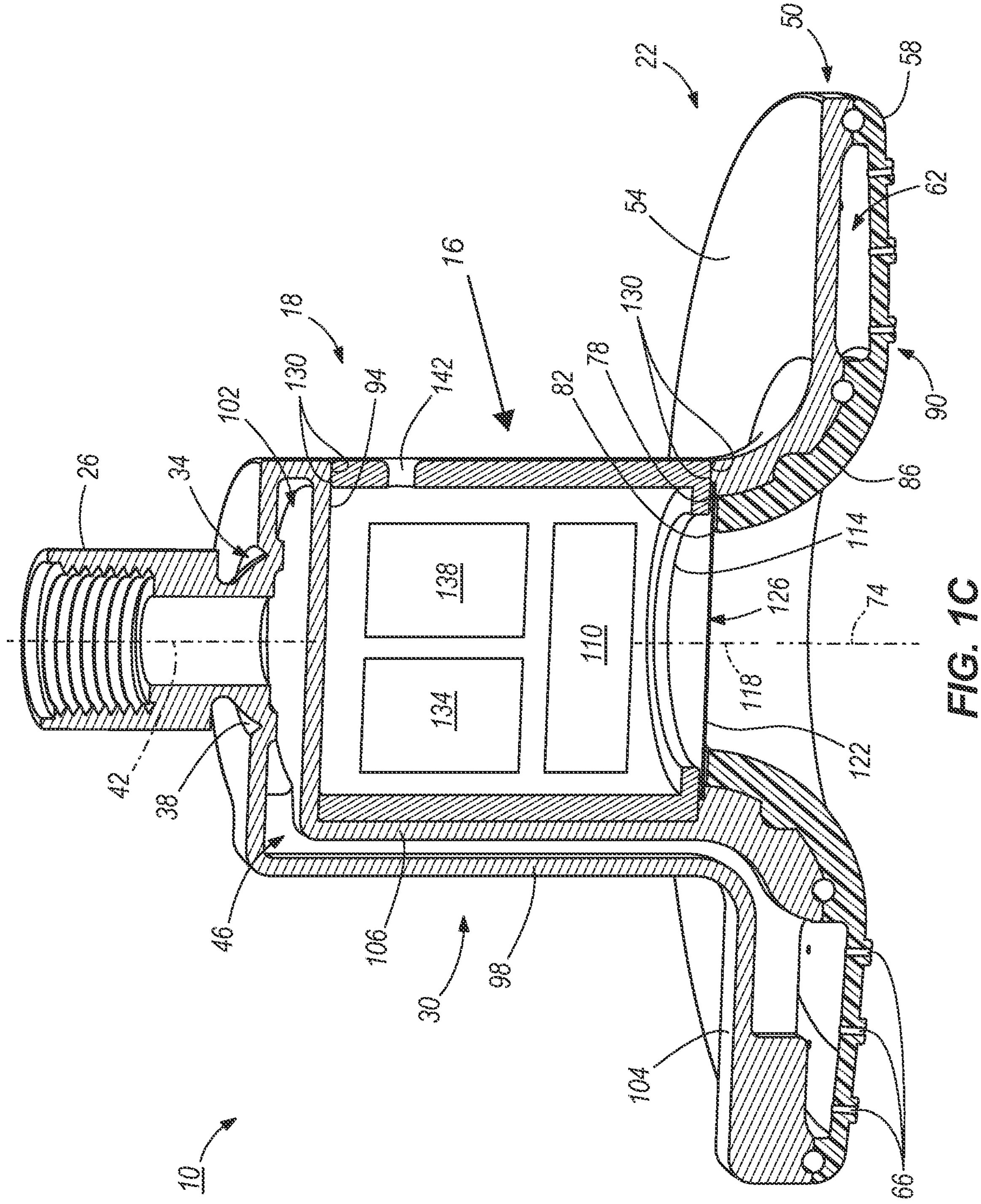

The second device 16 is positioned co-axially with the inlet 38 and the outlets 66 of the showerhead 22. As shown in FIG. 1C, in the illustrated construction, water is axially behind (in the inlet chamber 102) the second device 16. Water is diverted around the second device 16 through the diverted portion 98.

Figure 1D:
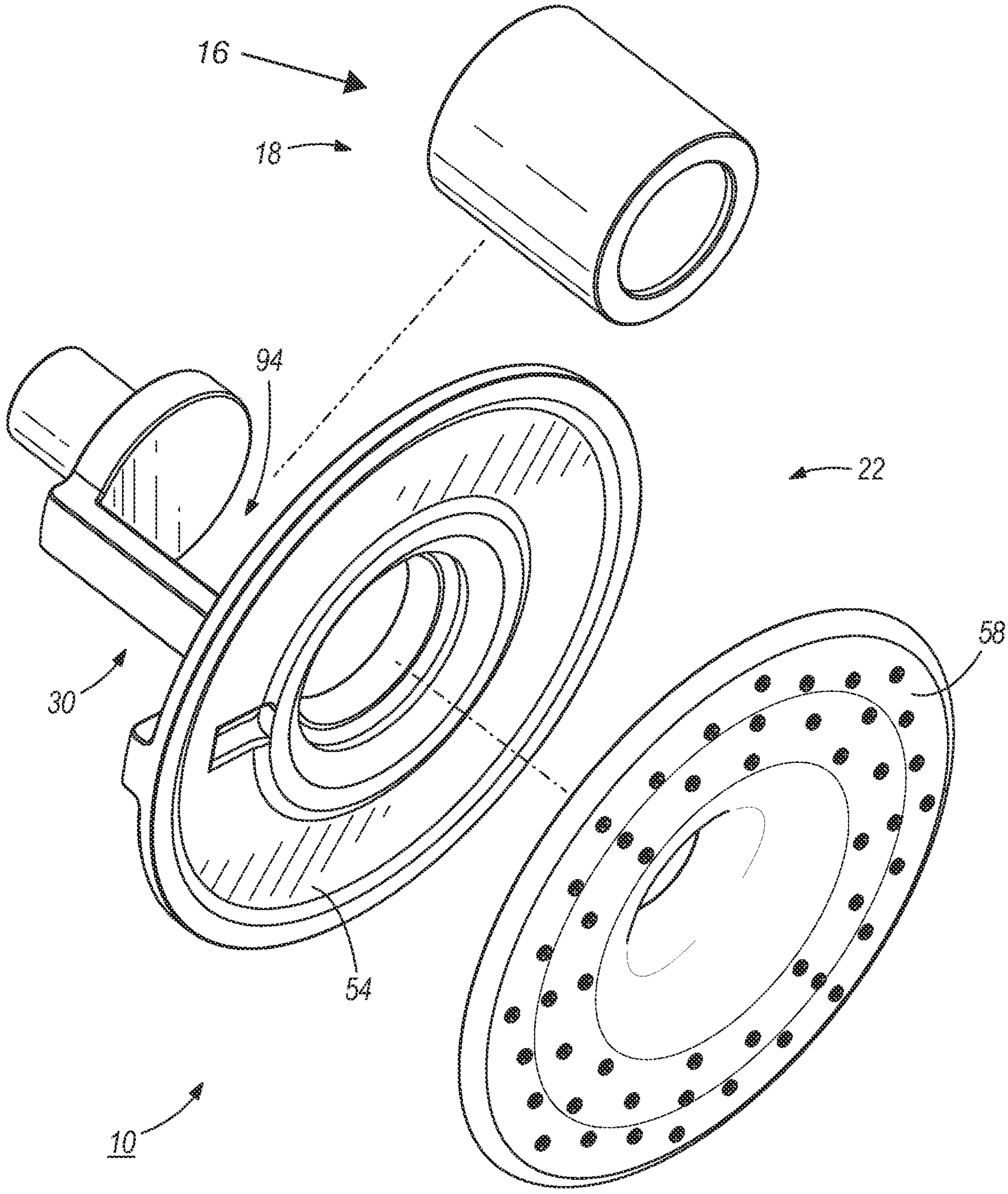

In the illustrated construction, the second device 16 is removably supported by the showerhead housing 30. The second device 16 is inserted into and removed from the receptacle 94 without tools. As shown in FIG. 1D, the second device 16 is inserted laterally (transverse to the outlet axis 74) into the receptacle 94. Also, the second device 16 is connected to the housing 30 behind the back plate 54.

Connecting structure 130 is provided between the second device 16 and the shower device 14 (e.g., between the speaker housing 106 and the showerhead housing 30) to removably connect the housings 106, 30. The connecting structure 130 may include frictional engagement between one or more of the walls of the receptacle 94 and the housing 106 (e.g., a friction fit). Material (not shown) with enhanced frictional properties may be provided on the engaging surfaces. Force-applying structure (not shown) may be provided to increase or augment the frictional force. Such structure may include a flexible "clamping" arrangement of components of the showerhead housing 30 (e.g., the spaced-apart diverted portions 98A of the waterway 46A shown in FIG. 2), magnetic connecting structure (discussed below), etc.

The connecting structure 130 may include inter-engaging connecting members (not shown), such as one or more projections and recesses, rails and grooves, etc. The connecting structure 130 may include positive engagement structure (not shown) to lock the second device 16 to the showerhead housing 30. For example, a movable locking member (not shown; e.g., a projection) may limit movement of the housing 106 from the receptacle 94. A user moves the locking member (through direct engagement, a remote actuator, etc.) to allow the second device 16 to be removed. The locking member may allow insertion of the second device 16 into the receptacle without movement of the locking member by the user (e.g., an angled surface on the locking member is engaged by the housing 106 to move the locking member out of the way).

The second device 16 may also be removably connectable to another shower component, such as, for example, a different style/model showerhead (e.g., any of the showerheads shown in FIGS. 2A-19), a rain can, a hand shower, a wall-mounted water tile, etc., or to a non-shower component, such as a support external to a shower (for example, a support post 132 shown in FIG. 10B), to provide a modular system. In such a system, a single second device 16 is removably connectable to the showerhead 22 and to another different component. The other component includes complementary connecting structure (e.g., frictional structure/materials, force-applying structure, inter-engaging connecting members, etc.) and may include a housing defining a receptacle 94 for supporting the second device 16.

The other shower component may incorporate structure similar to the showerhead 22 (e.g., a ring-shaped shower outlet assembly 50). For example, U.S. Design Pat. No. D565,699 illustrates a hand shower. In the modular system, the illustrated hand shower may be modified to have a housing with a ring-shaped shower outlet assembly similar to the assembly 50 of the showerhead 22. The second device 16 is supported in a similar manner on the modified hand shower.

The removable second device 16 may also be connected separately in the shower enclosure (not shown). For example, the second device 16 may be connected to connecting structure, similar to that described above, mounted on a wall of the shower enclosure, connected to a support (a slide bar for a hand shower, a support/post external to the shower). Alternatively, a suction cup (not shown) may be connected to the second device 16 for connection to a wall or support or a clip (not shown) may be provided to hang the second device 16 from a portion of the shower enclosure or from structure external to the shower.

In the illustrated construction of the speaker 18, the speaker components 110 receive a signal to output from a remote source (not shown), such as a phone, computer, other remotely-communicating source device, etc. (e.g., cell phone, smart phone (iPhone), desktop computer, laptop computer, tablet computer (iPad), MP3 player (iPod), other comparable device, etc.). To communicate with the remote source, communication components 134 provide a wireless interface between the output components 110 and the remote source. The communication components 134 include, for example, Bluetooth or IEEE 802.11 ("Wi-Fi") compatible devices.

The communication components 134 may provide one-way communication (e.g., from the remote source to the output components 110) or two-way communication (e.g., between components of the second device and the remote source). If two-way communication is provided, the second device 16 and/or the shower device 14 may include input components (not shown) capable of generating a signal to be sent to the remote source via the communication components 134. For example, the input components may include one or more buttons to control operation of the remote source (e.g., "ON/OFF", "Play/Pause", "Fwd", "Rev", "Volume", "Call Answer", "End Call" buttons, a key pad, a touch pad, a touch screen, etc.). The input components may include a microphone for use with a phone, intercom, etc.

The second device 16 also includes a power source or power components, such as a battery 138, for powering components of the second device 16. In the illustrated construction, the battery 138 is rechargeable when the second device 16 is removed from the receptacle 94. One or more charging terminals 142 are provided on the housing 106 for connection to an external power source (not shown) such as line power through a removable power cord, USB cord, etc. The second device 16 is removed from the showerhead 22, and the terminals 142 are connected to the external power source to recharge the battery 138. When the second device 16 is supported on the showerhead 22, the terminals 142 are covered by a portion of the showerhead housing 30 (e.g., by the diverted portion 98). A terminal cover (not shown; but similar to the cover 296 shown in FIGS. 11E and 11G) may also be provided on the housing 106.

It should be understood that electronic components (e.g., the output components 110, the communication components 134, the power components, etc.), associated modules and logical structures are capable of being implemented in software executed by a microprocessor or a similar device or of being implemented in hardware using a variety of components including, for example, application specific integrated circuits ("ASICs"). Terms like "controller" and "module" may include or refer to both hardware and/or software.

Figure 2:
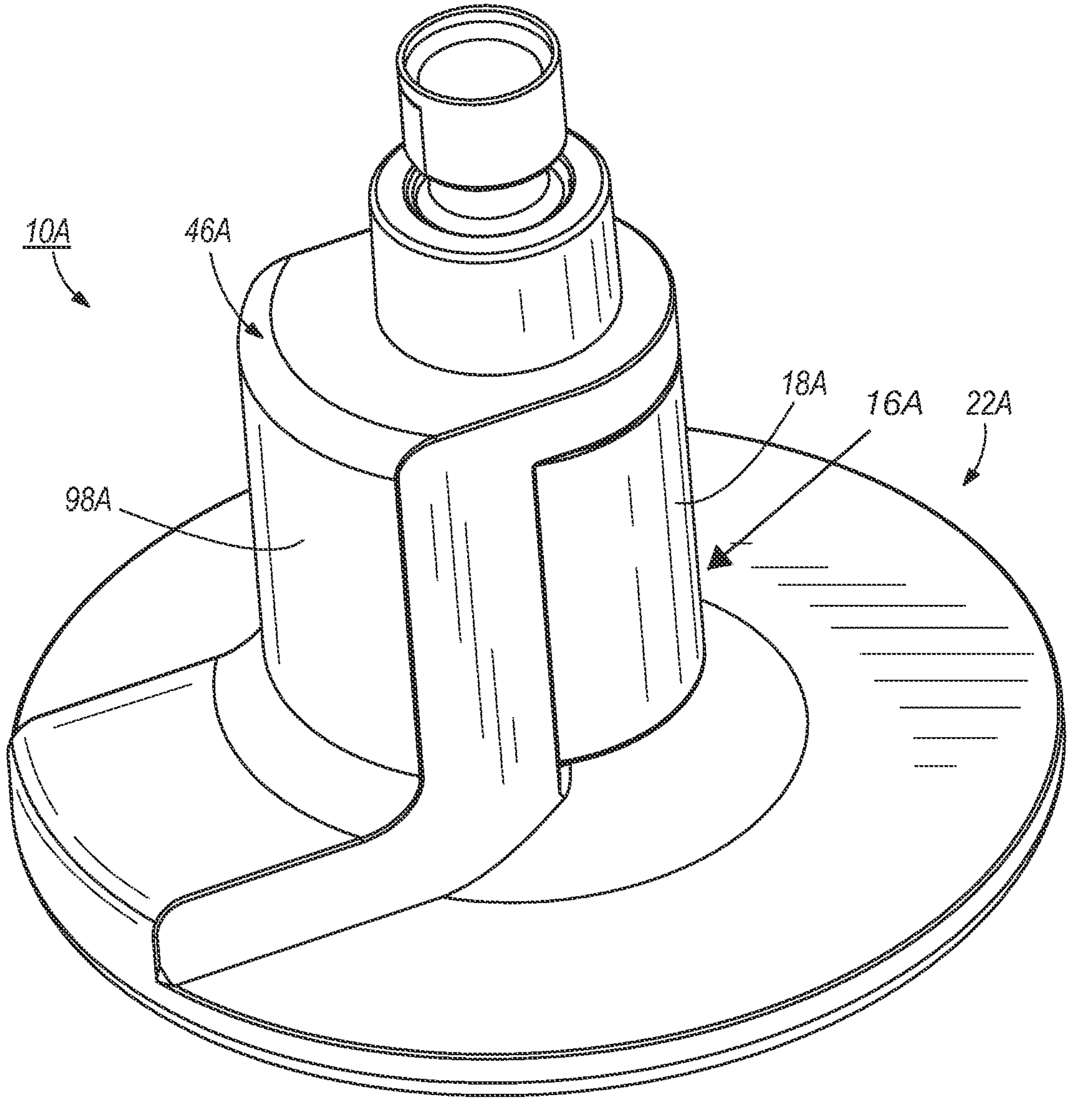
FIG. 2 is a rear perspective view of an alternative construction of a shower assembly.

FIG. 2 illustrates an alternative construction of a shower assembly 10A. The assembly 10A is similar to the assembly 10 described above and shown in FIGS. 1A-1D, and the description above is referred to for common elements. Modified elements are discussed below and have the same reference number "A".

In the assembly 10A, the waterway 46A includes a diverted portion 98A which is wider than the diverted portion 98 shown in FIGS. 1A-1D. The diverted portion 98A provides an arc-shaped recess to at least partially laterally capture the second device 16A (e.g., a speaker 18A). The showerhead 22A may be arranged so that the diverted portion 98A is at the lowest point. The second device 16A can thus rest on the diverted portion 98A when supported in the receptacle 94A.

Figure 3A:
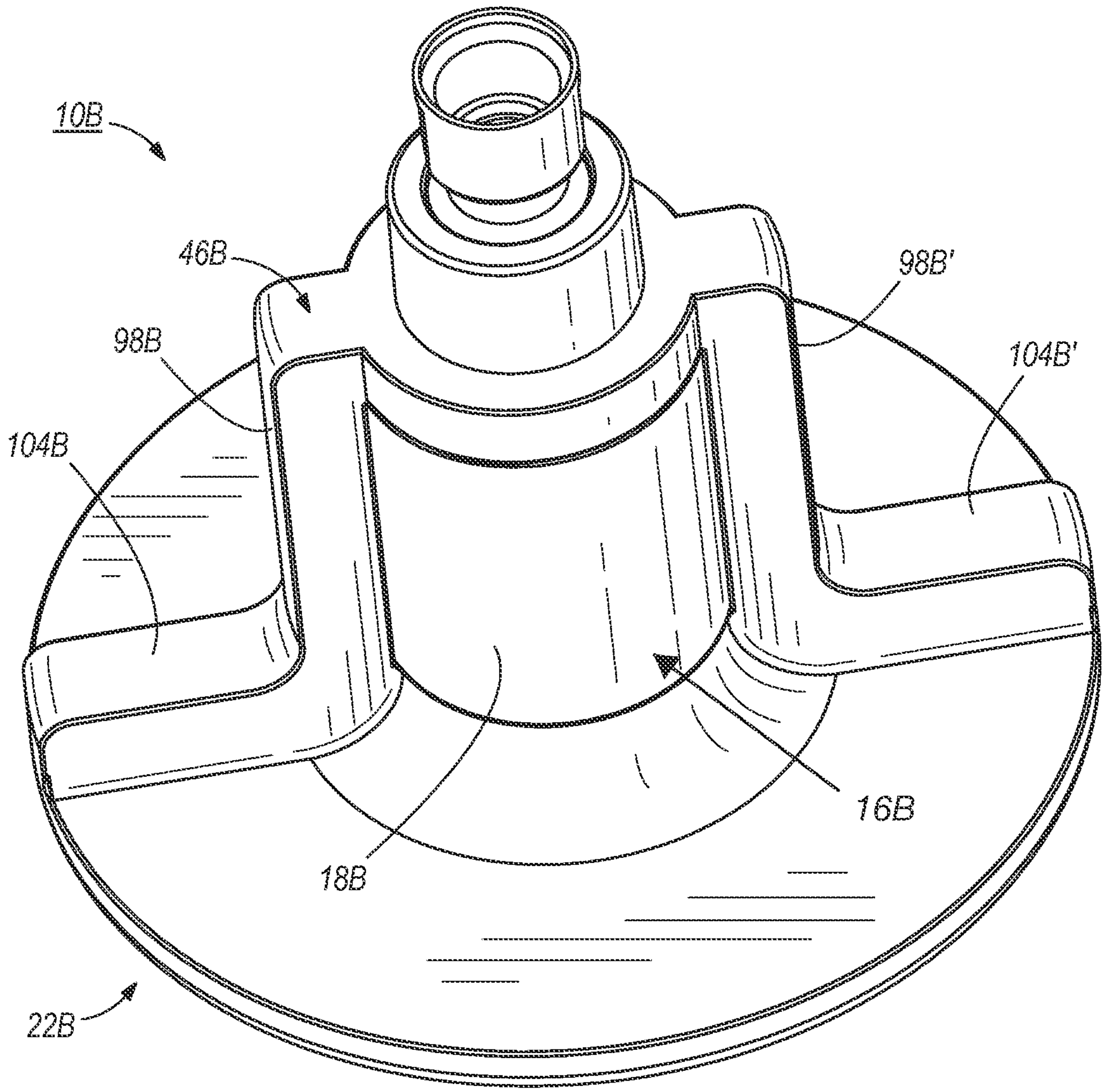
FIGS. 3A-3C are views of another alternative construction of a shower assembly.
Figure 3B:
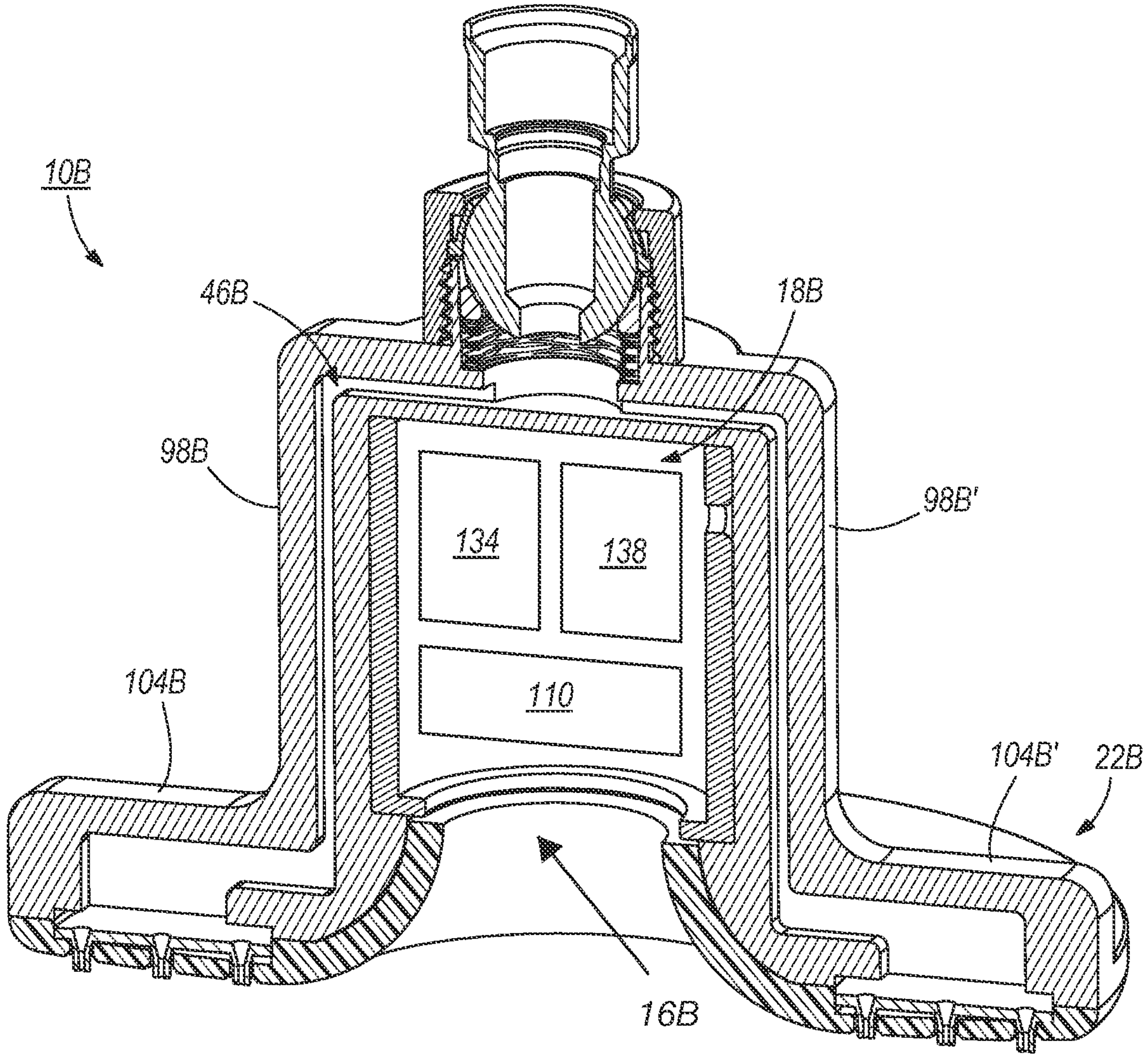
Figure 3C:
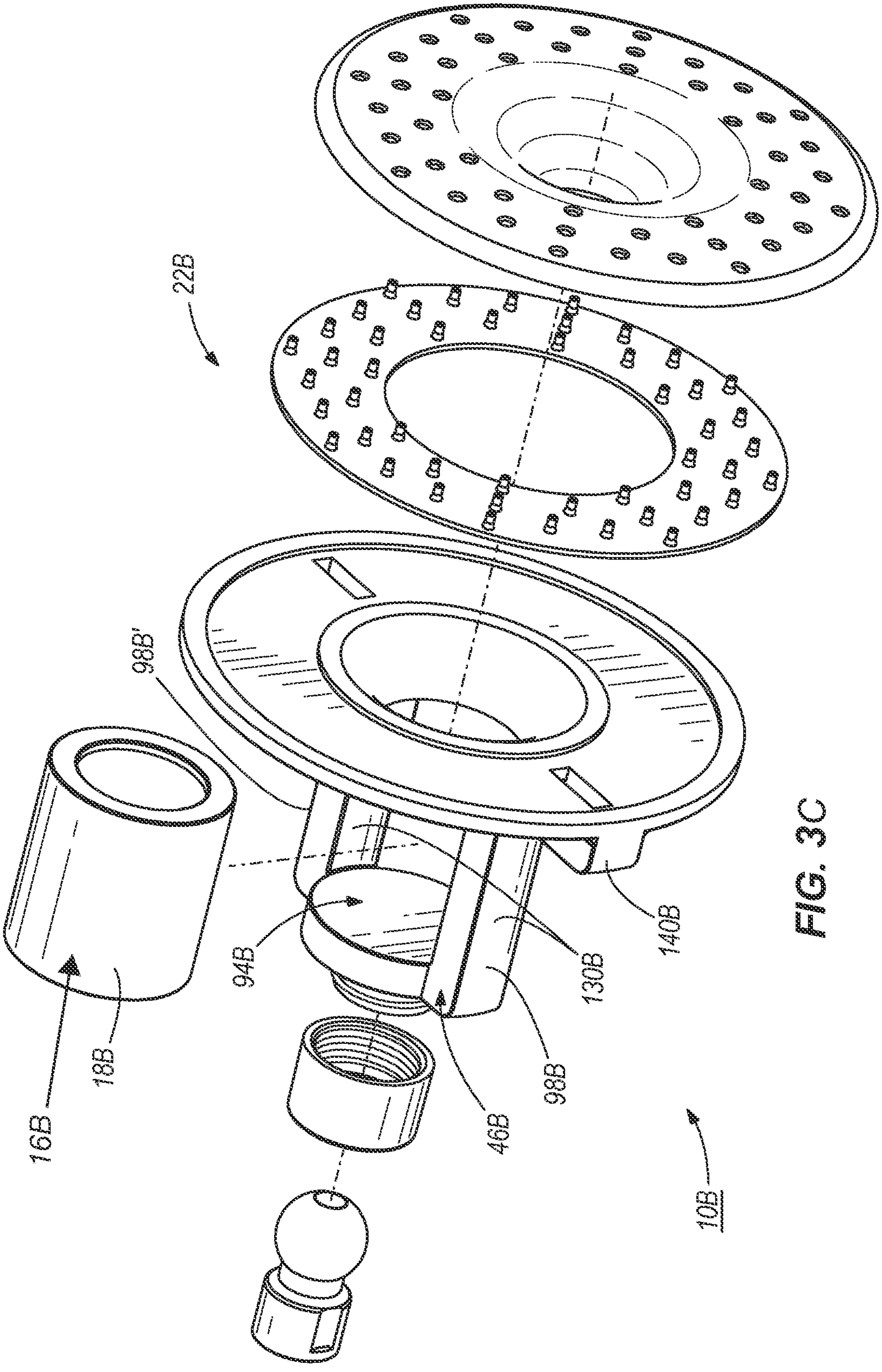

FIGS. 3A-3C illustrate another alternative construction of a shower assembly 10B. The assembly 10B is similar to the assembly 10, 10A described above and shown in FIGS. 1A-1D and 2, respectively, and the description above is referred to for common elements. Modified elements are discussed below and have the same reference number "B".

In the assembly 10B, the waterway 46B includes multiple (two) diverted portions 98B and 98B'. The illustrated diverted portions 98B, 98B' are spaced apart on the showerhead housing 30B by about 180°. The diverted portions 98B, 98B' cooperate to capture the second device 16B (e.g., a speaker 18B). As mentioned above, at least one of the diverted portions 98B, 98B' may be flexible to allow insertion of the second device 16B and/or to apply force to retain the second device 16B (e.g., to provide connecting structure 130B or to supplement other connecting structure).

The use of multiple diverted portions 98B, 98B' may also allow the flow through the showerhead 22B to be adjusted. For example, one diverted portion 98B provides a first flow path, and the other diverted portion 98B' provides a second flow path. Combined flow through both flow paths may provide increased flow through the shower outlet assembly 50B. The flow paths may have different volumes such that flow through one flow path is greater than through the other flow path. A valve arrangement (not shown) may be provided to selectively control flow through one or both of the flow paths (e.g., minimum flow through the smaller flow path, medium flow through the larger flow path, maximum flow through both flow paths). The valve arrangement may include a user control (not shown; e.g., a button or selector).

In other constructions (not shown), the valve arrangement may be automatically controlled through another input (e.g., based on the output of the second device 16B (e.g., the speaker 18B)). In such constructions, the valve arrangement may include one or more electronically-controlled valves (e.g., a solenoid valve) operated by control components (not shown). The water flow may be adjusted in relation to the intensity, rhythm, etc. of the sound output of the speaker 18B to also provide a tactile experience from the assembly 10B, in addition to the audio experience. The control components may be selectively activated/deactivated to add/remove the tactile experience.

Figure 4:
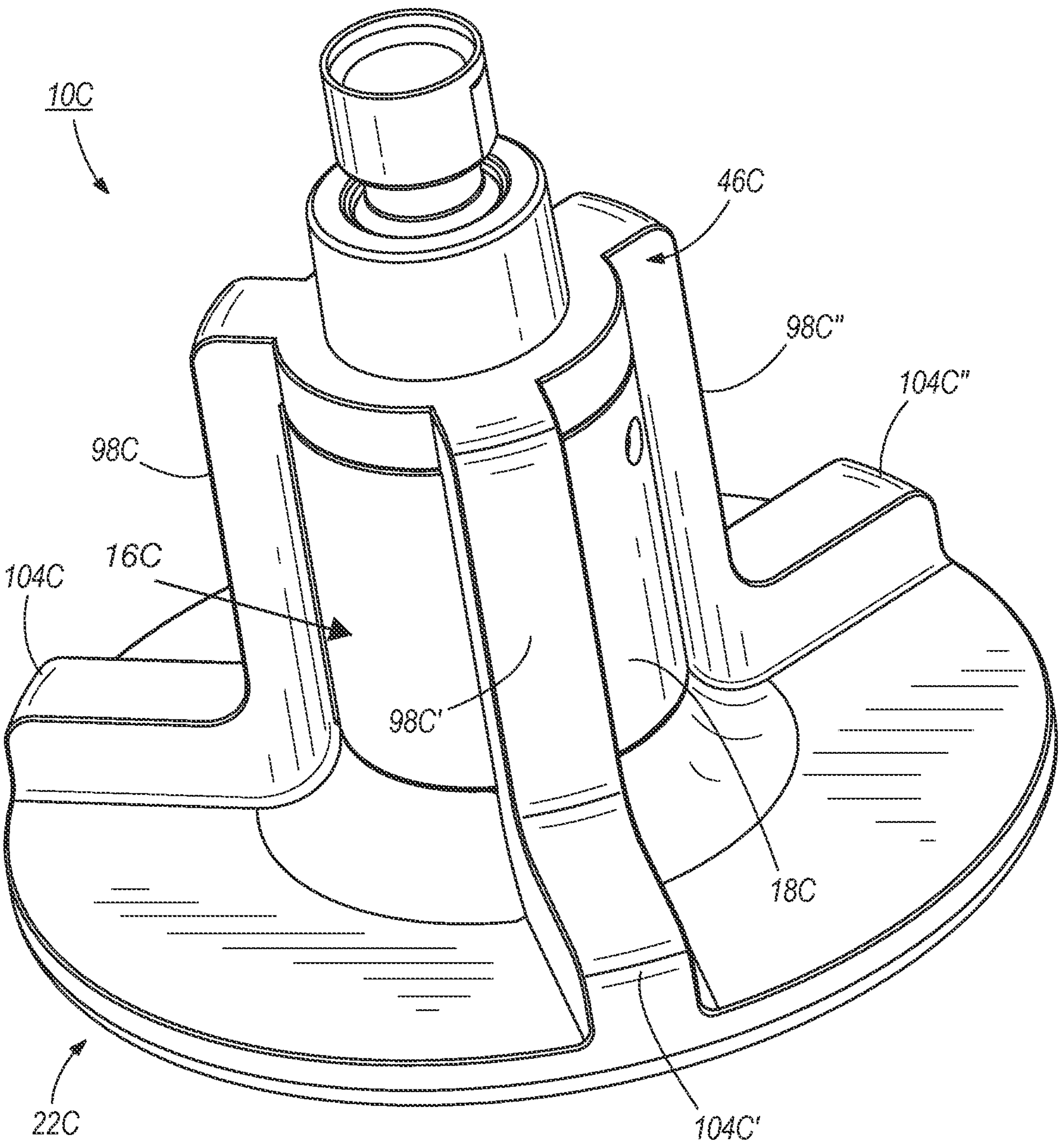
FIG. 4 is a rear perspective view of yet another alternative construction of a shower assembly.

FIG. 4 illustrates yet another alternative construction of a shower assembly 10C. The assembly 10C is similar to the assembly 10, 10A, 10B described above and shown in FIGS. 1A-1D, 2 and 3A-3C, respectively, and the description above is referred to for common elements. Modified elements are discussed below and have the same reference number "C".

In the assembly 10C, the waterway 46C includes multiple (three) diverted portions 98C, 98C' 98C". The illustrated diverted portions 98C, 98C' 98C" are spaced apart on the showerhead housing 30C by about 120°. The diverted portions 98C, 98C' 98C" cooperate to capture the speaker 18C.

As mentioned above, at least one of the diverted portions 98C, 98C' 98C" may be flexible to allow lateral insertion of the second device 16C (e.g., a speaker 18C) and/or to apply force to retain the speaker 18C. However, in the illustrated construction, the second device 16C is inserted into and removed from the receptacle 94C the receptacle 94C from the front of the shower outlet assembly 50C. As also mentioned above, the use of multiple diverted portions 98C, 98C', 98C" may also allow the flow through the showerhead 22C to be adjusted.

Figure 5B:
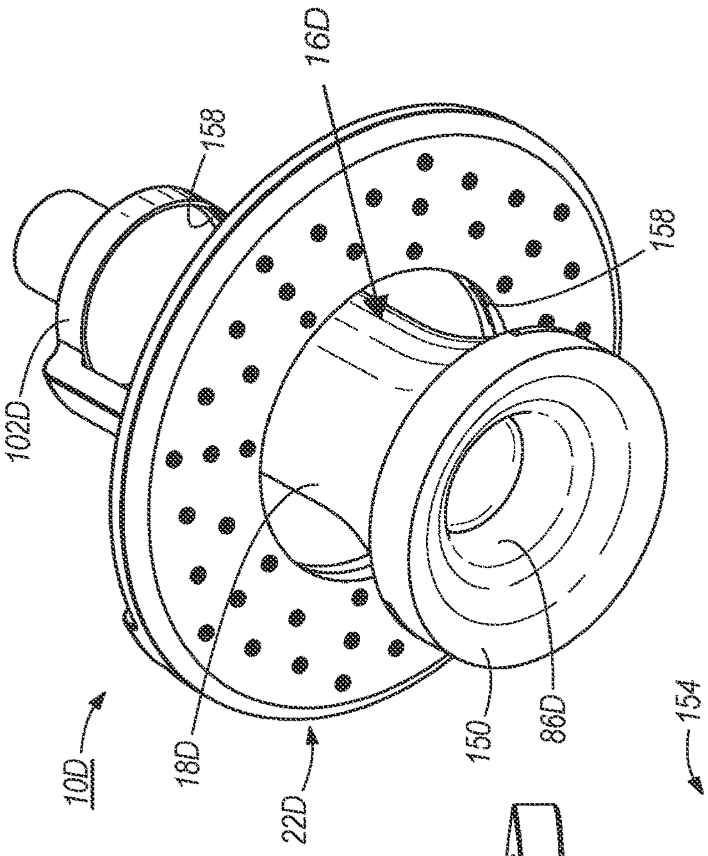
FIGS. 5A-5C are views of a further alternative construction of a shower assembly.
Figure 5C:
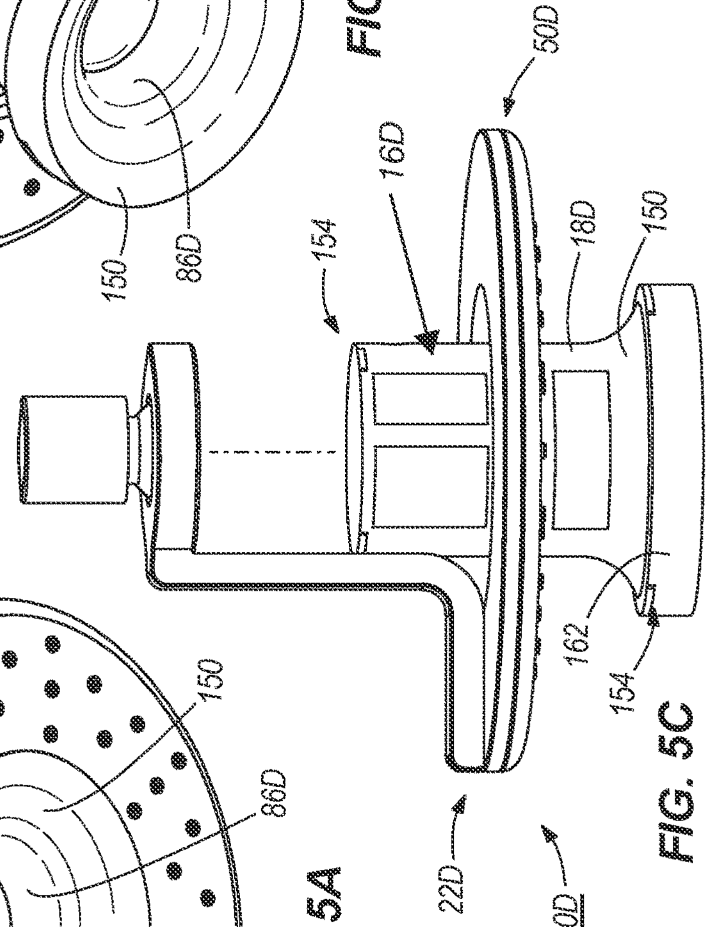
Figure 5A:
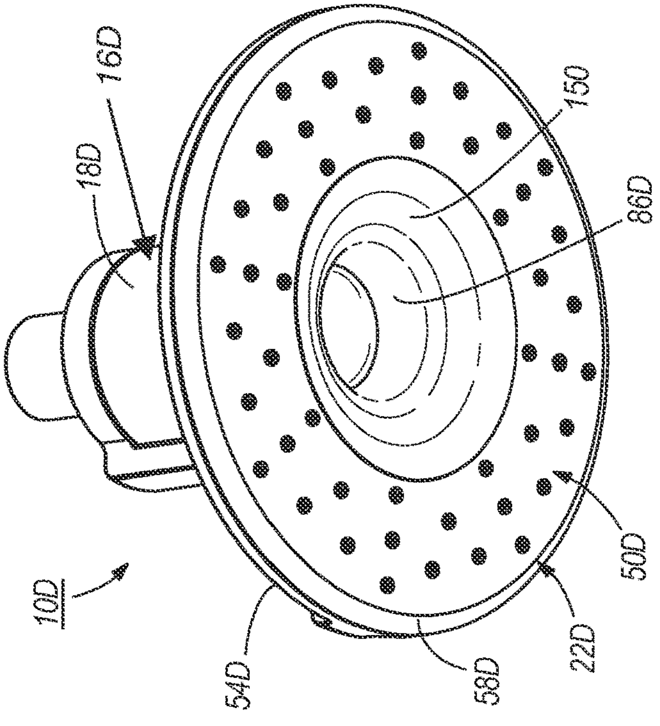

FIGS. 5A-5C illustrate an alternative construction of a shower assembly 10D. The assembly 10D is similar to the assembly 10, 10A, 10B, 10C described above and shown in FIGS. 1A-1D, 2, 3A-3C and 4, respectively, and the description above is referred to for common elements. Modified elements are discussed below and have the same reference number "D".

In the assembly 10D, the second device 16D (e.g., a speaker 18D) is inserted into and removed from the receptacle 94D through the front of the shower outlet assembly 50D. In the illustrated construction, the flared surface 86D is provided on a flared portion 150 on the front of the second device 16D. The back plate 54D and the front plate 58D are generally annular, and the shower outlet assembly 50D is in the shape of a relatively flatter ring (compared to the shower outlet assembly 50 shown in FIGS. 1A-1D).

The connecting structure 130D includes inter-engaging ramp surfaces 154, 158 on the speaker 18D and the showerhead 22D, respectively, engaging upon a ¼ turn. A first set of ramp surfaces 154, 158 is provided on a rim 162 of the flared portion 150 and the shower outlet assembly 50D, and a second set of ramp surfaces 154, 158 is provided on the rear of the speaker housing 106D and the front wall of the inlet chamber 102D. The speaker 18D is thus retained at both ends.

FIGS. 6-8 and 10-11 illustrate another alternative construction of a shower assembly 10F. The assembly 10F is similar to the assembly 10, 10A, 10B, 10C, 10D described above and shown in FIGS. 1A-1D, 2, 3A-3C, 4, 5A-5C, respectively, and the description above is referred to for common elements. Modified elements are discussed below and have the same reference number "F".

In the illustrated showerhead 22F, several common showerhead components are shown. For example (see FIG. 6E), the inlet connector 26F includes a screen washer 170F and a flow regulator 174F. A holder 178F, a flat ring 182F and a wave spring 186F are provided around the ball joint 34F.

The showerhead 22F includes (see FIGS. 6D-6E, 7A-7H and 8A-8F) a waterway assembly 190F communicating with the inlet 38F. As shown in FIG. 6D, cooperating threads 192F connect the housing 30F and the waterway assembly 190F. The waterway assembly 190F includes (see FIGS. 6D-6E, 7A-7E and 8A-8F) outer and inner waterway members 194F, 198F cooperating to define the waterway 46F and the inlet and outlet chambers 102F, 62F, respectively. The waterway members 194F, 198F are connected, for example, by welding (e.g., ultrasonic), adhesive, etc., to provide a fluid tight seam.

The inner waterway member 198F provides a sprayface member defining openings 260. The waterway assembly 190F also includes a nozzle member 264 with nozzles 268, at least some of which have barbs 272. The illustrated nozzles 268 are oriented along respective axes 274. The nozzle member 264 provides the outlets 66F arranged in the face plane 90F (see FIG. 9D). The nozzle member 264 may be formed as a soft thermoplastic elastomer (TPE), and the nozzles/outlets 66F may be self-cleaning.

Each nozzle 268 is received in a corresponding opening 260, and, as shown in FIG. 9D, the barbs 272 engage the inner waterway member 198F to connect the members 198F, 264. The construction of the nozzles 268 and the barbs 272 is such that water pressure through each nozzle 268 increases the engagement between the barbs 272 and the inner waterway member 198F. Also, in the illustrated construction, the edge 276 of the nozzle member 264 wraps around the edge 280 of the inner waterway member 198F. Ridges 284 on the outer surface of the nozzle member 264 fit in corresponding grooves 288 in the inner waterway member 198F. Additional or alternative connecting arrangements (e.g., adhesive, welding, etc.) may also be provided to connect and/or seal the members 198F, 264.

As shown in FIGS. 6D-6E, 8B-8F, a magnet 206F is supported on the showerhead 22F (e.g., in a recess 292 on the inner waterway member 198F), and the nozzle member 264 covers the magnet 206F. The illustrated magnet 206F is located out of the waterway 46F, enclosed and sealed between the members 198F, 264. The magnet 206F is held in the recess 292, for example, by adhesive (epoxy), press-fit, welding, etc. In other constructions (not shown), the magnet 206F may be supported in another manner (e.g., molded into the inner waterway member 198F or the nozzle member 264) and/or in another location on the showerhead 22F.

Figure 9A:
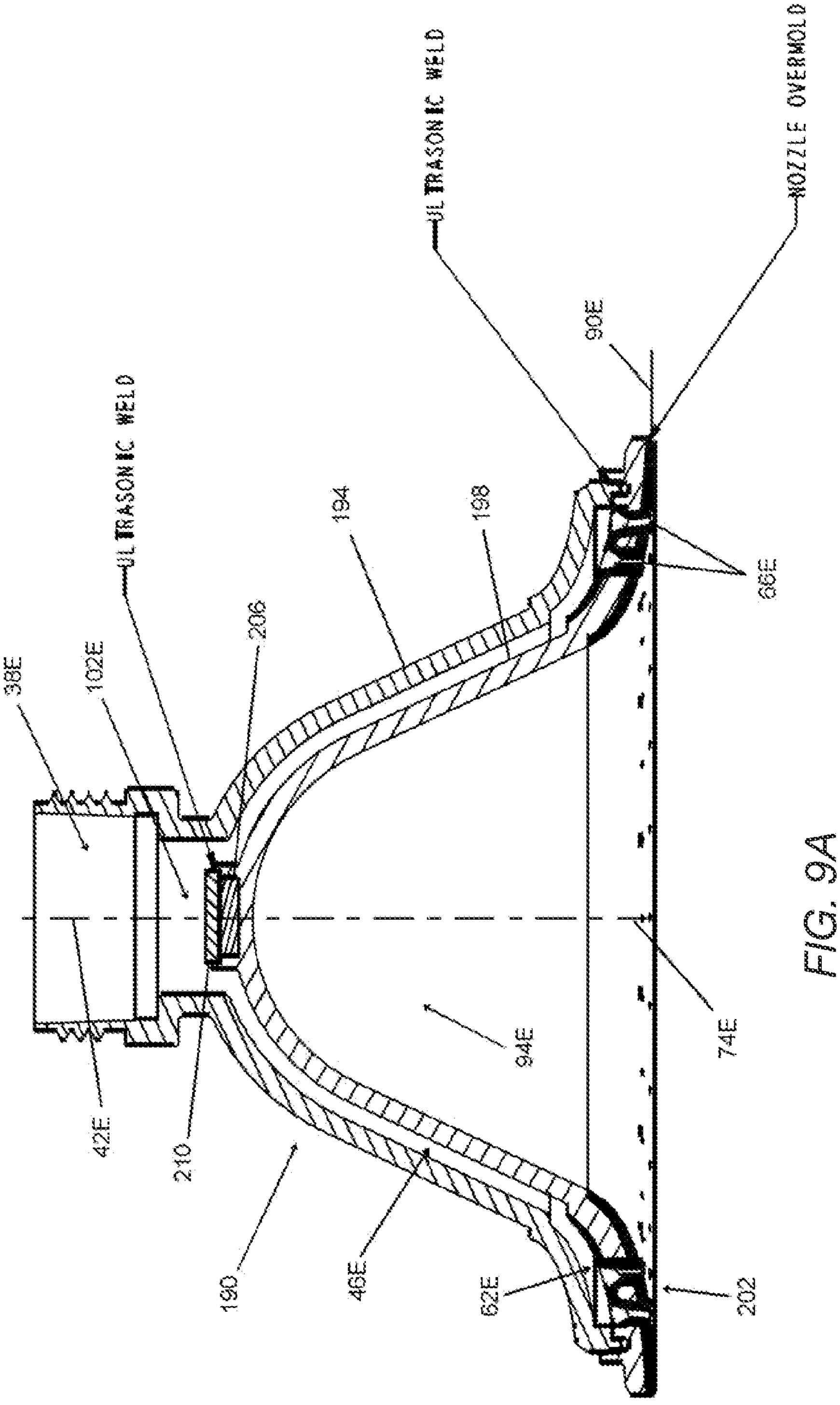
FIGS. 9A-9B are views of an alternative construction of a waterway assembly.
Figure 9B:
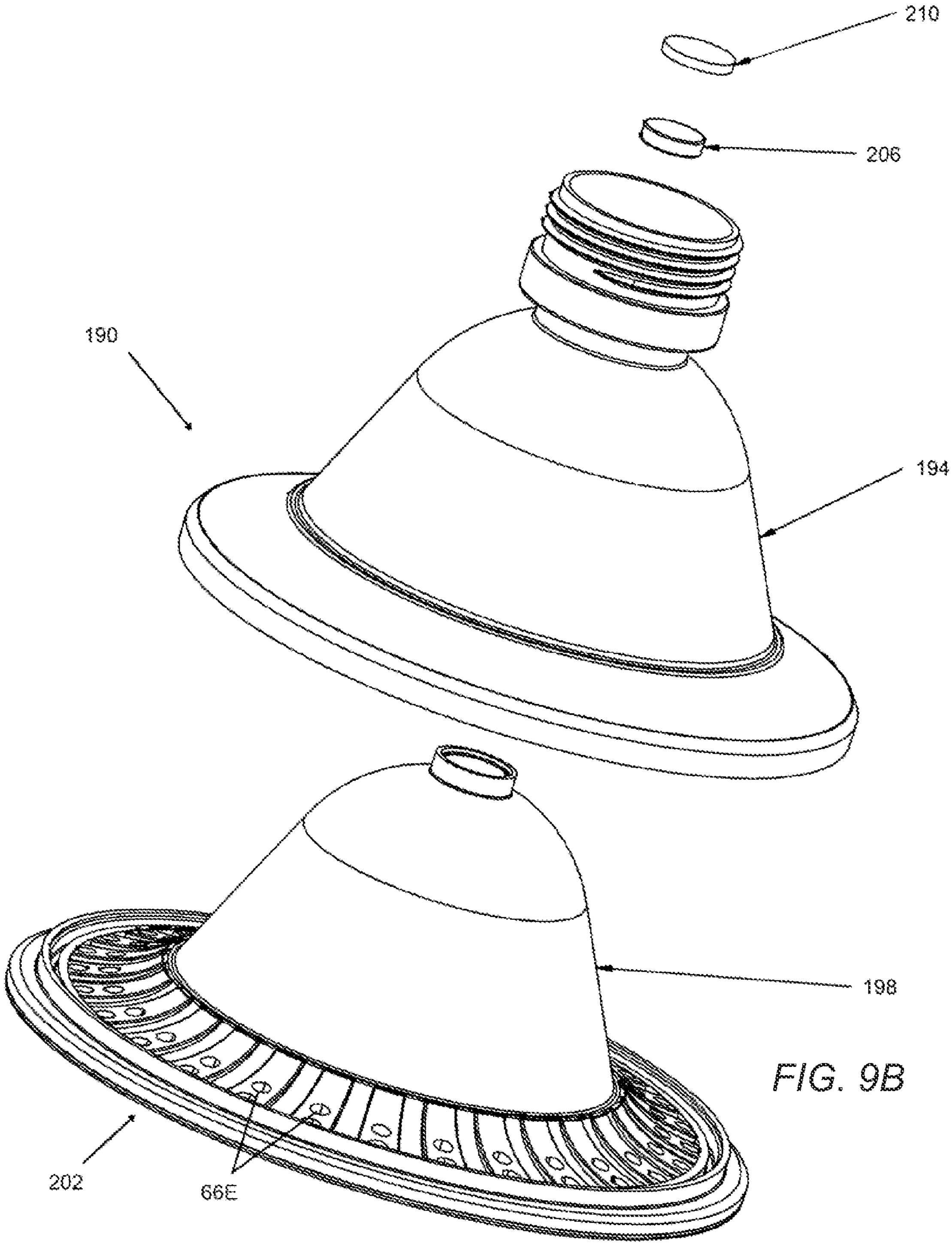
Figure 10B:
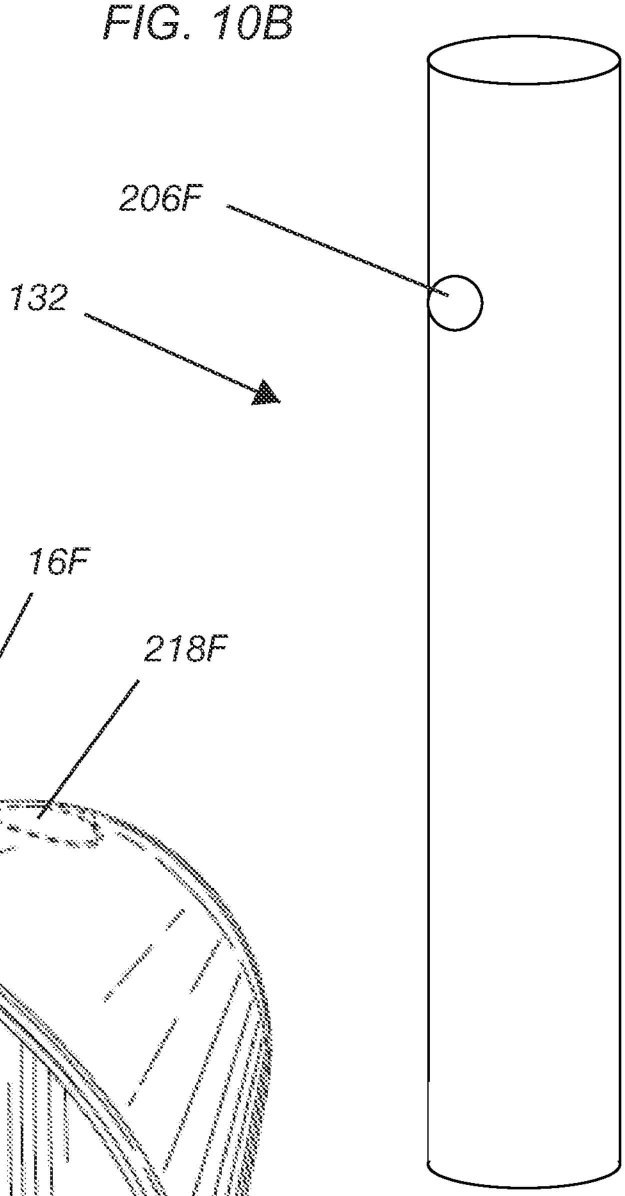
FIGS. 10A-10D are views of a second device for use with a shower assembly shown in FIGS. 6A-6E.
Figure 10A:
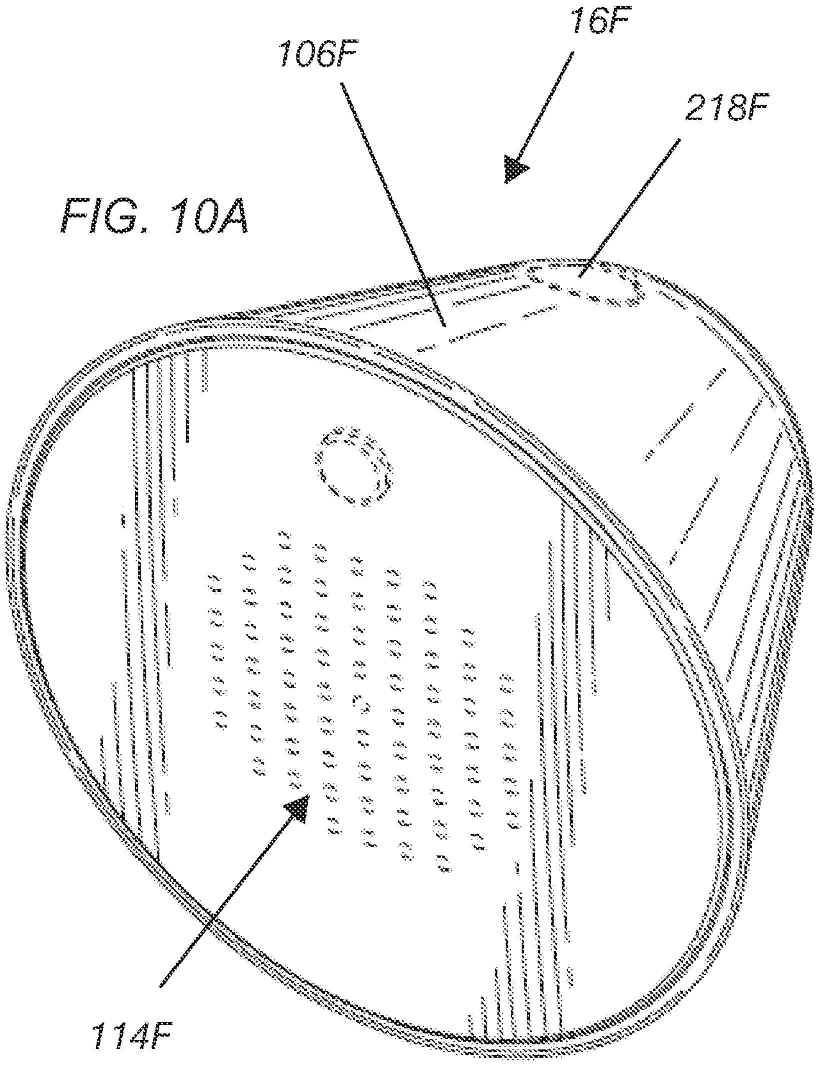
Figure 10C:
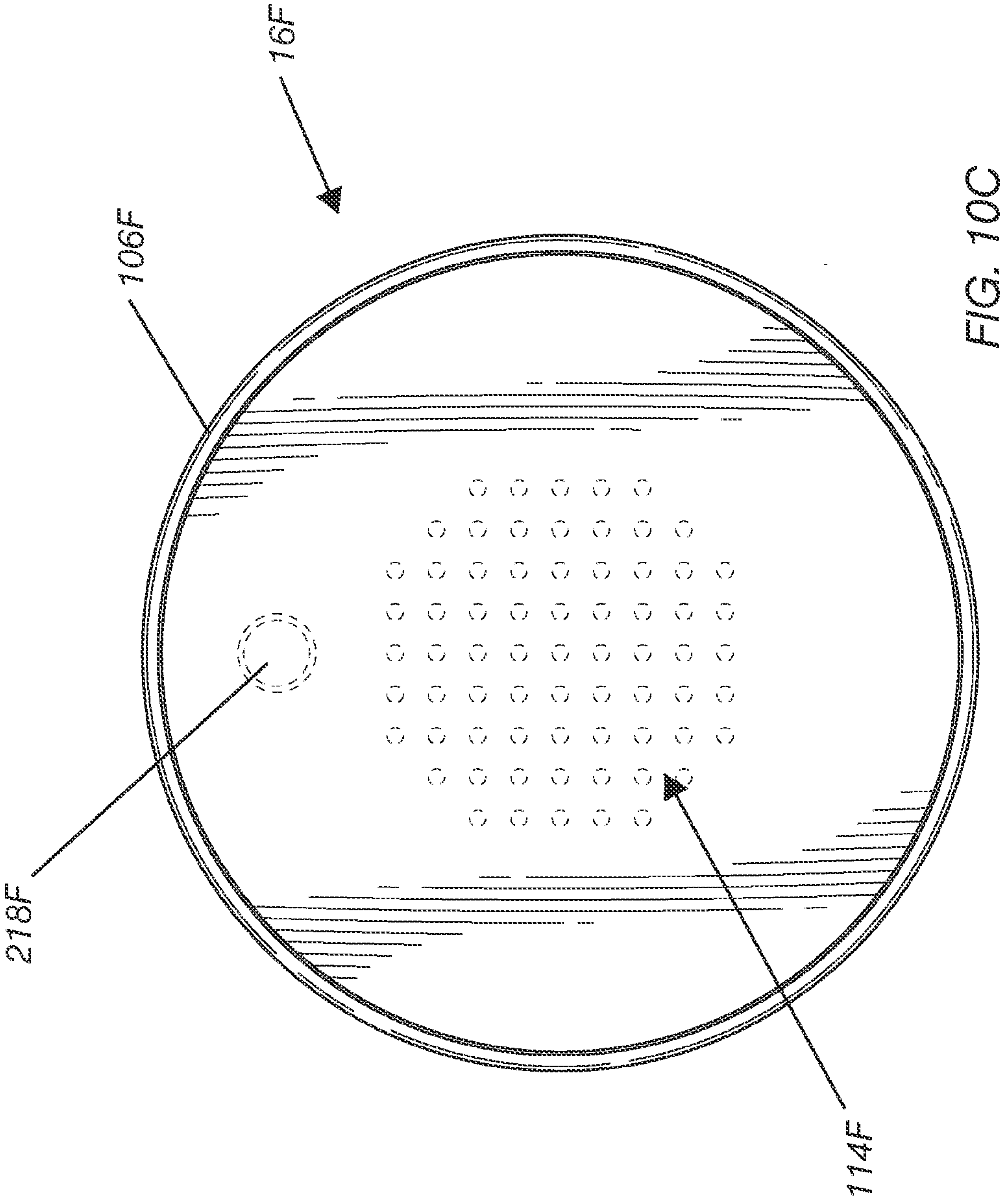

FIGS. 9A-9B illustrate an alternative construction of the waterway assembly 190. The waterway assembly 190 includes outer and inner waterway members 194, 198 cooperating to define the waterway 46E and the inlet and outlet chambers 102E, 62E, respectively. The waterway members 194, 198 include cooperating recesses to provide the receptacle 94E.

The waterway members 194, 198 are connected, for example, by welding (e.g., ultrasonic), adhesive, etc., to provide a fluid tight seam. The inner waterway member 198 includes a spray face assembly 202 providing the outlets 66 and arranged in the face plane 90E (see FIG. 9A). The spray face assembly 202 includes a soft thermoplastic elastomer (TPE) overmold and the nozzles/outlets 66E are self-cleaning.

A magnet 206 is supported on the waterway assembly 190 (e.g., in a recess on the inner waterway member 198), and a cap 210 covers the magnet 206. The illustrated magnet 206 is supported in the inlet chamber 102E, and the cap 210 is connected to the waterway member 198 to enclose the magnet 206, for example, by welding (e.g., ultrasonic), adhesive, etc., to seal the magnet 206. In other constructions (not shown), the magnet 206 may be supported in another manner (e.g., molded into the inner waterway member 198) and/or in another location on the showerhead 22E.

The second device 16F is illustrated in more detail in FIGS. 10A-10G and 11A-11H. As mentioned above, the second device 16F may include an entertainment device (e.g., a speaker 18F, a display, a bubble blower, etc.), a light source, a time keeping device (e.g., a clock, a timer), a dispenser (e.g., of shampoo, soap, aroma, essential oils, softeners, purifiers, etc.) or a combination of such components.

The second device 16F may be removably connectable to a shower component, such as, for example, different style/model showerheads (e.g., any of the showerheads shown in FIGS. 1A-19), a rain can, a hand shower, a wall-mounted water tile, etc., or to a non-shower component, such as a wall of the shower enclosure, a support external to a shower (for example, a support post 132 shown in FIG. 10B), to provide a modular system. In such a system, a single second device 16F is removably connectable to the showerhead 22F and to another different component. The other component includes complementary connecting structure (e.g., frictional structure/materials, force-applying structure, inter-engaging connecting members, etc.) and may include a housing defining a receptacle for supporting the second device 16F.

Also, in such a system, multiple different second devices 16F are removably connectable to each support component. Different second devices 16F of the same type (e.g., different speakers 18F) may be differentiated by different materials, markings, colors, etc.

For example, a different individual speaker 18F (e.g., multiple individual speakers 18F) for each individual in a household is removably connectable to the shower device 14F (and/or to other support devices/components in the system). Also, one type of second device 16F (e.g., a speaker 18F) and another different type of second device 16F (e.g., a different entertainment device, a light source, a time keeping device, a dispenser, combination, etc.) may be removably connectable to the shower device 14F.

The illustrated second device 16F (e.g., a speaker 18F shown in FIGS. 11A-11H) includes a housing 106F connected to a face 212F, for example, by welding (e.g., ultrasonic), adhesive, etc., to seal the second device 16F. The housing 106F defines a container for components/materials associated with the second device 16F (e.g., power components 138F, output components 110F, material to be dispensed, etc.). The components of the second device 16F depend on the type of device.

For audio output devices (e.g., including a speaker), the output components 110F include speaker components 110F producing an audio output through an outlet (such as the illustrated outlet 114F in the face 212F). In other constructions (not shown), the speaker outlet 114F may be arranged on a different portion of the housing 106F. With the speaker 18F, a screen 122F is disposed behind the face 212F and is preferably micro-etched to provide sound permeability/water impermeability.

For visual output devices (e.g., a display (FIG. 10E), a light (FIG. 10F), an indicator (FIG. 10G), etc.), the output components 110F include components producing the visual output, for example, on the face 212F or other portion of the housing 106F. In such constructions, the face 212F may not include the illustrated openings (shown in phantom in FIGS. 10A and 10C) in the outlet 114F.

For material dispensing devices, the output components 110F include a dispensing mechanism (e.g., a pump, a valve, etc.) to dispense material from the device 16F and a reservoir to contain material to be dispensed. The material may be dispensed through openings in the outlet 114F. The dispensing mechanism may be powered by the power source 138F (e.g., a battery-powered pump or valve). Alternatively, the dispensing mechanism may be operated by manual actuation (e.g., by the button 218F). In some constructions, fluid flow (e.g., water flow from the shower device 14F) may power the dispensing mechanism or cause dispensing of material (e.g., by mixing with water from the shower device 14F).

The output components 110F may receive a signal to output and/or for control from a remote source (not shown), such as a phone, computer, other remotely-communicating source device, etc. (e.g., cell phone, smart phone (iPhone), desktop computer, laptop computer, tablet computer (iPad), MP3 player (iPod), other comparable device, shower device controls, etc.).

Communication components 134F (e.g., Bluetooth or IEEE 802.11 ("Wi-Fi") compatible devices) provide a wireless interface between the output components 110F and the remote source. The communication components 134F may provide one- or two-way communication. If two-way communication is provided, the second device 16F and/or the shower device 14F may include input components (control buttons 224 (see FIGS. 13A-13D), a key pad, a touch pad, touch screen, a microphone, etc.) capable of generating a signal to be sent to the remote source via the communication components 134F to communicate with a remote device (e.g., to control operation of a remote source).

The second device 16F also includes a power source or power components, such as a battery 138F, for powering components of the second device 16F. A switch (e.g., button 218F) operates the output components 110F, and an indicator 222F (e.g., a LED; see FIGS. 10A-10B, 11A and 11C) lights to indicate that the second device 16F is "ON". In the illustrated construction, the indicator 222F is incorporated into the button 218F.

In the illustrated construction, the battery 138F is rechargeable when the second device 16F is removed from the receptacle 94F. In other constructions (not shown), the battery may be removable for charging and/or replacement. In some constructions (not shown), the battery may be part of a battery pack removable from the housing 106F as a unit (e.g., the rear portion of the second device may form the removable battery pack and be separable from the front portion). In other constructions (not shown), the battery may be supported in a closeable compartment on the housing 106F (e.g., in the front face, a side wall, the rear wall).

Figure 10D:
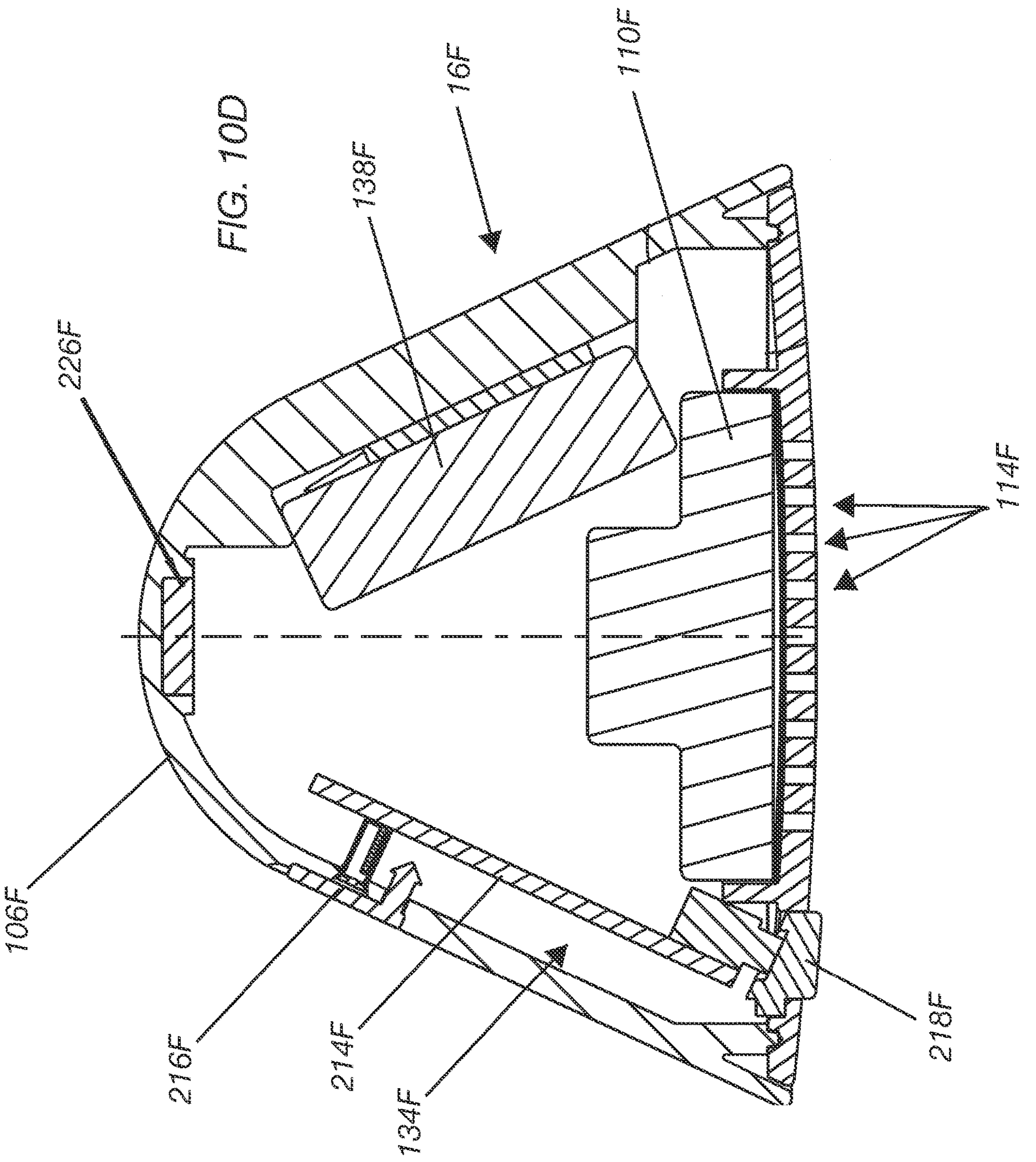
Figure 10E:
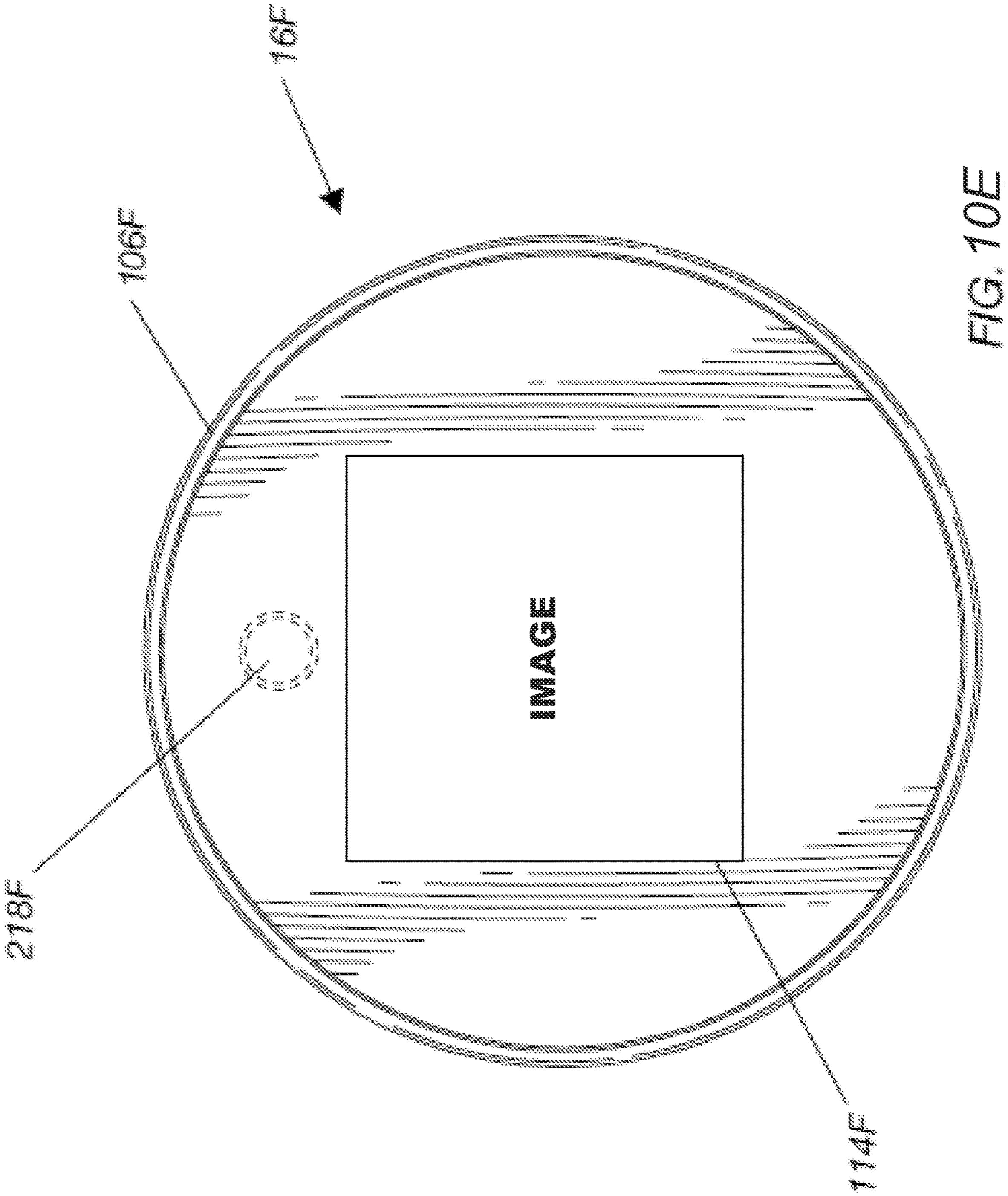
FIGS. 10E-10G are views of alternative second devices, such as an image display device, a light, and an indicator or clock, respectively, for use with a shower assembly shown in FIGS. 6A-6E.
Figure 10F:
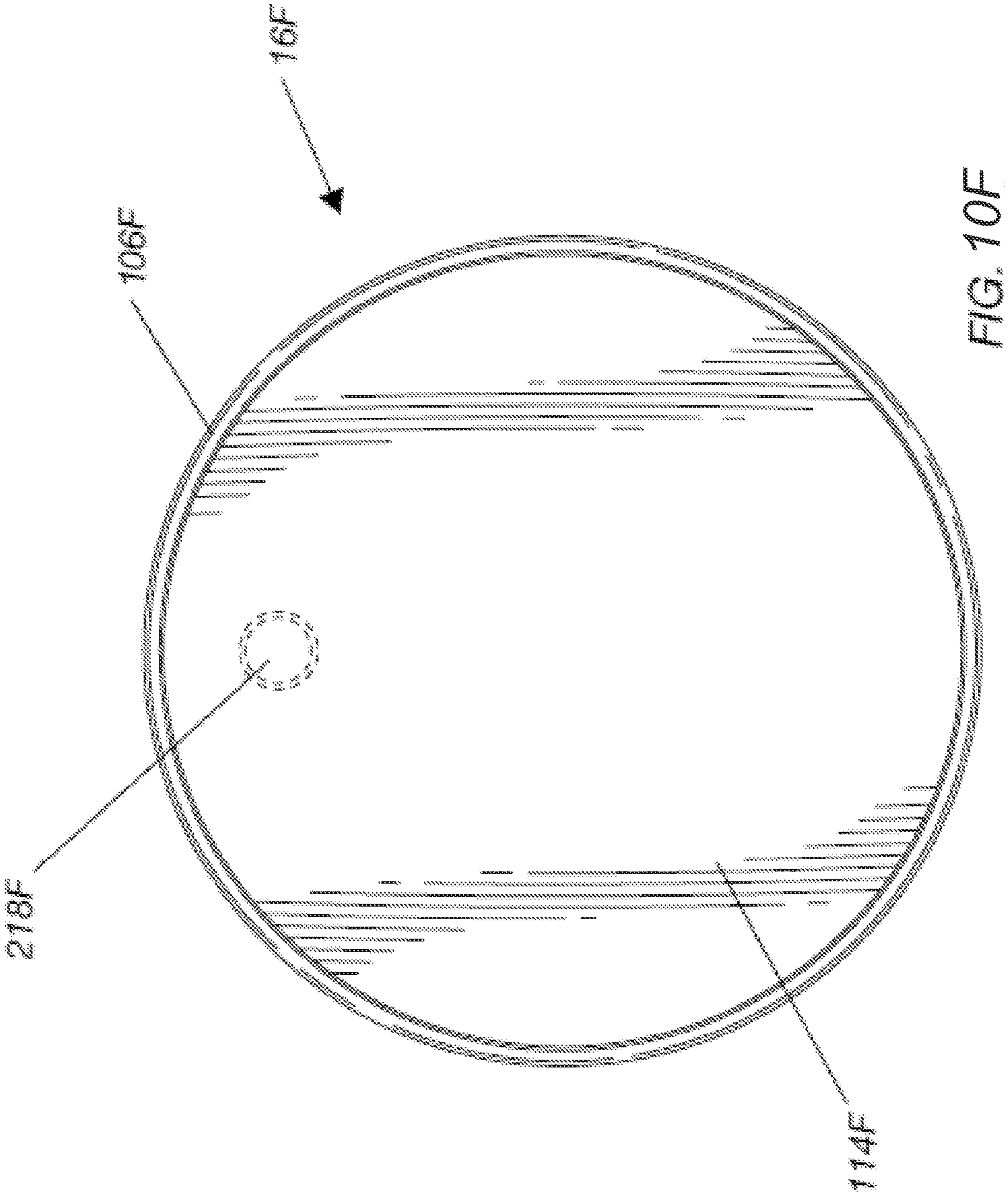
Figure 10G:
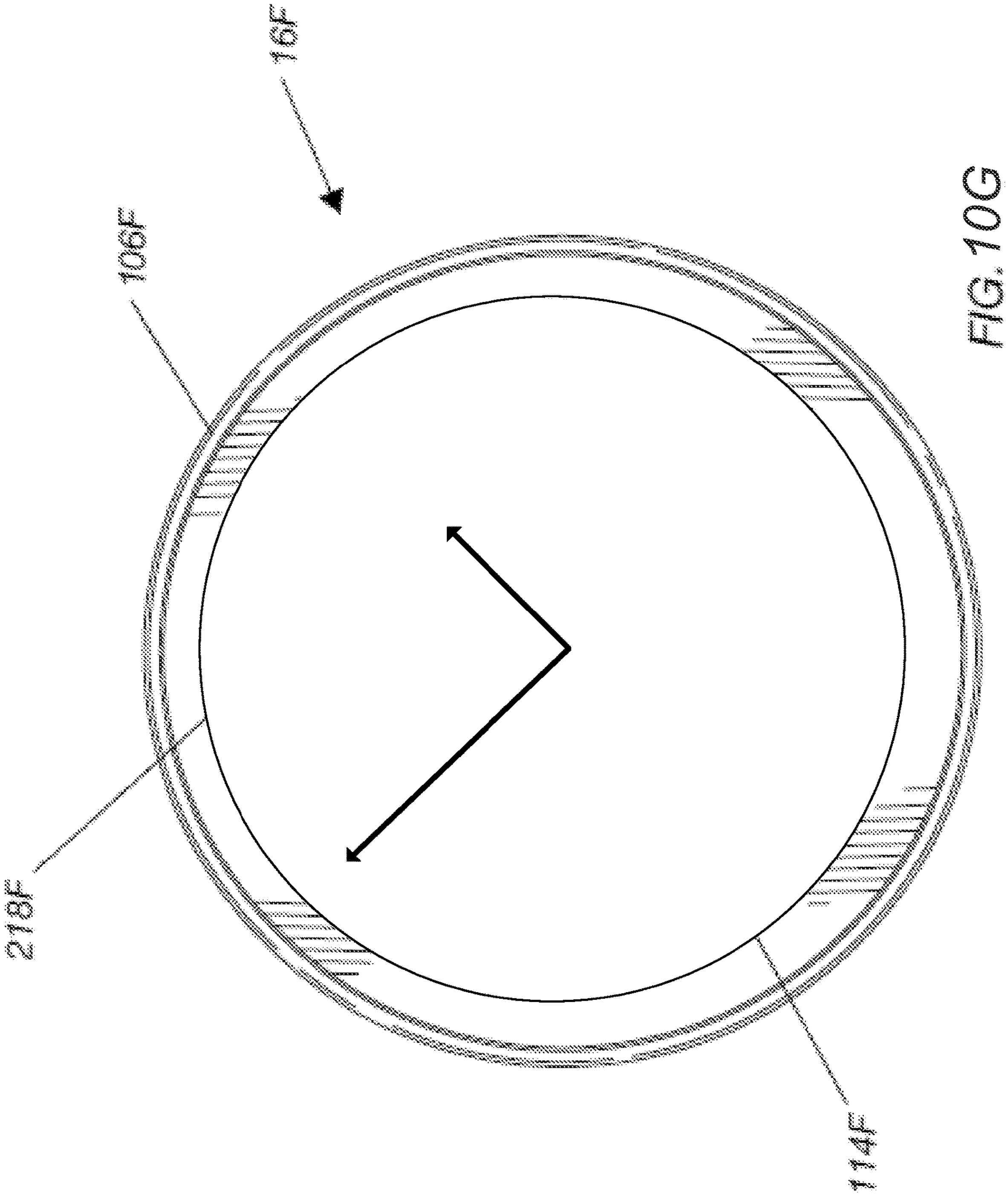
Figure 11A:
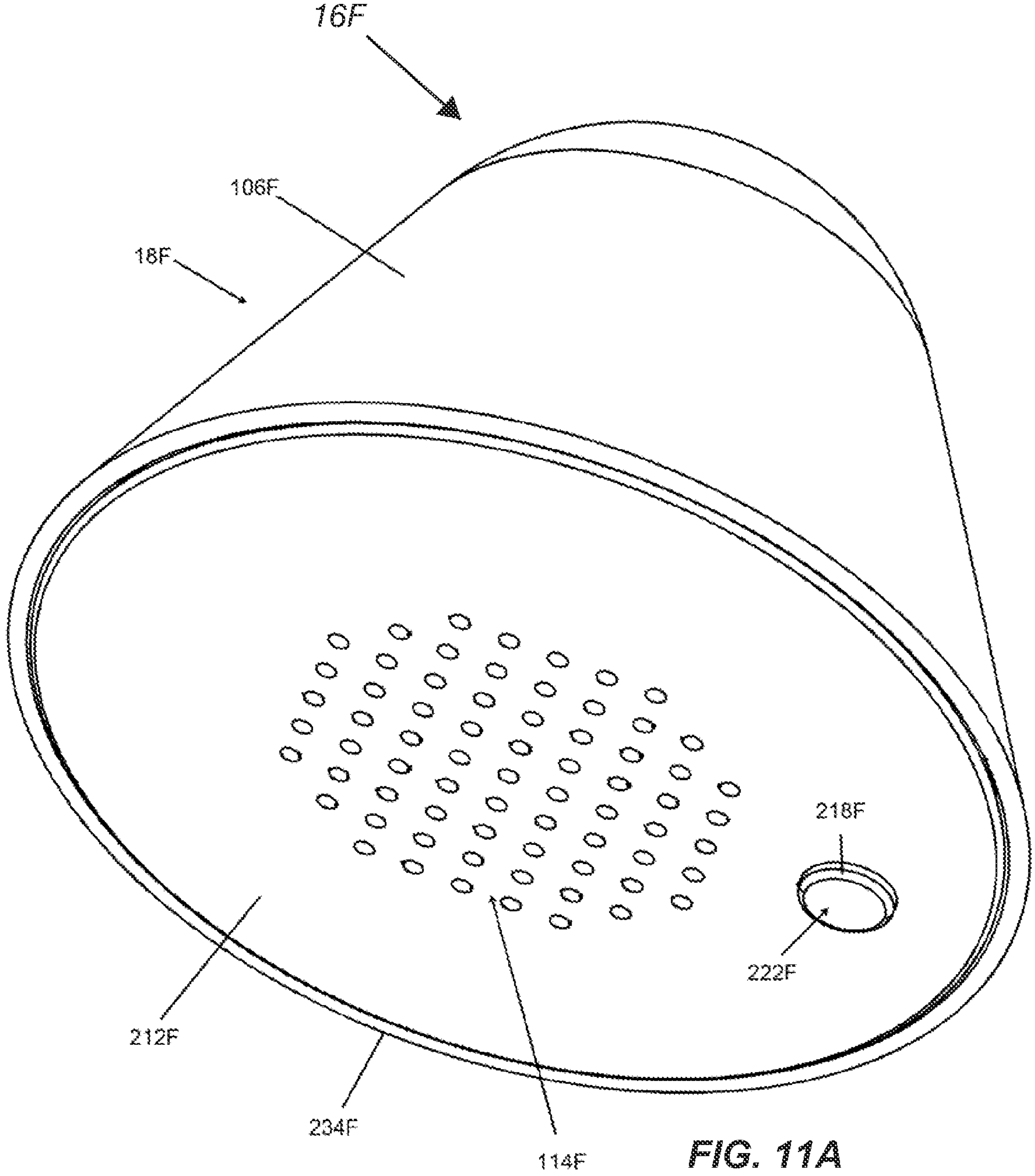
FIGS. 11A-11I are views a second device, such as a speaker assembly, shown in FIGS. 6A-6E.
Figure 11B:
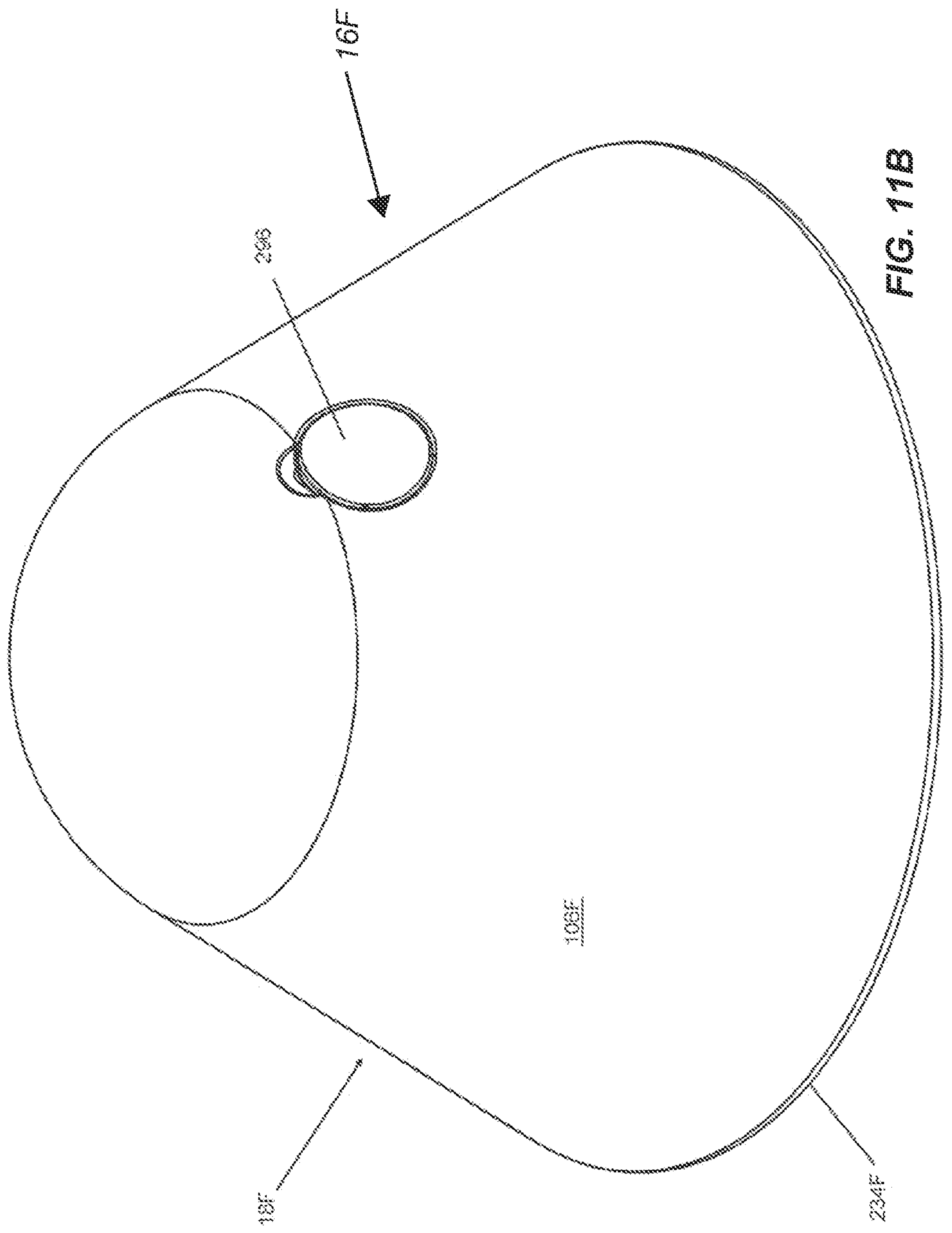
Figure 11C:
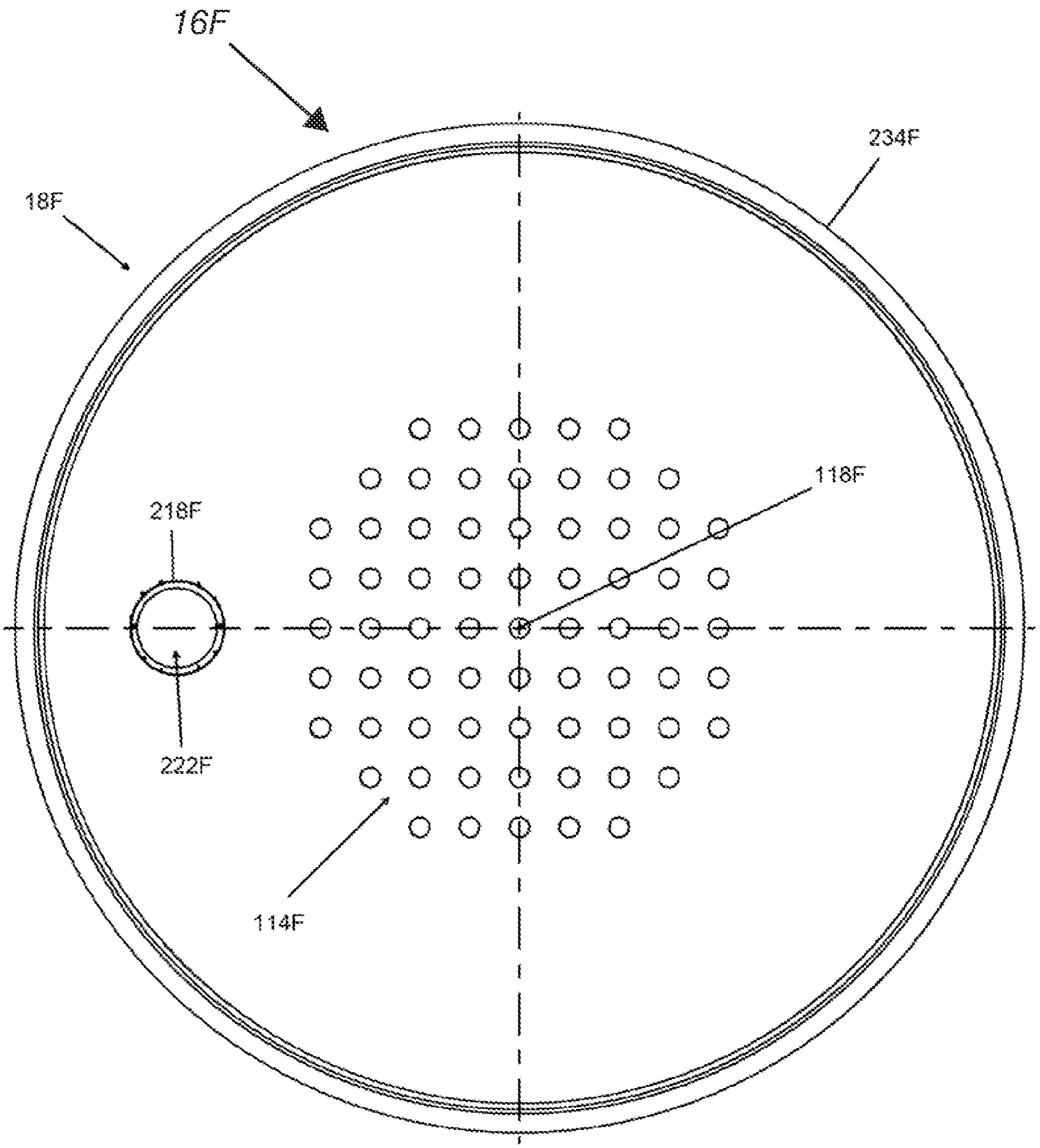
Figure 11D:
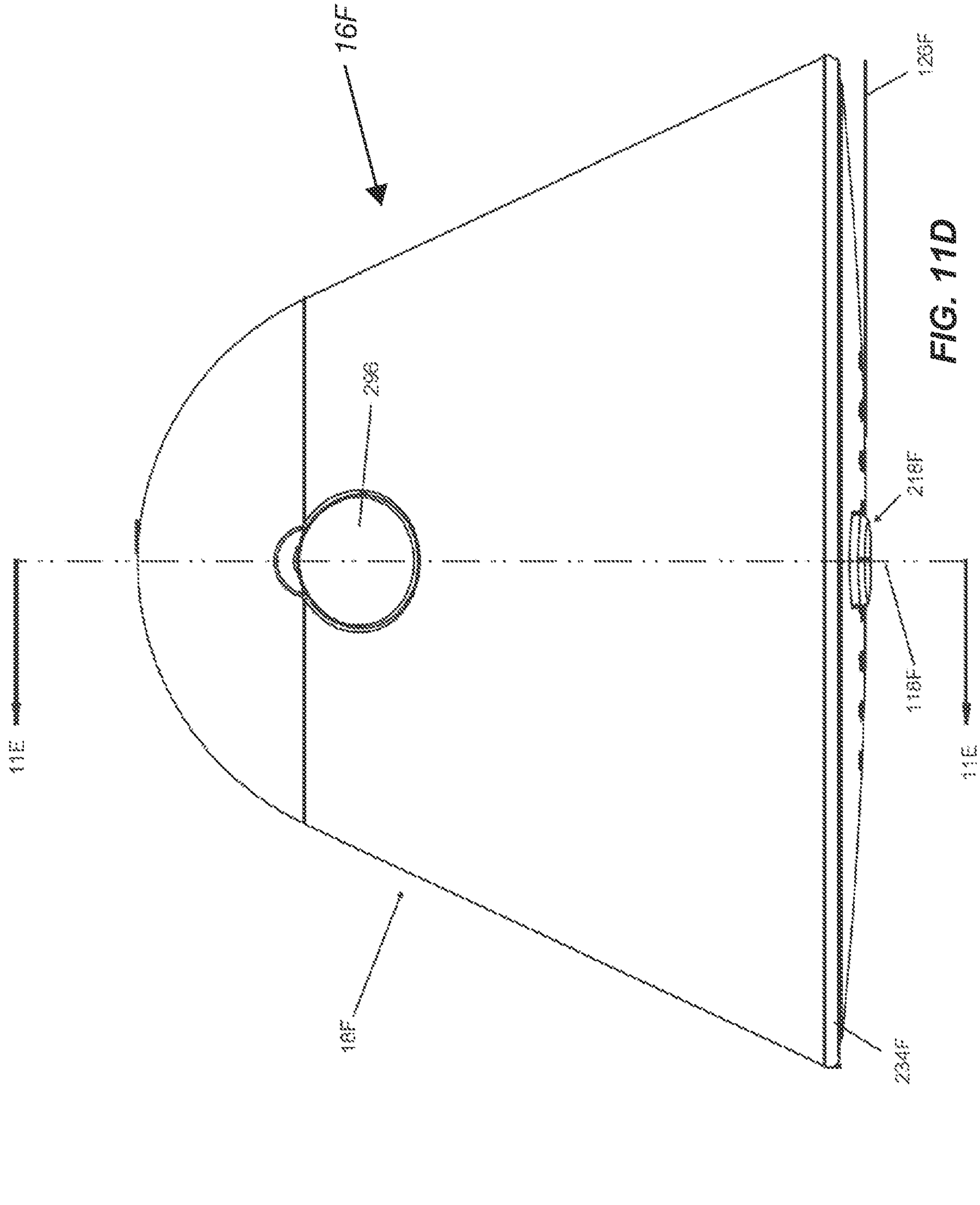
Figure 11E:
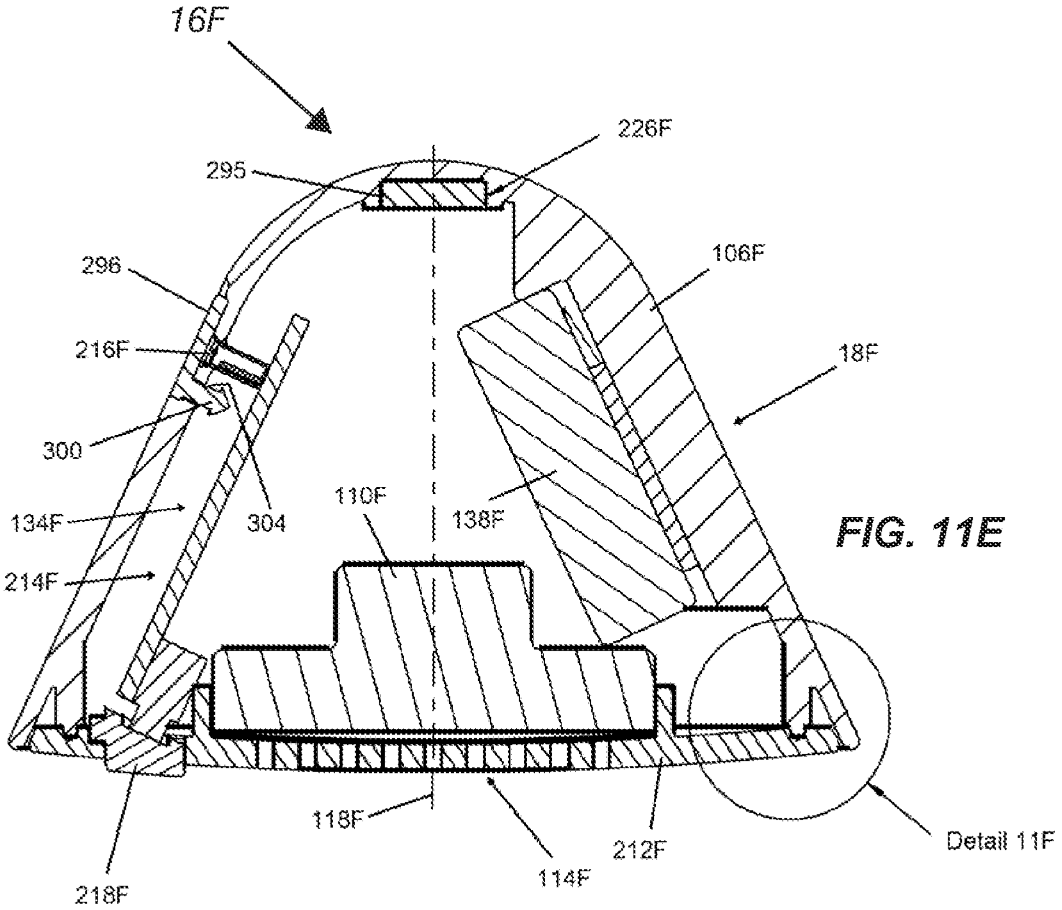
Figure 11F:
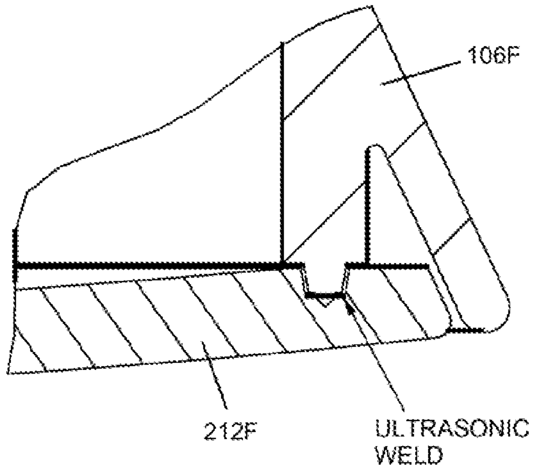
Figure 11G:
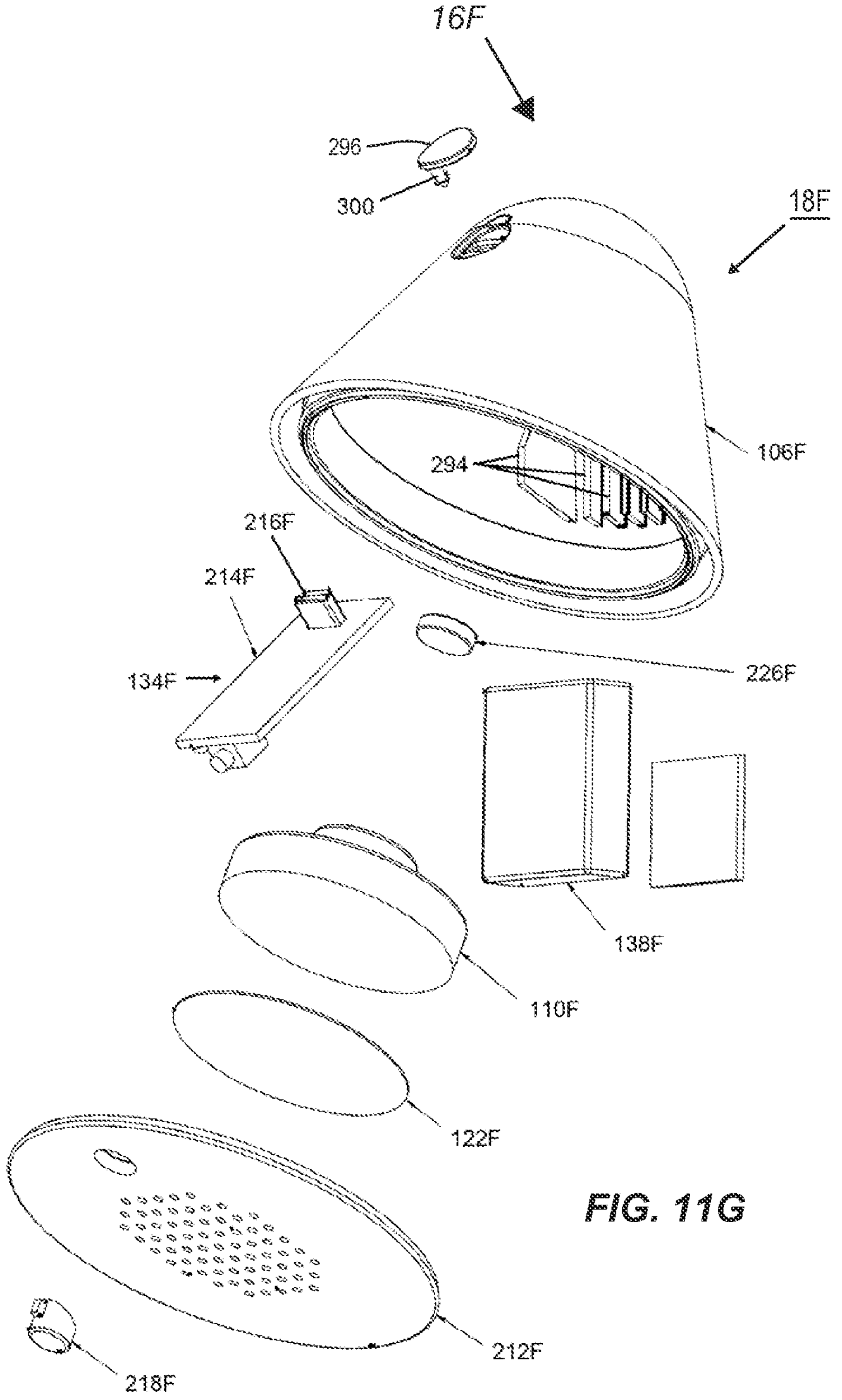
Figure 11H:
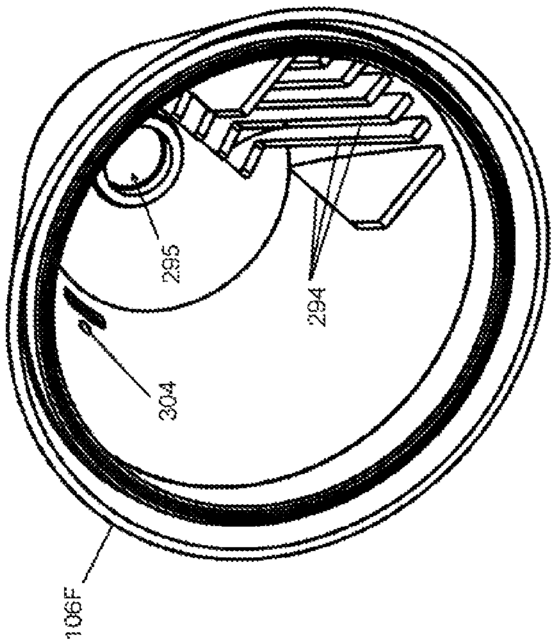
Figure 11I:
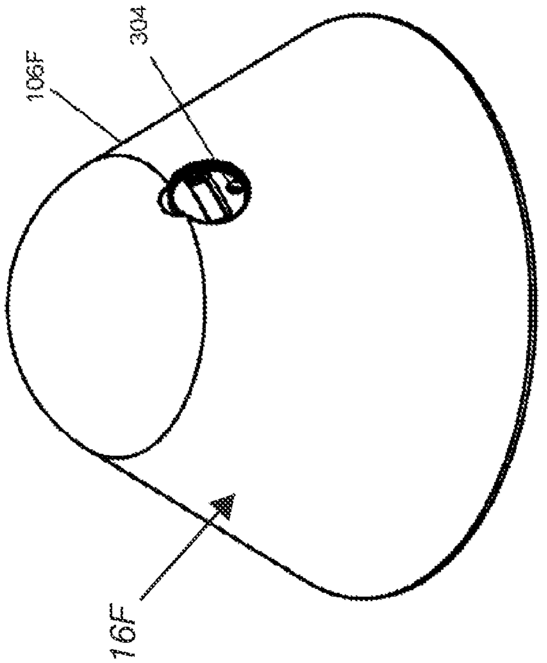

The second device 16F also includes (see FIGS. 10D, 11E and 11G) a printed circuit board (PCB) 214F connected to the output components 110F. The PCB 214F provides the communication components 134F and includes a port 216F (e.g., a mini-USB port) connectable to an external source (e.g., a power source (not shown) to charge the battery 138F, an audio source (not shown), etc.). In the illustrated construction, the housing 106F includes structure (e.g., ridges 294) to support components of the second device 16F (e.g., the battery 138F), in this case, in spaced relation from the wall of the housing 106F. As shown in FIGS. 10D, 11E and 11G, a magnet 226F is supported and connected to the housing 106F, for example, in a recess 295 by adhesive, (epoxy), press-fit, welding, etc.

The second device 16F includes a cover 296 to close the port 216F. The cover 296 includes (see FIGS. 10A, 10D, 11E and 11G) a barbed projection 300 which is inserted through an opening 304 (see FIGS. 10D, 11E and 11H-11I) in the housing 106F. In the closed position (see FIGS. 10A, 10D, 11B and 11D-11E), the cover 296 engages the housing 106F to provide a water-resistant or water-tight seal. The cover 296 is moved (e.g., pivoted about the projection 300, flexed, etc.) to uncover the port 216F. The cover 296 may be biased toward the closed position so that, when the port 216F is not in use, the cover 296 closes the port 216F.

Figure 12A:
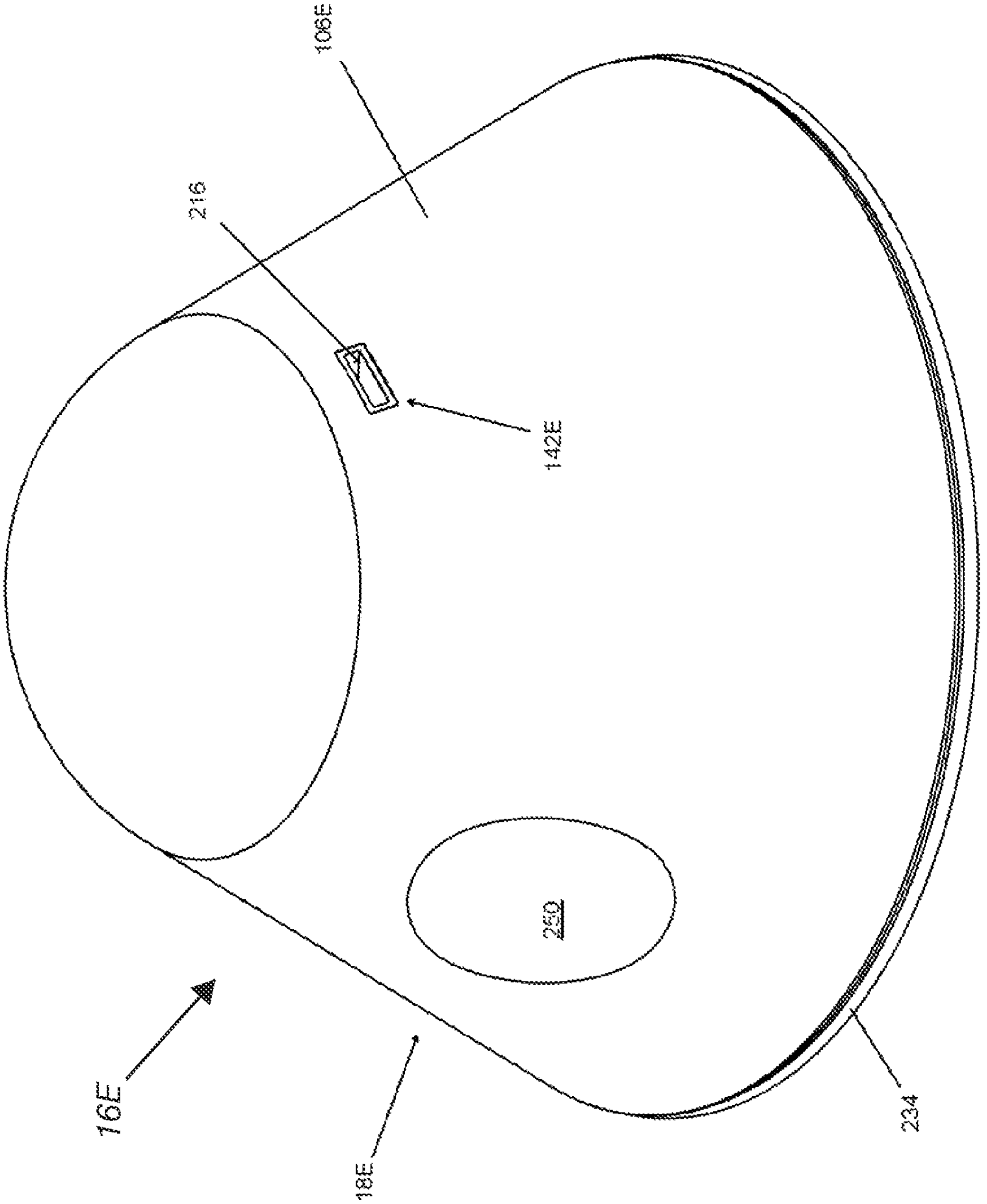
FIGS. 12A-12D are views of an alternative construction of a second device, such as a speaker assembly, shown in FIGS. 11A-11H.
Figure 12B:
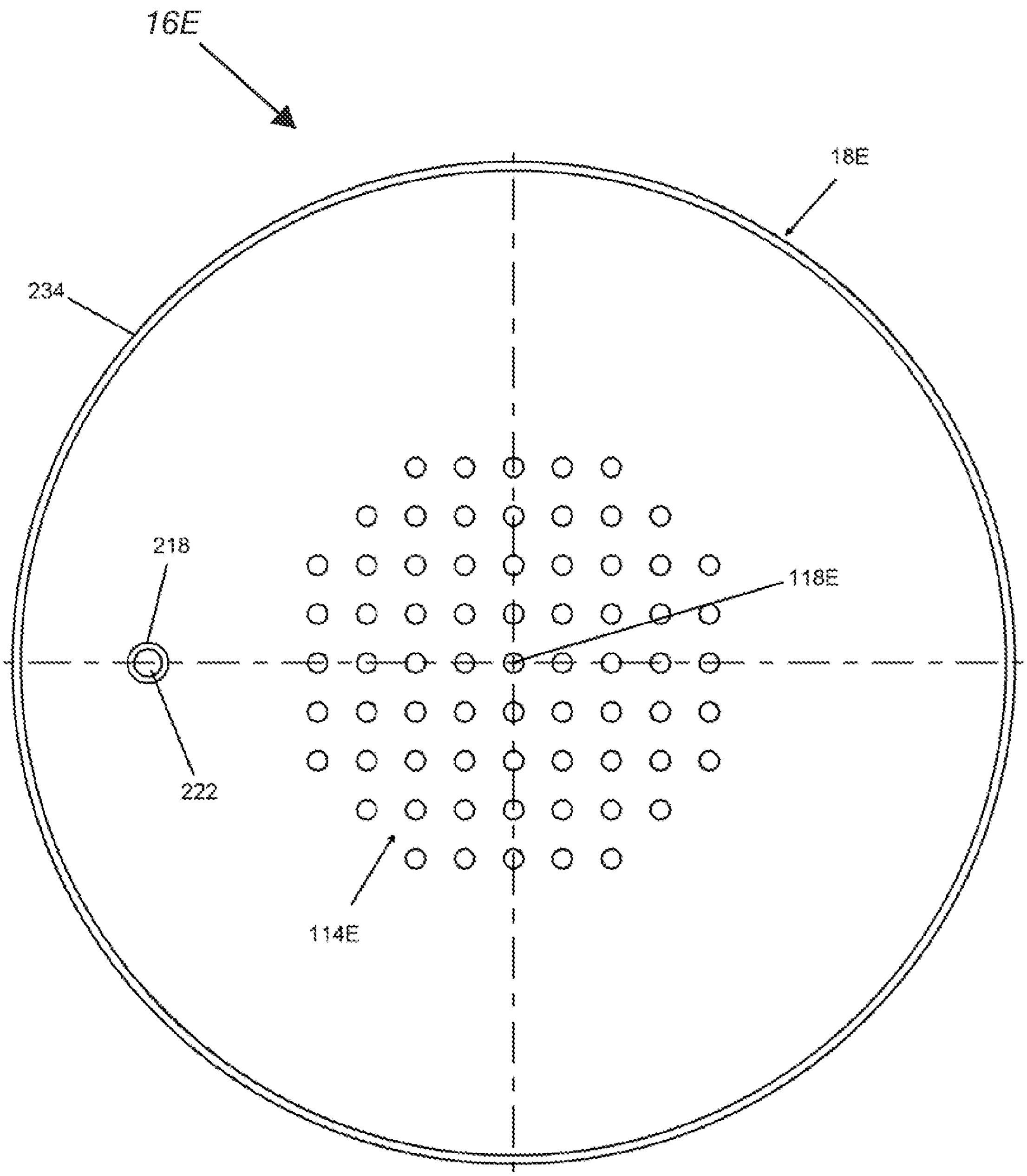

FIGS. 12A-12D illustrate an alternative construction of a second device 16E. As shown in FIG. 12A, a stop feature, such as a "flat" 250, is molded on housing 106E to prevent the second device 16E from moving (e.g., rolling) when supported on a flat surface (e.g., in use on a countertop, during charging, etc.). The second device 16E may have another stop feature shape (e.g., a two-dot pattern texture (not shown), raised ridges 252 (see FIGS. 13-16)) on the housing 106E acting in a similar manner.

As illustrated (see FIGS. 12A and 12C), a cover is not provided for the port 216. When used with a shower device 14E, the wall of the receptacle 94E covers the port 216 to inhibit water from entering the port 216. In other constructions, a separate cover (not shown but similar to the cover 296 in FIGS. 11B, 11D, 11E and 11G) for the port 216 may be provided.

Figure 12C:
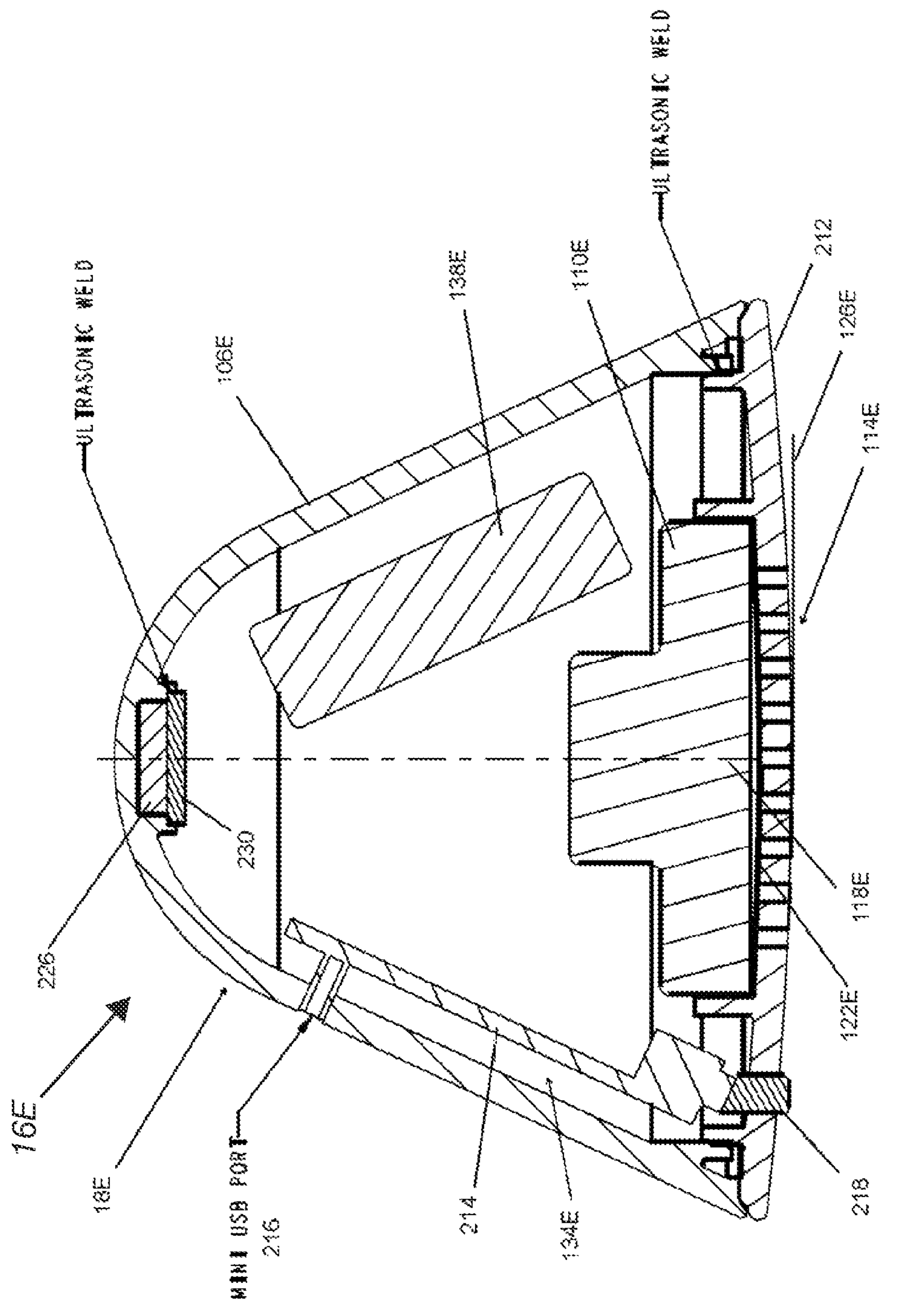
Figure 12D:
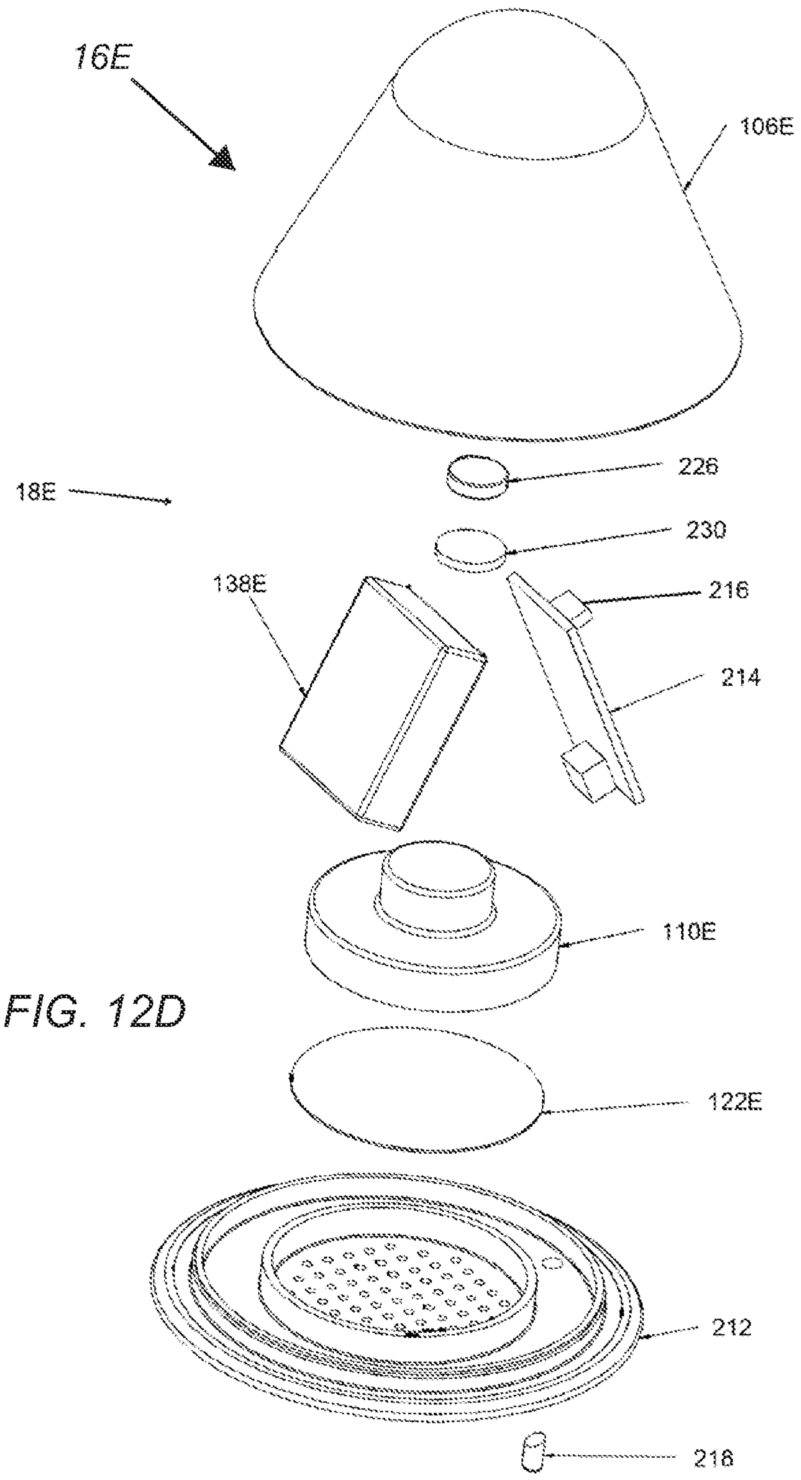
Figure 13A:
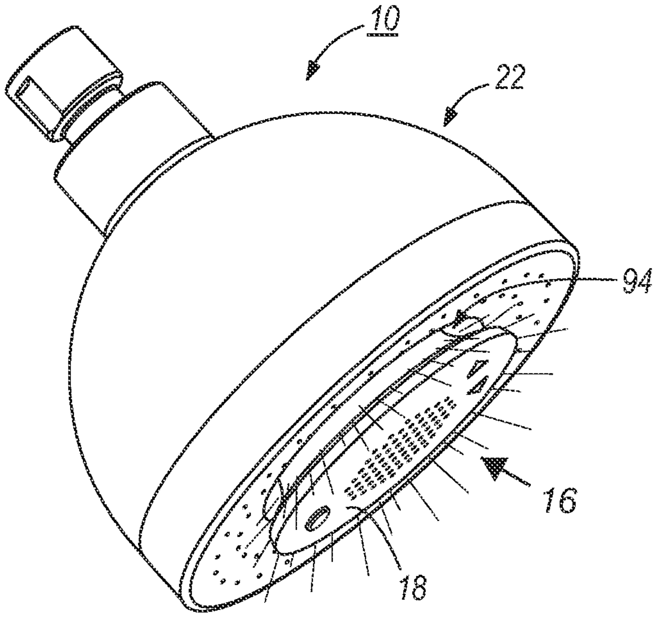
FIGS. 13A-13B are views of yet another alternative construction of a shower assembly.
Figure 13B:
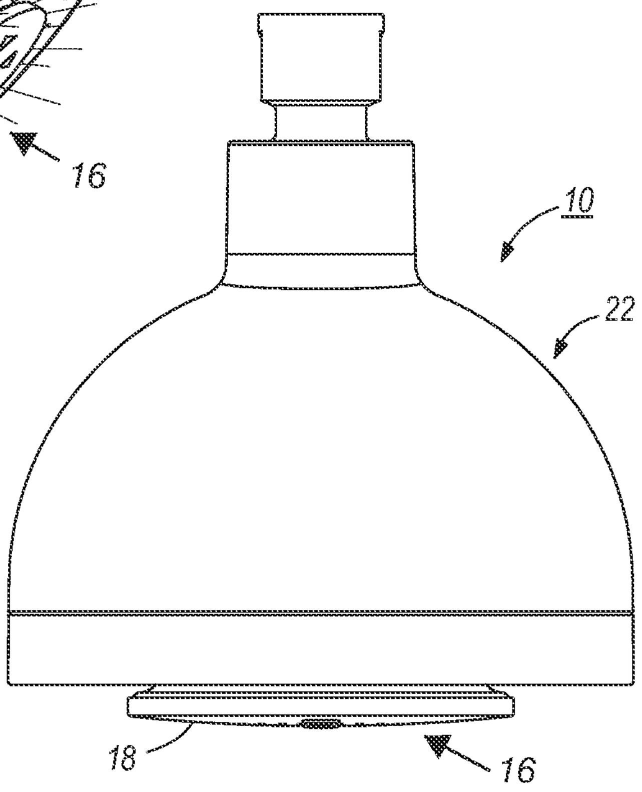
Figure 13C:
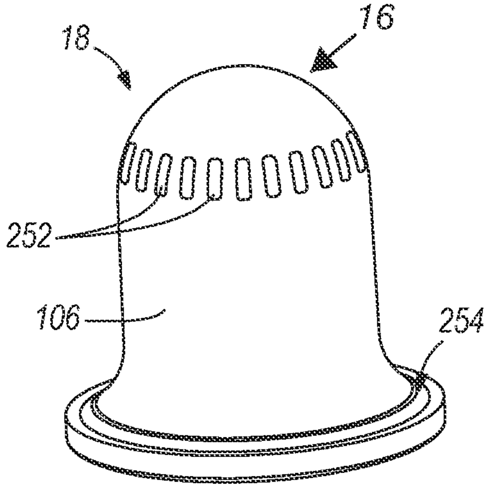
FIGS. 13C-13D are views of a second device, such as a speaker, shown in FIGS. 13A-13B, removed from the shower device.
Figure 13D:
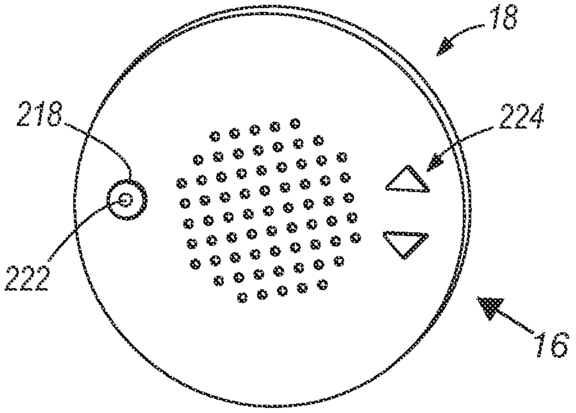
Figure 14A:
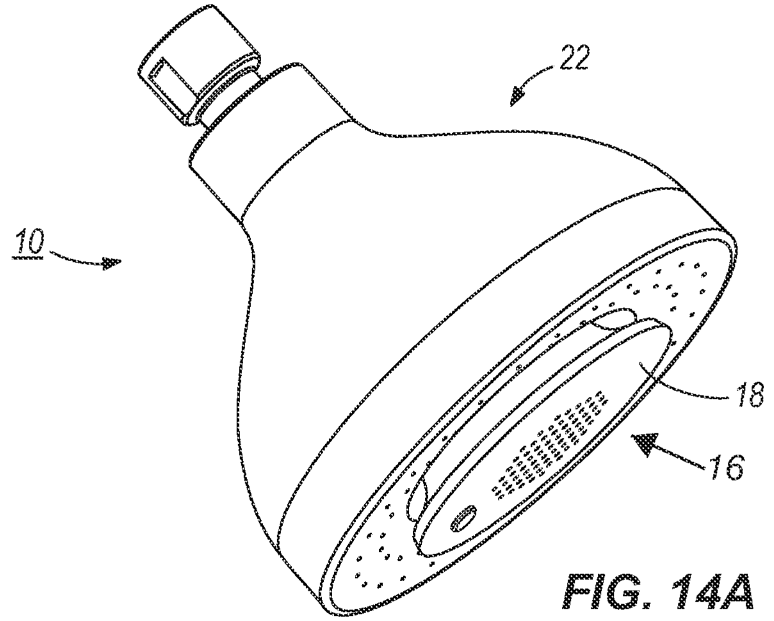
FIGS. 14A-14B are views of a further alternative construction of a shower assembly.
Figure 14B:
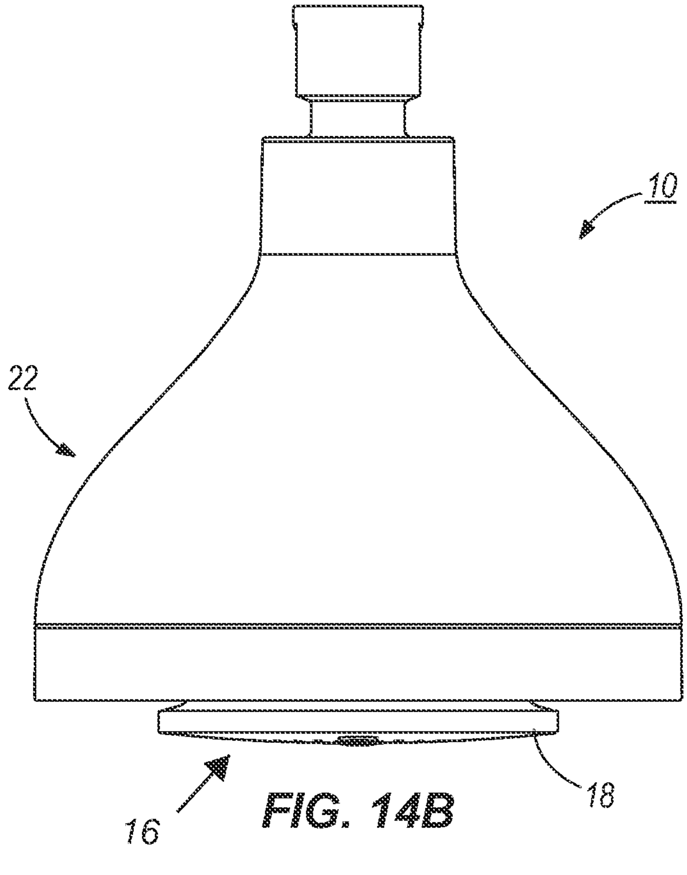
Figure 15A:
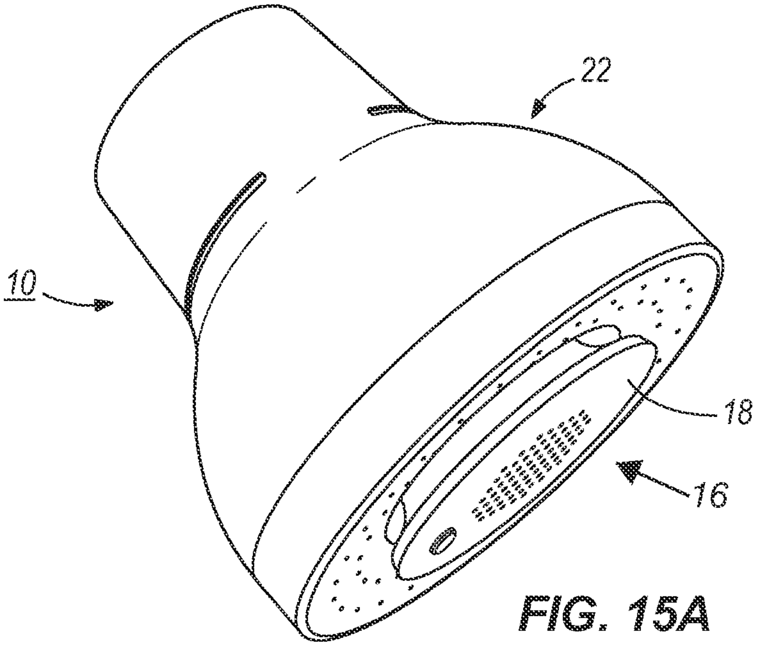
FIGS. 15A-15B are views of another alternative construction of a shower assembly.
Figure 15B:
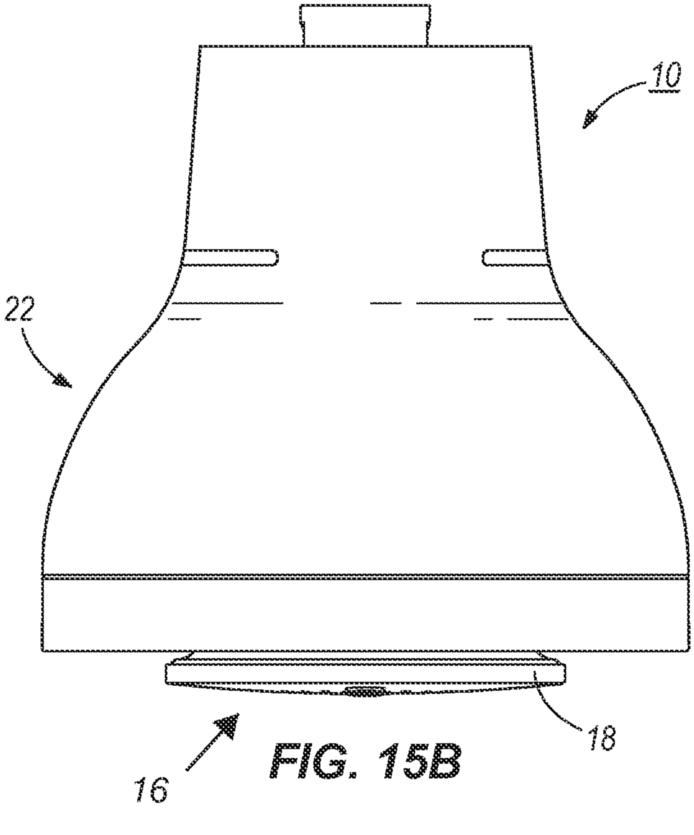
Figure 16A:
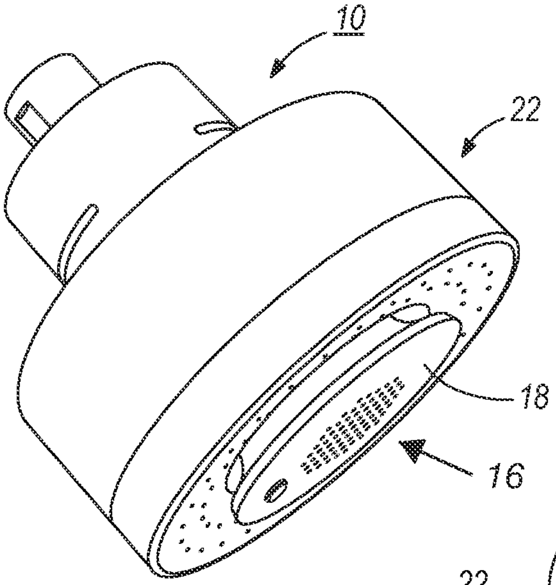
FIGS. 16A-16C are views of yet another alternative construction of a shower assembly.
Figure 16B:
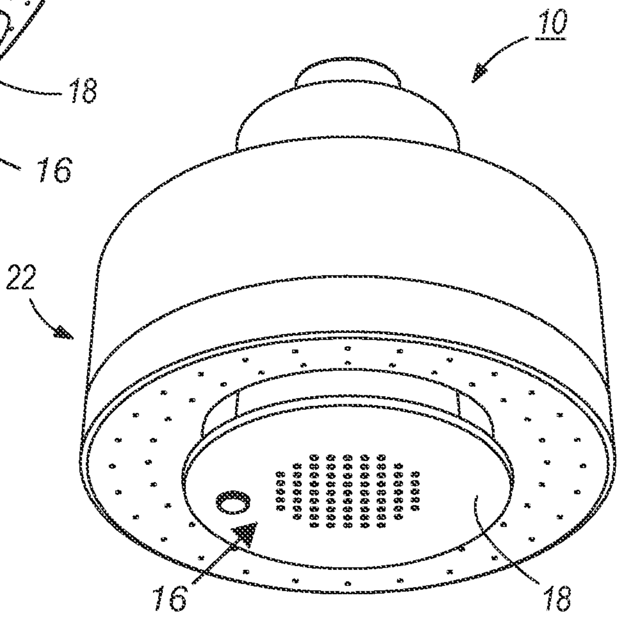
Figure 16C:
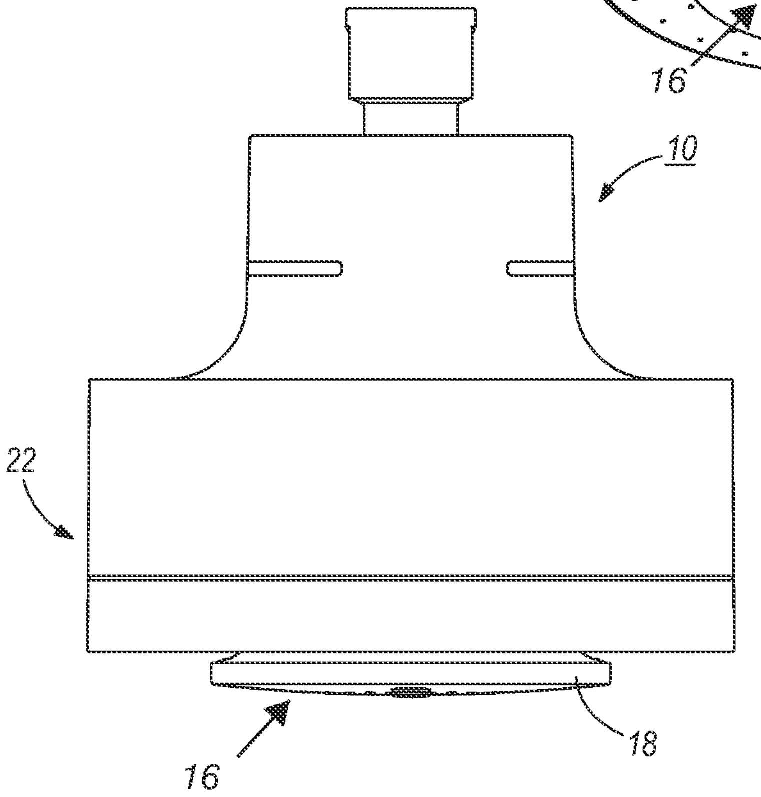
Figure 17A:
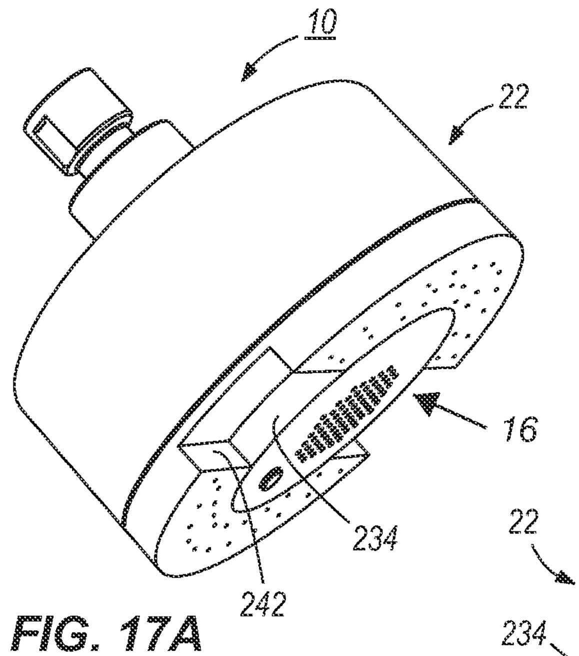
FIGS. 17A-17C are views of a further alternative construction of a shower assembly.
Figure 17B:
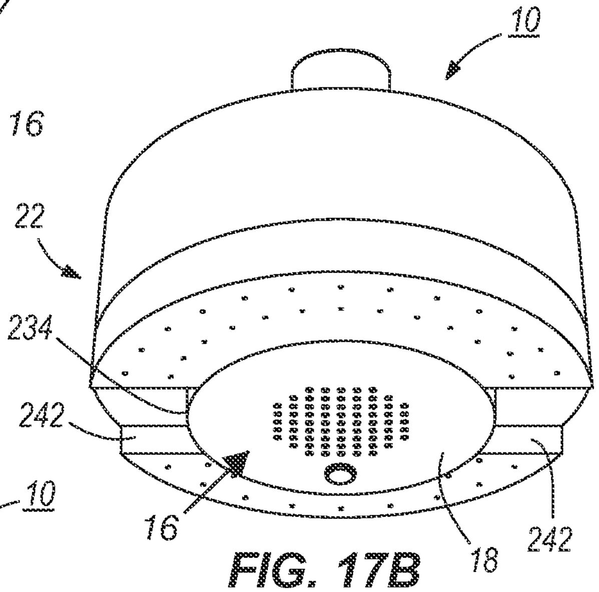
Figure 17C:
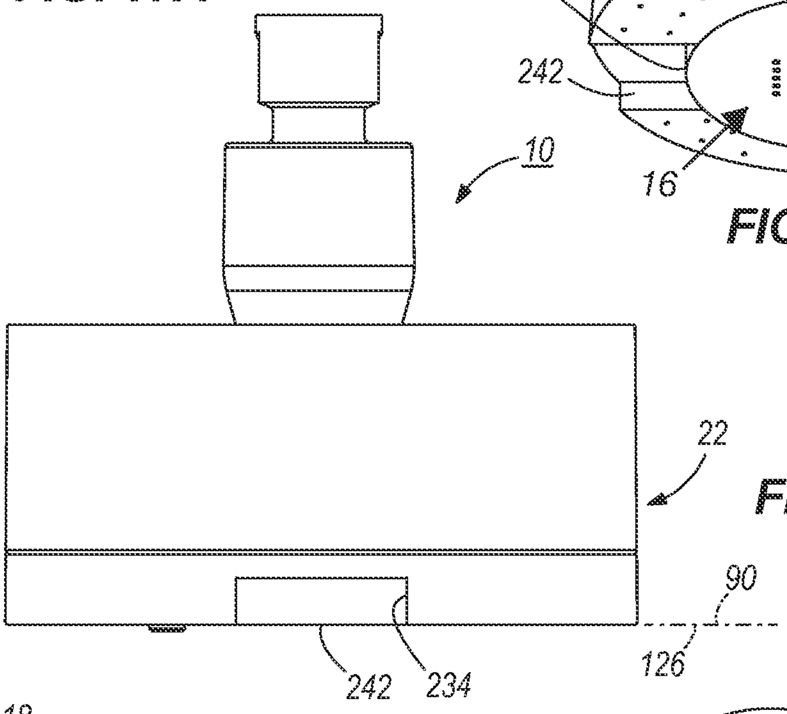
Figure 17D:
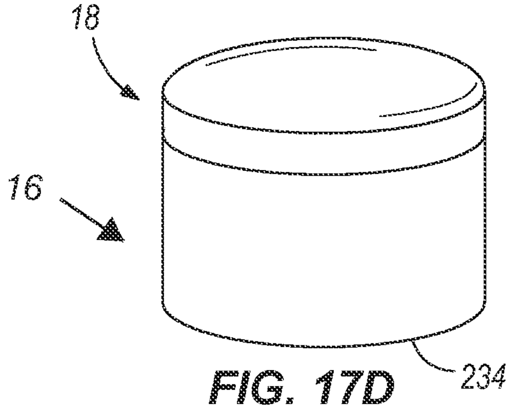
FIGS. 17D-17E are views of a second device, such as a speaker, shown in FIGS. 17A-17C, removed from the shower device.
Figure 17E:
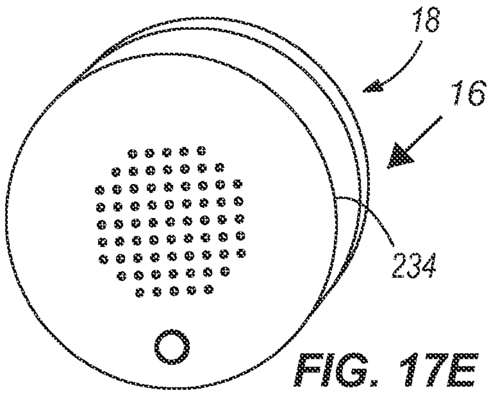
Figure 18A:
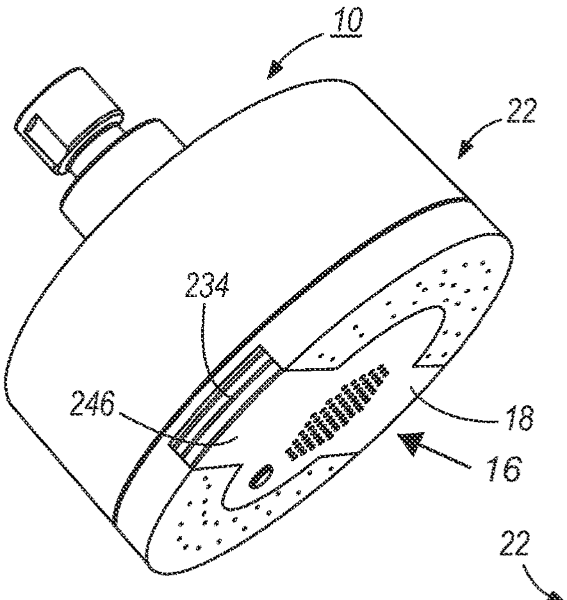
FIGS. 18A-18C are views of another alternative construction of a shower assembly.
Figure 18B:
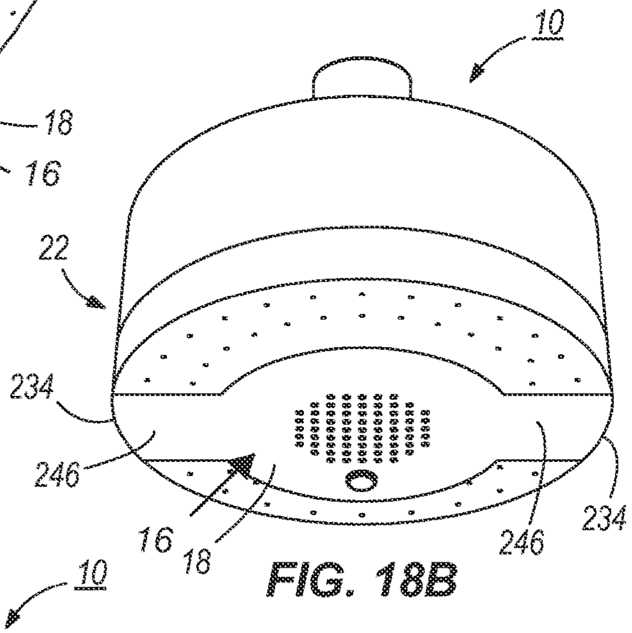
Figure 18C:
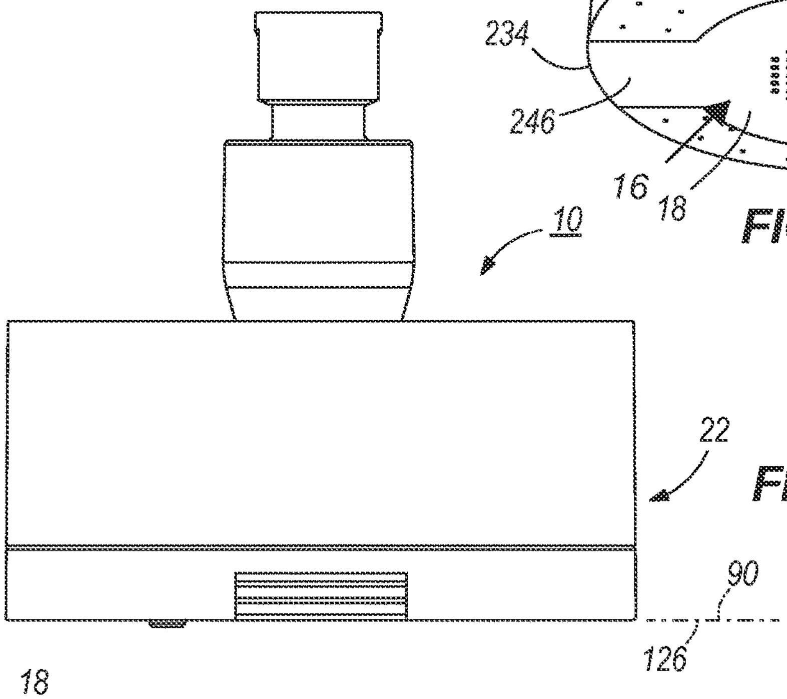
Figure 18D:
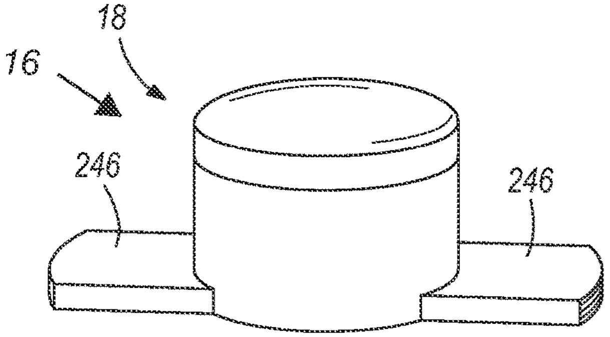
FIGS. 18D-18E are views of a second device, such as a speaker, shown in FIGS. 18A-18C, removed from the shower device.
Figure 18E:
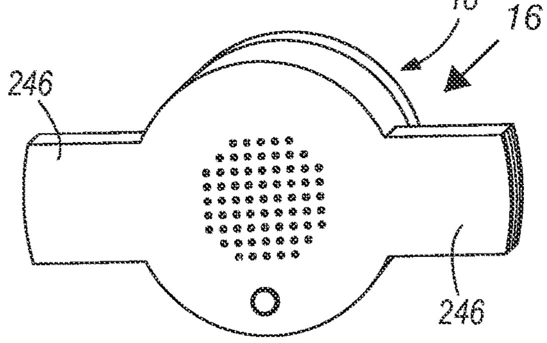
Figure 19:
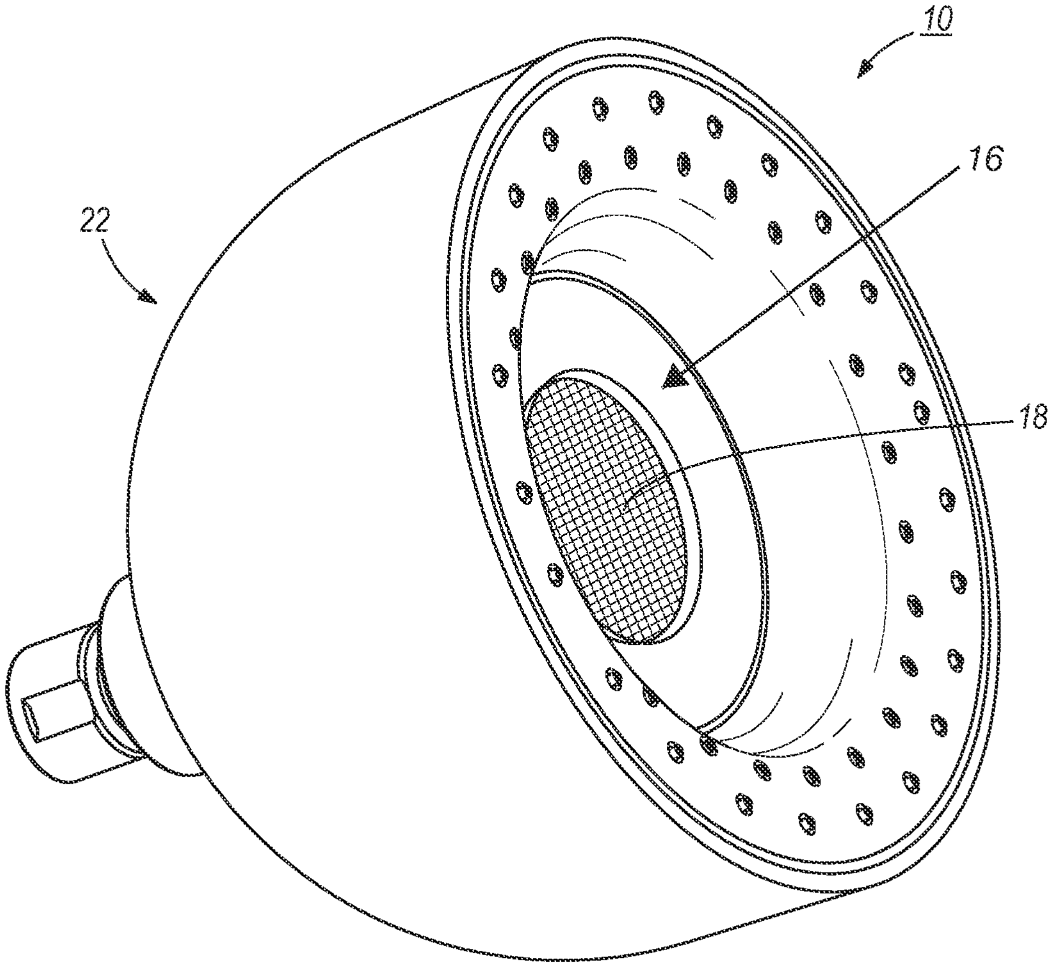
FIG. 19 is a perspective view of yet another alternative construction of a shower assembly.

As shown in FIGS. 12C-12D, a magnet 226 is supported on the housing 106E, and a cap 230 covers the magnet 226. The cap 230 is connected to the housing 106E to enclose the magnet 230 in the housing 106E, for example, by welding (e.g., ultrasonic), adhesive, etc.

As shown in FIGS. 6D-6E and 8C-8F, the waterway assembly 190F (members 194F, 198F, 264) include cooperating recesses to provide the receptacle 94F. In the assembly 10F, the second device 16F (e.g., the speaker 18F) is inserted into and removed from the receptacle 94F through the front of the showerhead 22F. In the illustrated construction, the waterway 46F is annular and extends around the receptacle 94F. Water enters the showerhead 22F and is directed to the inlet chamber 102F behind the second device 16F. Water flows from the shower inlet 38F to the shower outlets 66F and is diverted around the second device 16F.

Figure 6A:
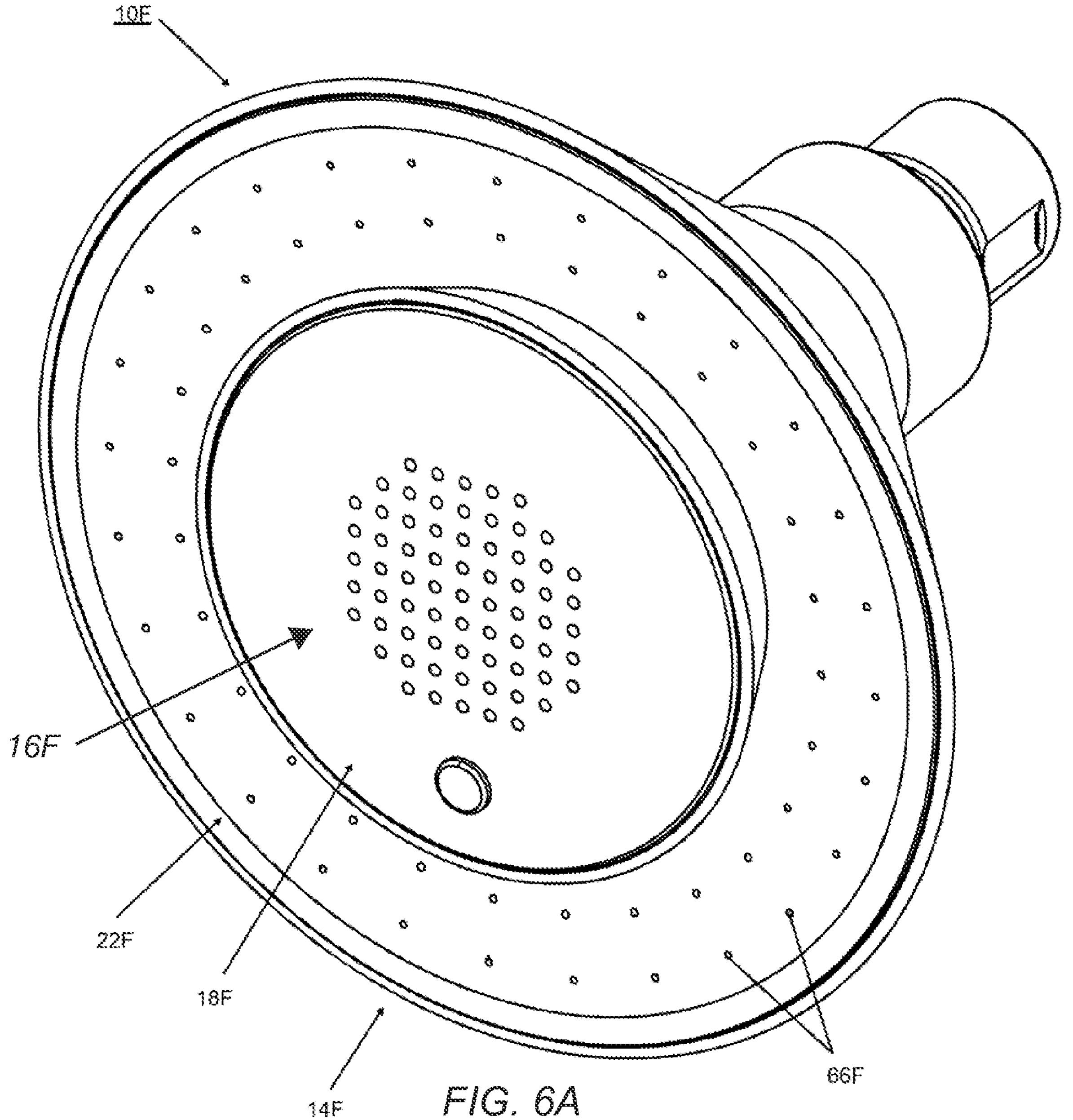
FIG. 6A-6E are views of another alternative construction of a shower assembly.
Figure 6B:
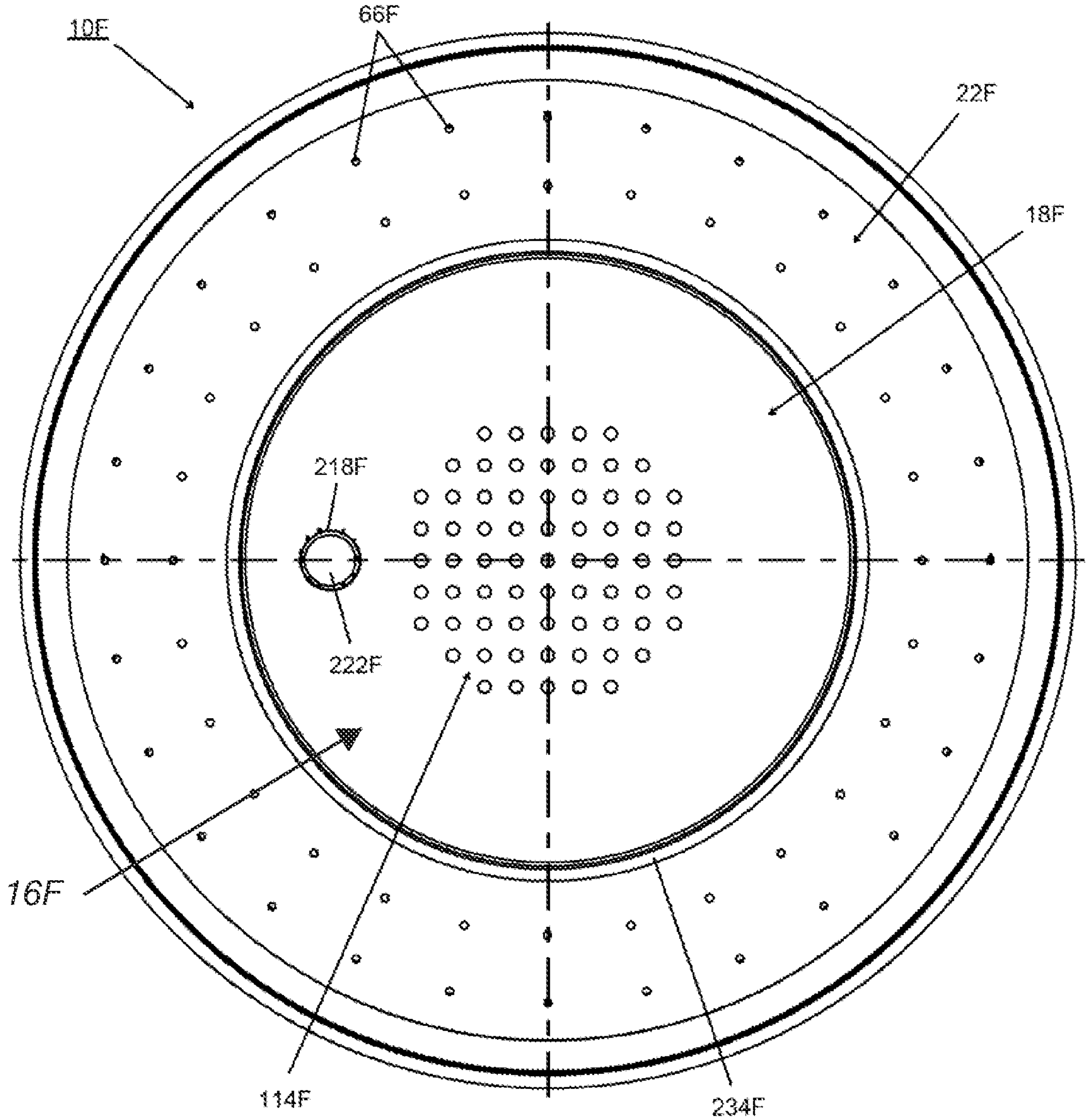
Figure 6C:
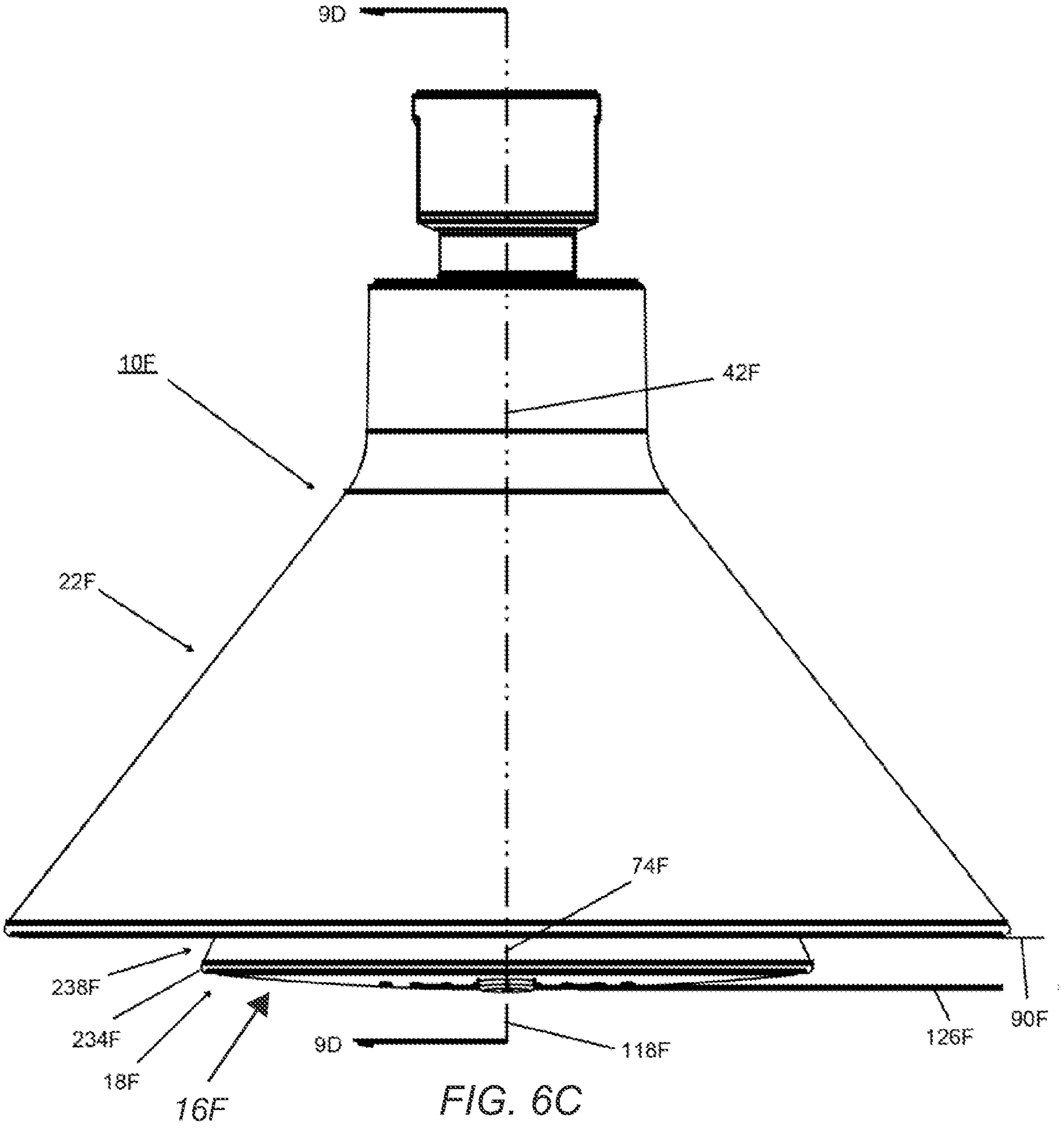
Figure 6D:
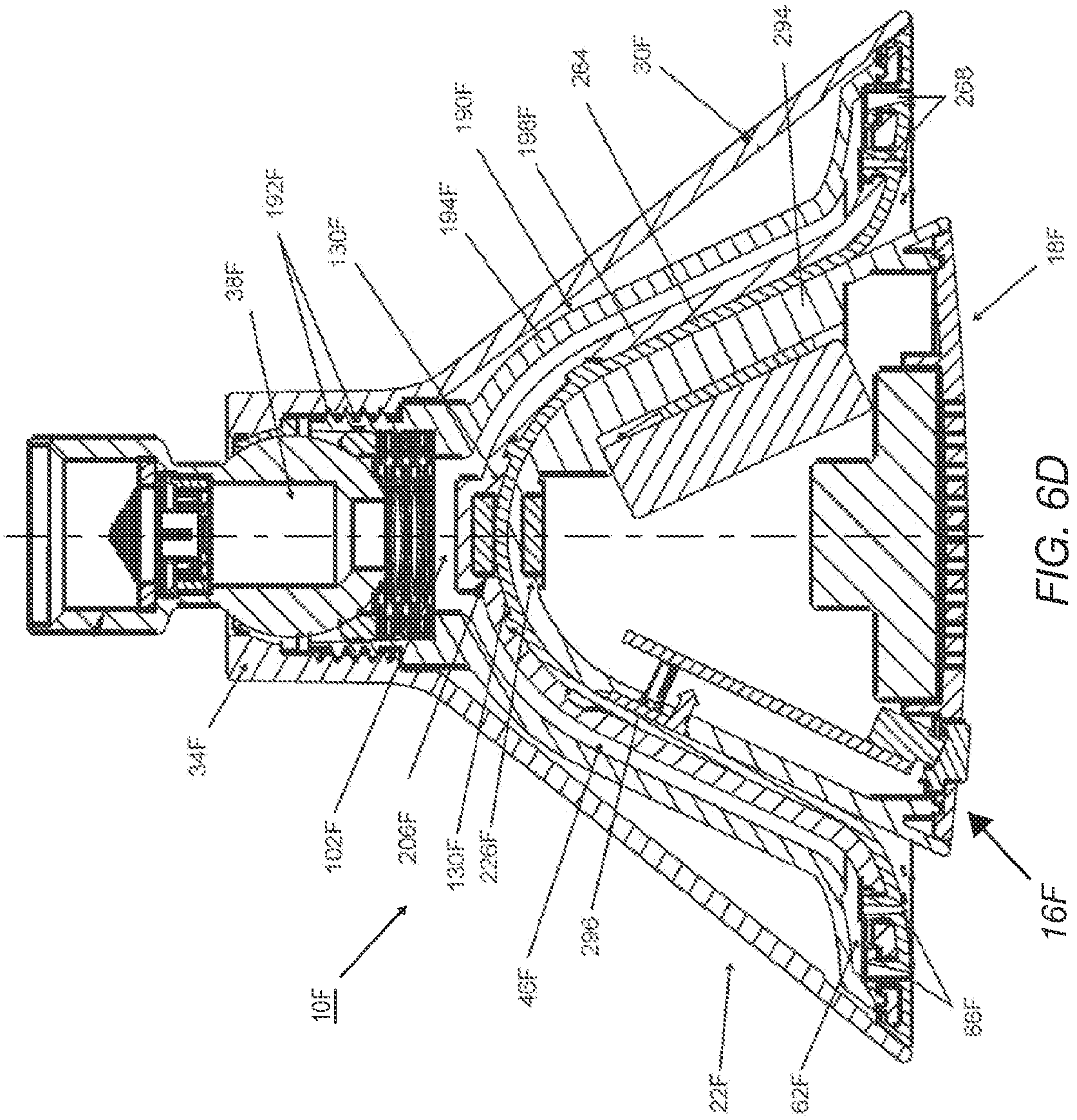
Figure 6E:
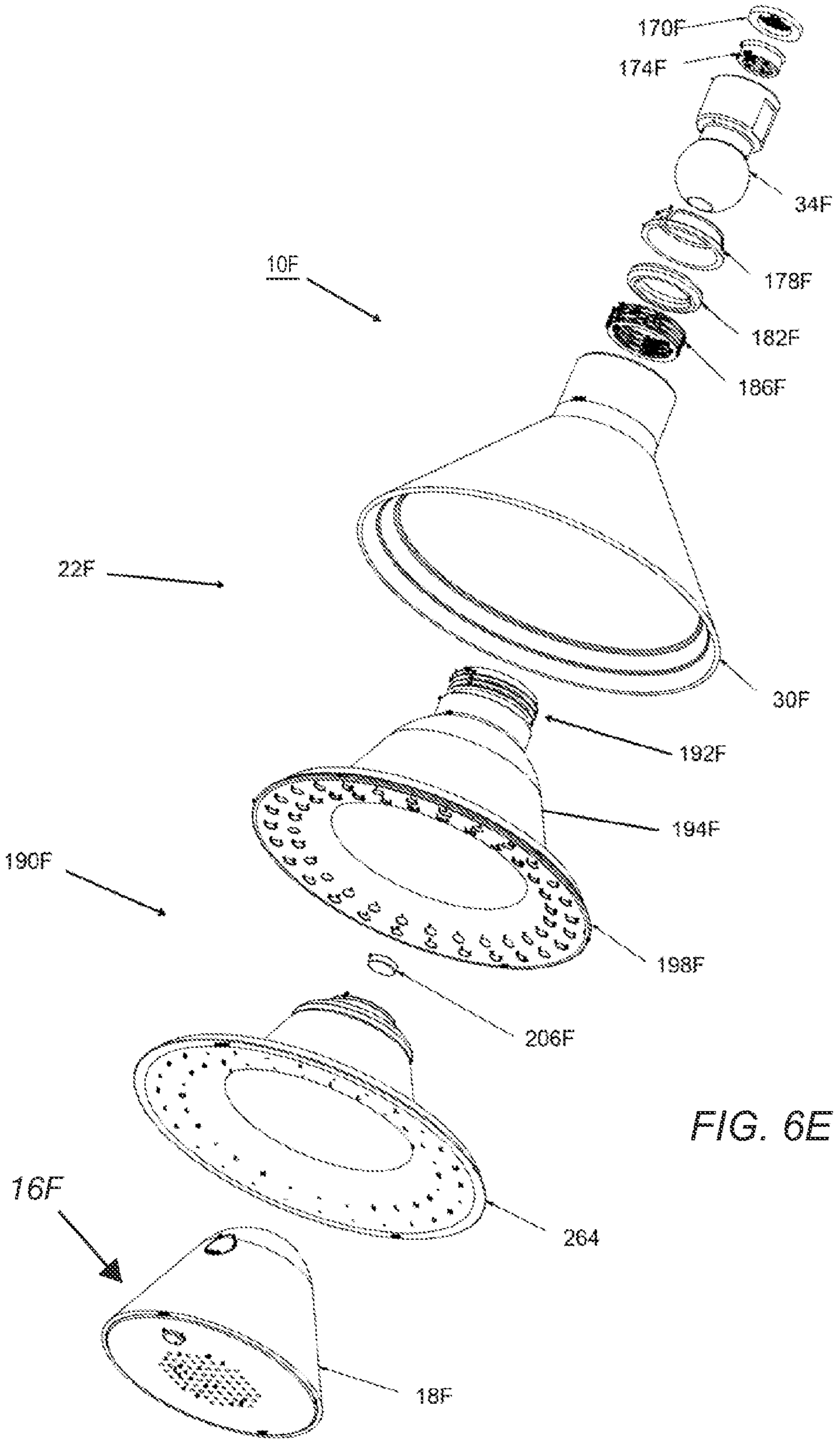
Figure 7A:
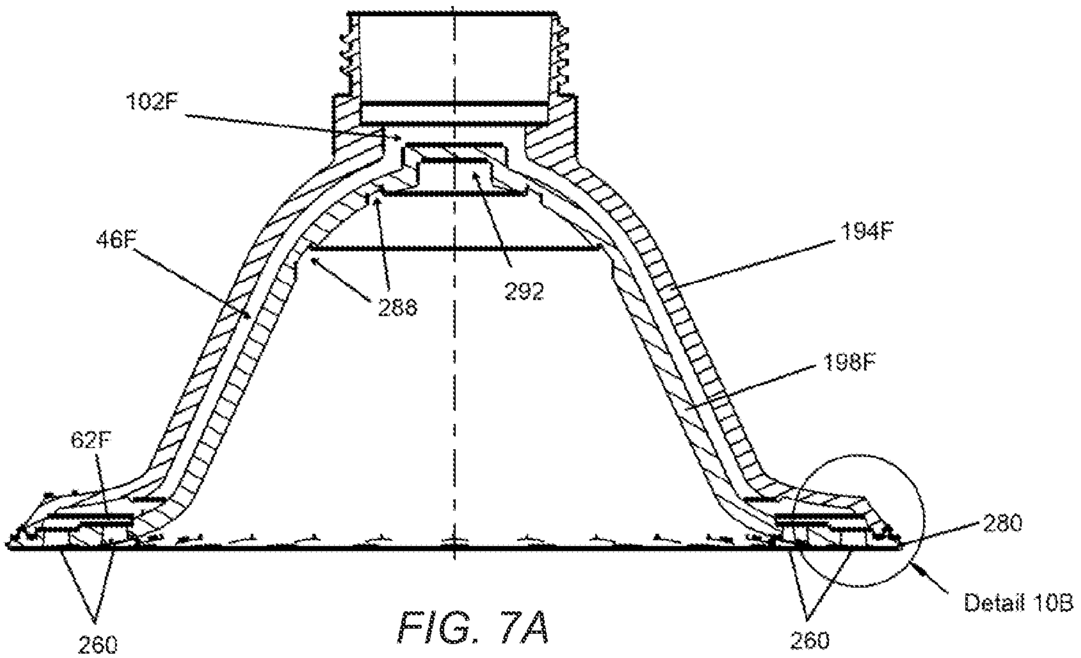
FIGS. 7A-7H are views of components of a waterway assembly of the shower assembly shown in FIGS. 6A-6E.
Figure 7B:
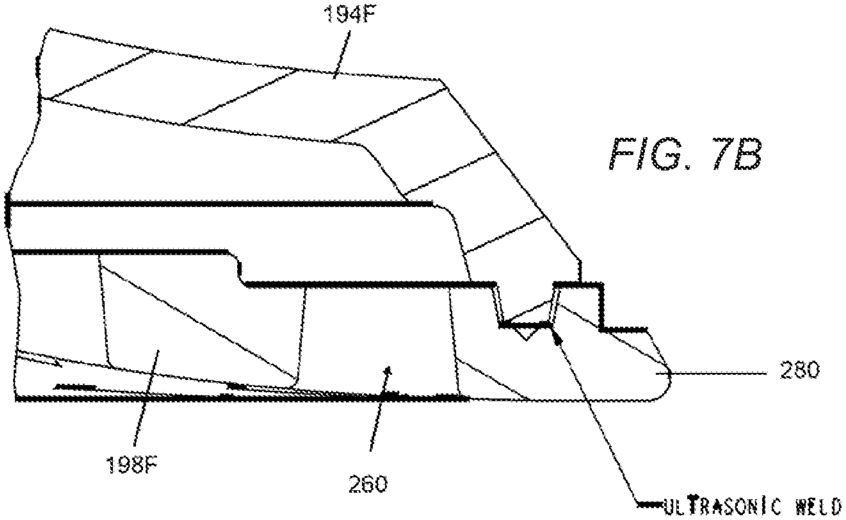
Figure 7C:
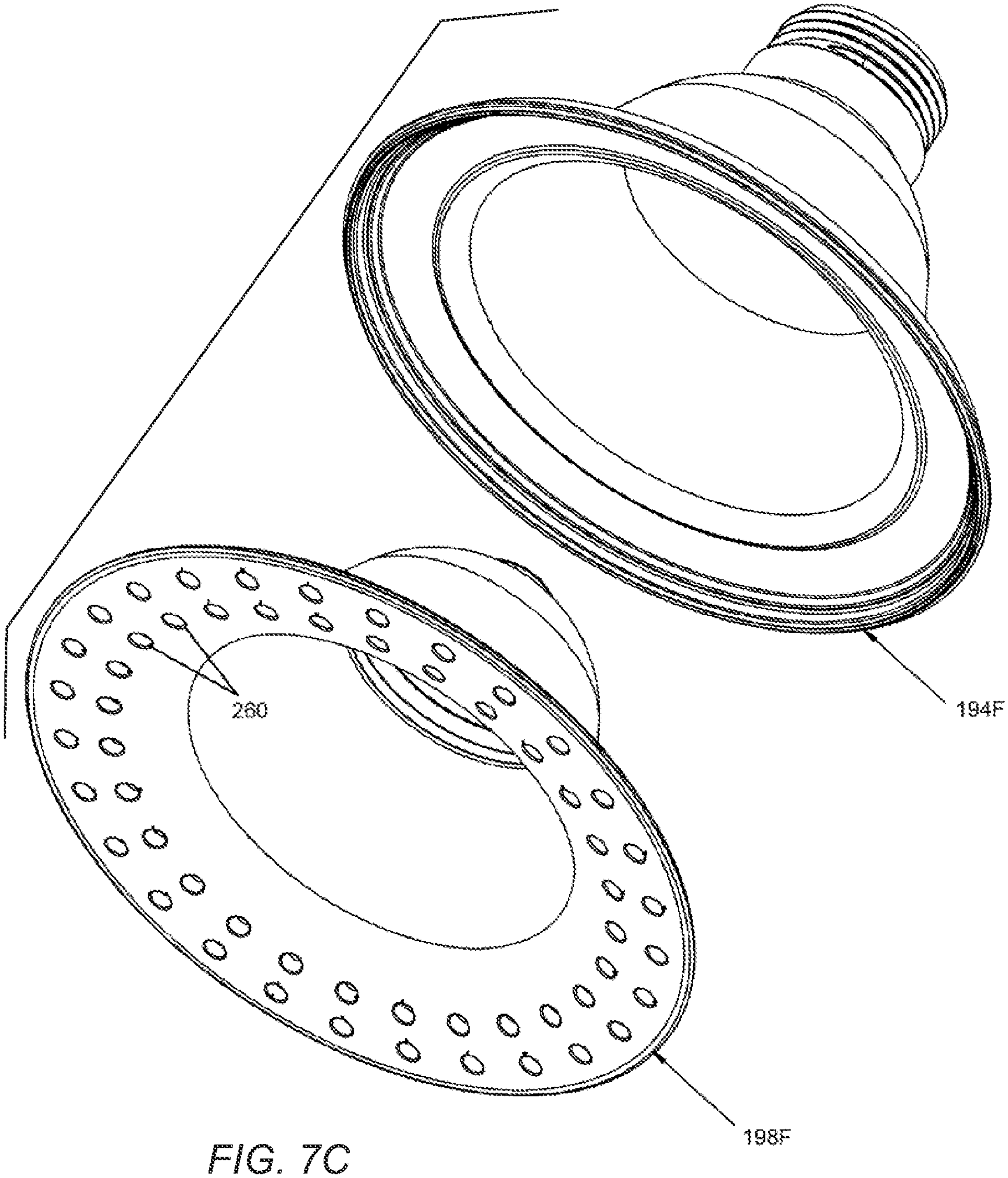
Figure 7E:
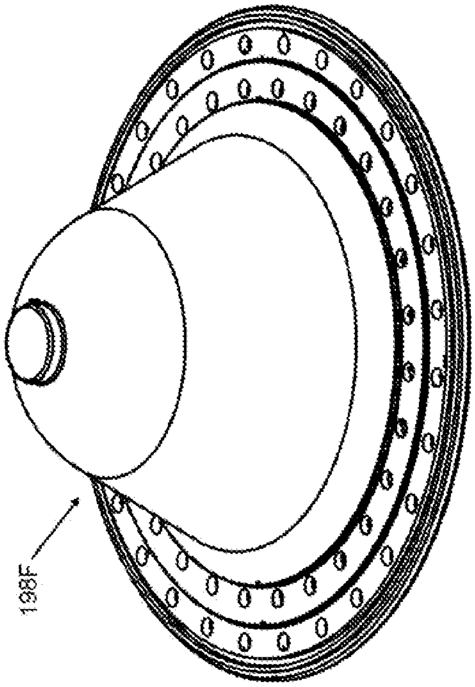
Figure 7D:
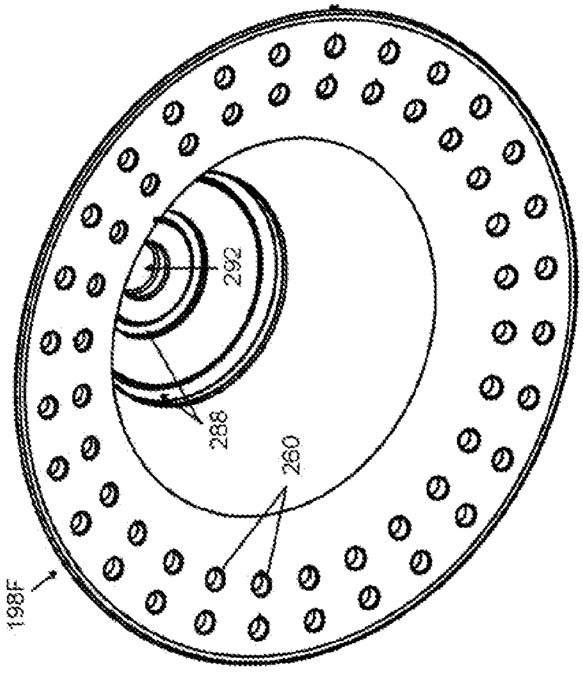
Figure 7G:
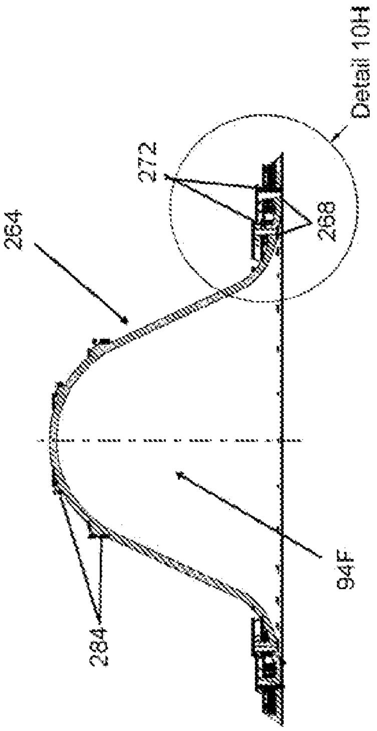
Figure 7F:
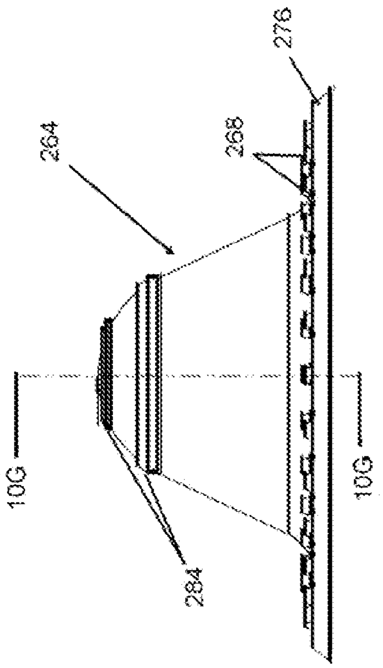
Figure 7H:
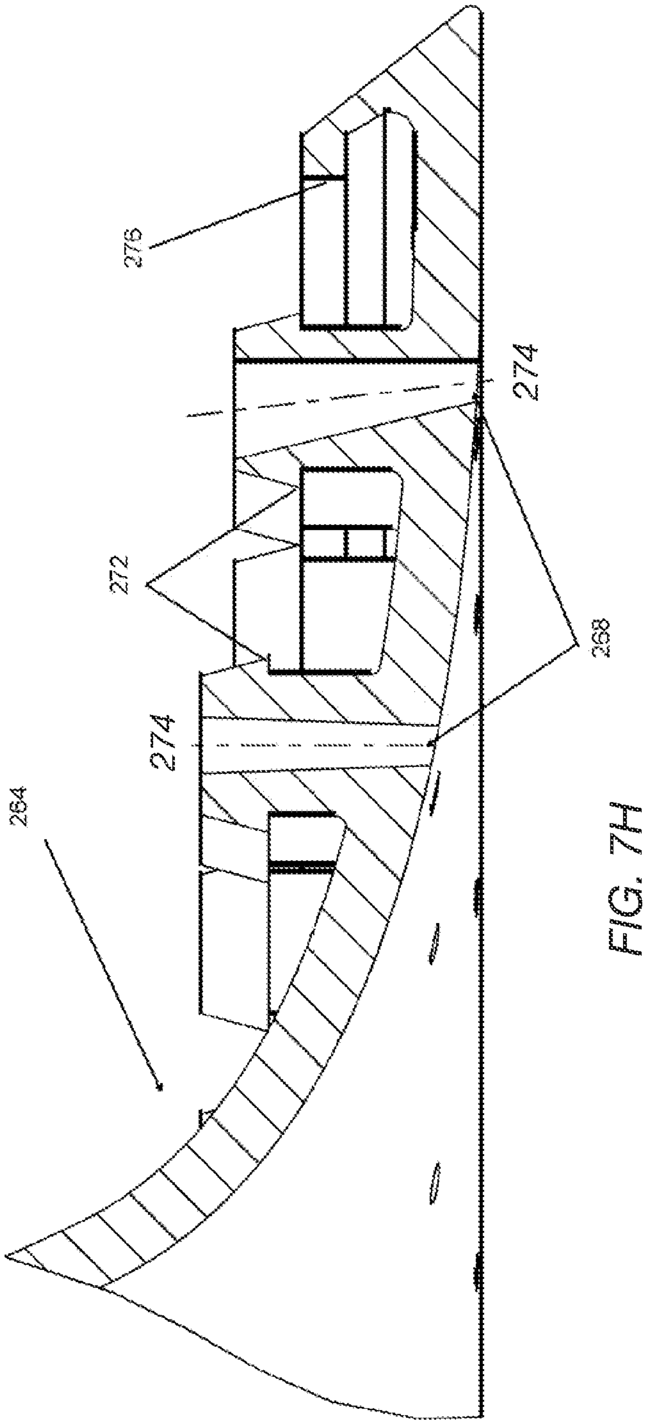
Figure 8A:
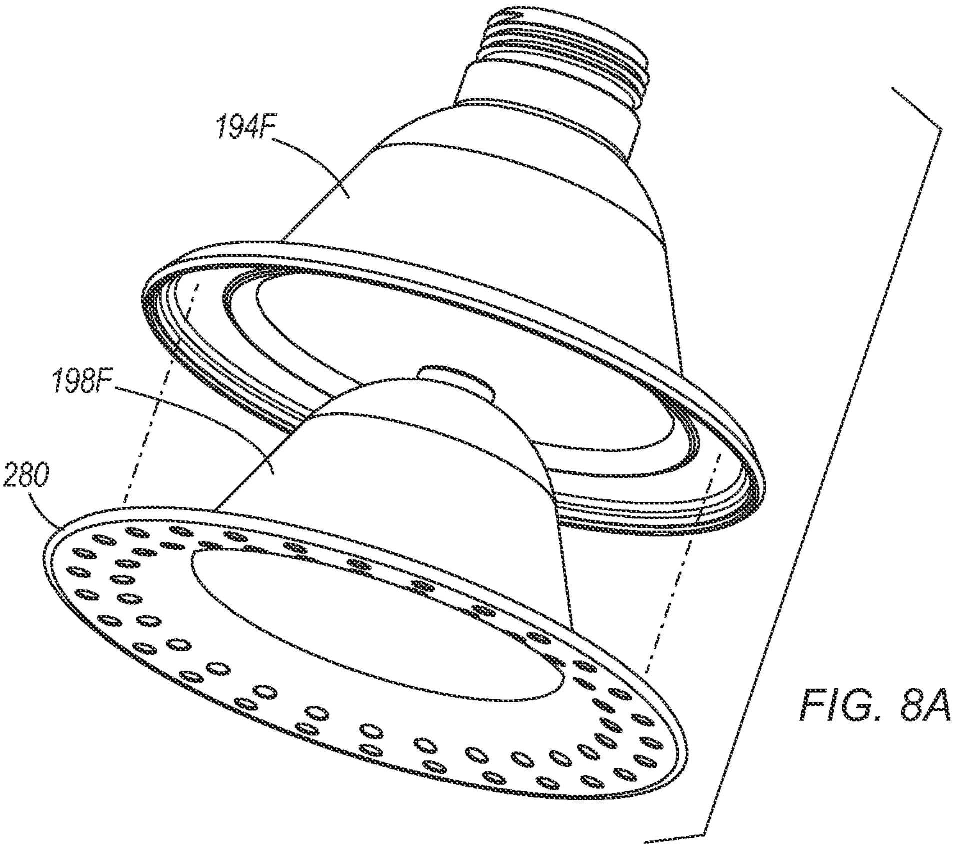
FIGS. 8A-8F illustrate a process for assembling the shower assembly shown in FIG. 6-7.
Figure 8B:
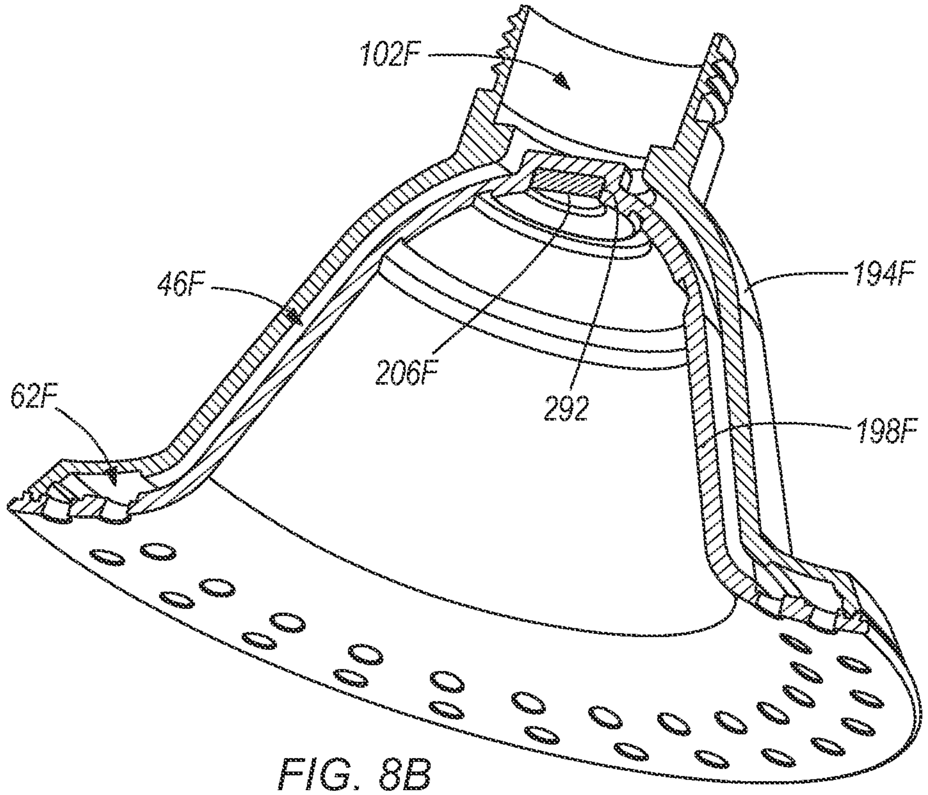
Figure 8C:
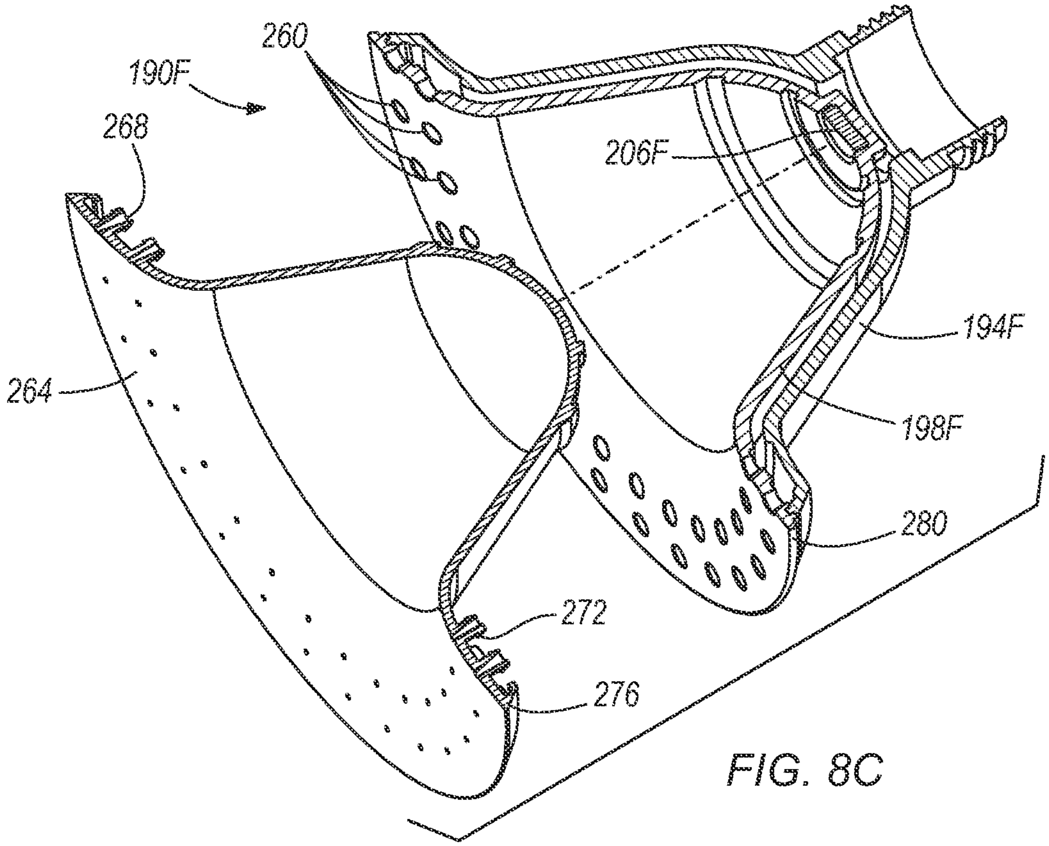
Figure 8D:
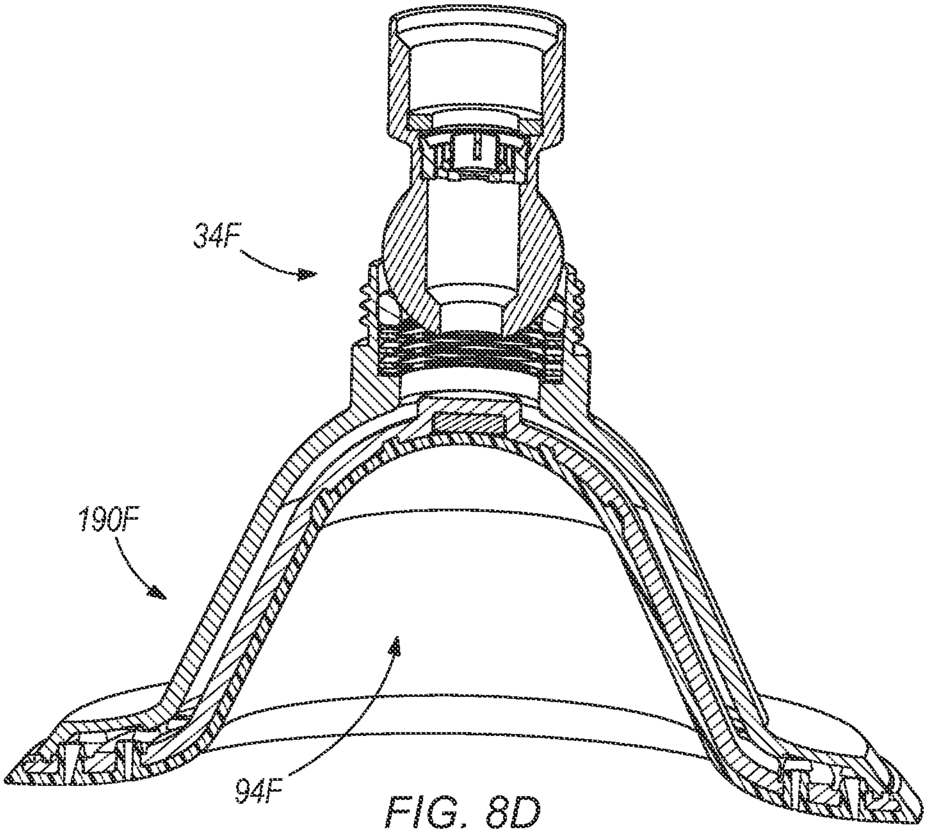
Figure 8E:
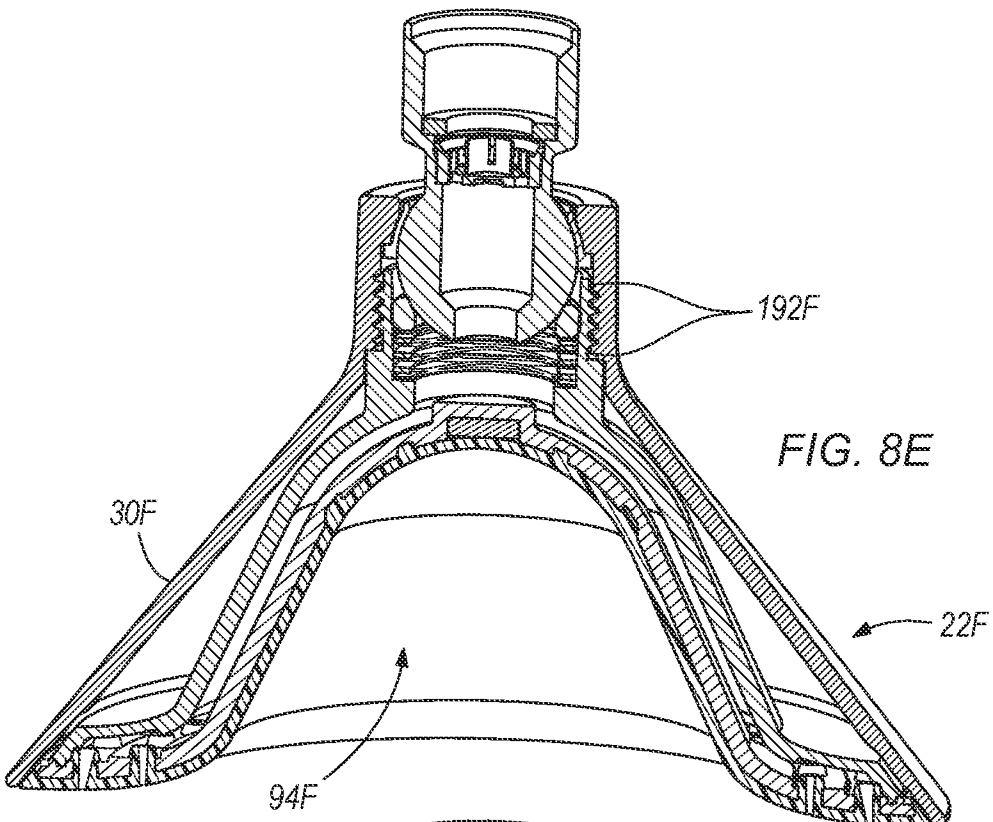
Figure 8F:
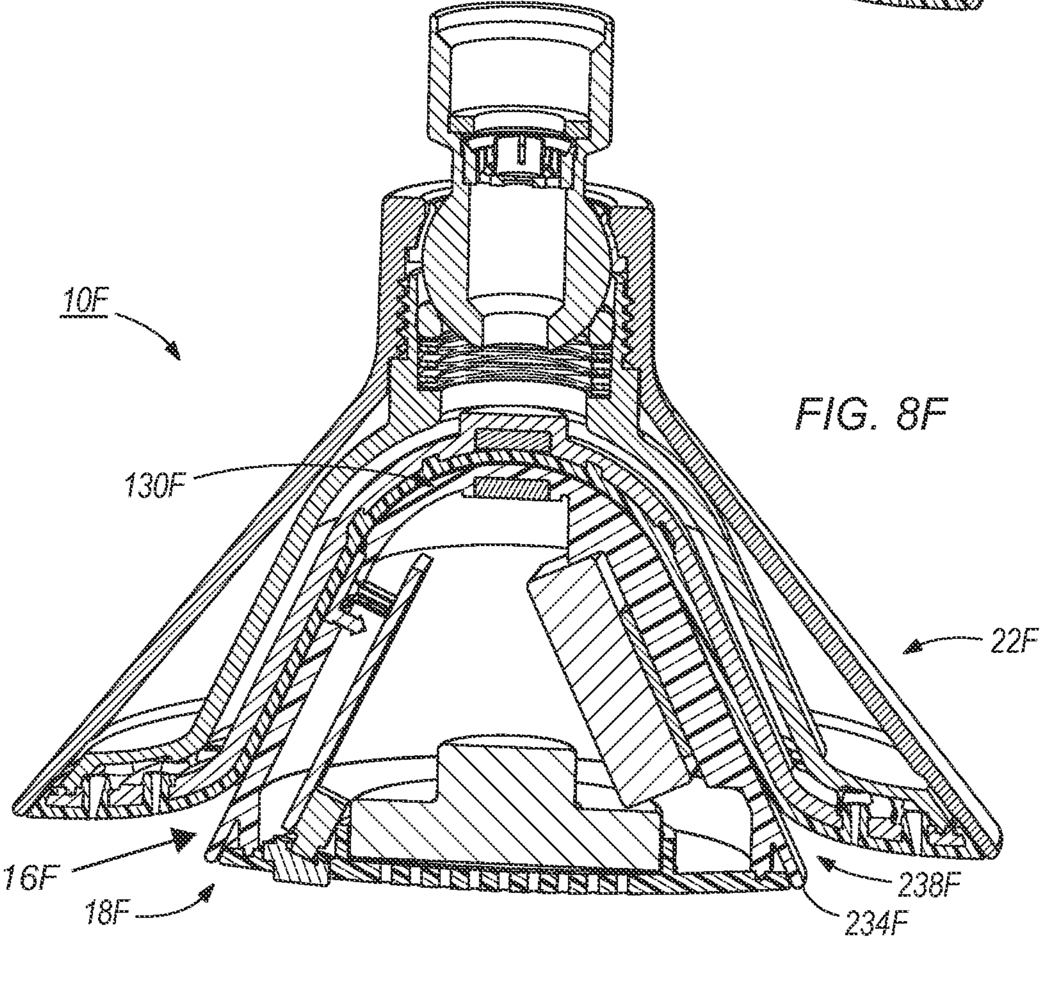

As shown in FIGS. 6C-6D and 8F (and in FIGS. 13-16), the second device 16F (e.g., the speaker 18F) projects from the showerhead 22F so that the second device plane 126F is positioned forwardly of the face plane 90F. In other constructions (see FIGS. 17-18), the planes 126, 90 are generally aligned. In still other constructions (see, for example, FIGS. 1-5 and 19), the second device plane 126 is recessed from faceplate plane 90. With a speaker 18F or other second device capable of outputting sound, acoustic analysis of the shower assembly 10 indicates that the "best" sound production is achieved without any geometry of the showerhead 22F (e.g., the flared surface 86 of the face plate 58) applied to the sound outputting device, in other words, with the second device plane 126 aligned with or positioned forwardly of the shower outlet plane 90.

Even with a forward position of the second device 16 relative to the faceplate plane 90, the orientation of the nozzle axes 274 in a direction away from the second device 16F inhibits water from contacting and potentially damaging or adversely affecting operation of the second device 16F. The nozzles 268 are positioned about the periphery of the housing 106F but are oriented to direct water flow outside of the periphery of the second device 16F. However, in constructions of the second device 16 in which water facilitates operation of the second device 16 (e.g., in some constructions of a material dispenser), nozzles 268 may instead be oriented toward the second device 16.

As shown in FIGS. 6C-6E and 8E-8F, the illustrated showerhead housing 30F is generally conical. In other constructions, the showerhead 22 may have a different shape with the outer housing 30 being, for example, cup-shaped, semi-spherical (see FIGS. 13 and 19), bell-shaped (see FIGS. 14-15), cylindrical (see FIGS. 16-18), etc. In the alternative constructions, the internal components (e.g., the waterway assembly 190F) are common between the constructions with only the different-shaped outer housing 30 being changed/substituted. With alternative outer housings 30, the appearance of the showerhead 22 may thus be easily changed by the manufacturer, distributor or end user. In still further alternative constructions, the outer housing 30 may be common between the constructions, and the internal components (e.g., the waterway assembly 190F) may be changed/substituted.

As shown in FIGS. 6D-6E, 11A-11B, 11D-11E and 11G, the illustrated second device 16F is also generally conical. In other constructions, the second device 16 may have a different shape, such as, for example, bell-shaped (see FIGS. 13-16), cylindrical (see FIGS. 17-18), etc. The receptacle 94 has a shape which is complementary to the shape of the second device 16 (e.g., a generally conical receptacle 94F, shown in FIG. 6D, for receiving a generally conical second device 16F). The receptacle 94 and the second device 16 preferably have symmetry about the output axis 118 of the second device 16 such that the second device 16 can be supported in the receptacle 94F in a plurality of rotational orientations.

The illustrated connecting structure 130F provides a magnetic docking arrangement. In the illustrated construction, the showerhead 22F and the second device 16F include cooperating magnets 206F, 226F to releasably retain the second device 16F on the showerhead 22F. In other constructions (not shown), rather than a magnet, one of the showerhead 22F and the second device 16F may include another type of magnetic element (e.g., an element formed of a ferromagnetic material, etc.) which is attracted to the remaining magnet. In still other constructions (not shown), the magnet(s) 206F, 226F may be positioned in a different location on the showerhead 22F and/or on the second device 16F.

The second device 16F is arranged to provide a grip surface (the rim 234F) so that a user can overcome the force of the connecting structure 130F to remove the second device 16F from the showerhead 22F. A space 238F is provided between the rim 234F and the waterway assembly 190F to enable user to grasp the second device housing 106F. In the illustrated construction (see FIG. 6D), the space 238F is an axial space because the second device 16F projects from the showerhead 22F.

In constructions in which the second device 16 is aligned with or recessed into the showerhead 22, an annular space may be provided so that the rim 234 may be gripped. Still other arrangements may be provided to allow access to the second device 16. For example (see FIGS. 17A-17E), a recess or opening 242 is provided on the showerhead 22 to allow access to rim 234 of the second device 16. In other constructions, portions of the second device housing 106 may extend beyond the waterway assembly 190. For example, as shown in FIGS. 18A-18E, wings 246 on the second device 16 project to the radial edge of showerhead 22. In other constructions (not shown), the second device 16 may include a material (e.g., elastomeric) and/or shape(s) (e.g., scallop shape) providing an improved grip surface.

The pattern of the showerhead outlets 66 and of the face of the second device 16 (e.g., the speaker 18) may be coordinated. In the illustrated construction (see FIGS. 6A-6B), the outlets 66F are arranged in a generally uniform two-hole pattern for universal nesting of the second device 16F (e.g., the speaker 18F) in the showerhead 22F.

As shown in FIGS. 13A-13D, the assembly 10 may include a light source 254 which emits light from the receptacle 94 around the second device 16. In the construction shown in FIGS. 13A-13D, the light source 254 is supported on the housing 106 and reflects out of the receptacle 94. In other constructions (see FIG. 10F), the second device 16 may itself be a light source (e.g., having one or more LEDs) with light being output from the face 212.

FIGS. 8A-8F illustrate an exemplary process of assembling the shower assembly 10F. As shown in FIG. 8A, the waterway members 194F, 198F are connected, for example, by welding (ultrasonic), adhesive, etc. The magnet 206F (see FIG. 8B) is positioned in the recess 292 and connected to the inner waterway member 198F, for example, by adhesive (epoxy), press-fit, welding, etc. The nozzle member 264 is assembled to the inner waterway member 198F (see FIG. 8C), with each nozzle 268 being inserted into an associated opening 260, the barbs 272 engaging the inner waterway member 198F and the edge 276 being wrapped around the edge 280 of the inner waterway member 198F.

The components of the ball joint 34F are connected to the waterway assembly 190F (see FIG. 8D), and a selected showerhead housing 30F (e.g., a conical housing 30F) is threaded on (see FIG. 8E), completing assembly of the showerhead 22F. As shown in FIG. 8F, the second device 16F (a speaker 18F) is inserted into the receptacle 94F and connected to the showerhead 22F by the connecting structure 130F (e.g., the magnets 206F, 226F).

Thus, the invention may generally provide an assembly of a shower device and a second device, such as a speaker, a light source, etc. The shower device may include a waterway which is diverted around the second device. The second device may be removable from the shower device. The shower device and the second device may be part of a modular system in which the second device is used with more than one different shower device or other support device. The second device may project from or be aligned with the surface of the face plate of the shower device. The second device may be recessed from the surface of the face plate of the shower device, and, if the second device outputs sound, the second device may output sound through a flared surface of the shower device and into an envelope of water.

One or more independent features and independent advantages of the invention may be set forth in the following claims.

What is claimed is:

1. A shower assembly comprising:

a housing defining an annular housing portion defining an annular waterway within the annular housing portion through which water flows, the annular waterway extending about an axis and from an inlet to an outlet; and a non-annular housing portion defining a passage including a non-annular portion upstream of the inlet of the annular waterway;

wherein the annular housing portion defines an open area with an open first end proximate the outlet and an open second end spaced along the axis from the first end, the open second end of the open area being open to the exterior of the housing, and wherein at least the non-annular portion of the passage extends in a direction generally parallel with the axis.

2. The assembly of claim 1, wherein the open area provides a receptacle, and wherein the assembly further comprises a second device removably supported in the receptacle.

3. The assembly of claim 2, wherein the housing includes a wall extending about the receptacle, and wherein the second device includes a device housing engageable with the wall.

4. The assembly of claim 2, wherein the second device includes one of an entertainment device, a light source, a time keeping device, and a dispenser.

5. The assembly of claim 4, wherein the second device includes a speaker, the speaker including a speaker housing, speaker components operable to output audio, and a power source operable to power the speaker components.

6. The assembly of claim 2, wherein the second device is inserted into the receptacle through the first end and extends through the second end beyond the annular waterway.

7. The assembly of claim 2, wherein the second device includes a device housing defining a device axis, the device housing having a first portion with a first dimension transverse to the device axis and a second portion having a second dimension transverse to the device axis, the second dimension being less than the first dimension, the second portion being inserted through the second end beyond the annular waterway.

8. The assembly of claim 2, further comprising a connection between the housing and the second device operable to releasably connect the second device to the housing.

9. The assembly of claim 8, wherein the connection includes a first magnet supported by the housing a second magnet supported by the second device and interacting with the first magnet to releasably connect the second device to the housing.

10. A shower assembly comprising:

a housing through which water flows from a housing inlet to a housing outlet, the housing at least partially defining an annular waterway within the housing through which the water flows from a waterway inlet to a waterway outlet, the annular waterway being laterally enclosed by the housing along a length of the annular waterway from the waterway inlet to the waterway outlet, the waterway outlet being coincident with the housing outlet; and a receptacle with an open first end aligned with the housing outlet and an open second end spaced apart from the open first end, the open second end of the receptacle being open to the exterior of the housing; and a second device removably supported in the receptacle, wherein the housing narrows upstream of the annular waterway.

11. A shower assembly comprising:

a housing through which water flows from a housing inlet to a housing outlet, the housing at least partially defining an annular waterway within the housing through which the water flows from a waterway inlet to a waterway outlet, the annular waterway being laterally enclosed by the housing along a length of the annular waterway from the waterway inlet to the waterway outlet, the waterway outlet being coincident with the housing outlet; and a receptacle with an open first end aligned with the housing outlet and an open second end spaced apart from the open first end, the open second end of the receptacle being open to the exterior of the housing; and a second device removably supported in the receptacle, wherein the housing includes a wall extending about the receptacle, and wherein the second device includes a device housing engageable with the wall.

12. The assembly of claim 10, wherein the second device includes one of an entertainment device, a light source, a time keeping device, and a dispenser.

13. The assembly of claim 12, wherein the second device includes a speaker, the speaker including a speaker housing, speaker components operable to output audio, and a power source operable to power the speaker components.

14. The assembly of claim 10, wherein the second device is inserted into the receptacle through the first end and extends through the second end beyond the annular waterway.

15. A shower assembly comprising:

a housing through which water flows from a housing inlet to a housing outlet, the housing at least partially defining an annular waterway within the housing through which the water flows from a waterway inlet to a waterway outlet, the annular waterway being laterally enclosed by the housing along a length of the annular waterway from the waterway inlet to the waterway outlet, the waterway outlet being coincident with the housing outlet; and a receptacle with an open first end aligned with the housing outlet and an open second end spaced apart from the open first end, the open second end of the receptacle being open to the exterior of the housing; and a second device removably supported in the receptacle, wherein the second device includes a device housing defining a device axis, the device housing having a first portion with a first dimension transverse to the device axis and a second portion having a second dimension transverse to the device axis, the second dimension being less than the first dimension, the second portion being inserted through the second end beyond the annular waterway.

16. The assembly of claim 10, further comprising a connection between the housing and the second device operable to releasably connect the second device to the housing.

17. The assembly of claim 16, wherein the connection includes a magnet supported by one of the housing and the second device and interacting with the other of the housing and the second device to releasably connect the second device to the housing.

18. The assembly of claim 17, wherein the magnet is a first magnet supported by the housing, and wherein the connection includes a second magnet supported by the second device.

19. A shower assembly comprising:

a housing through which water flows from a housing inlet to a housing outlet, the housing including a wall defining a housing surface, the housing surface defining a discrete circular receptacle having an open first end and an open second end spaced apart from the open first end, and a discrete annular waterway within the housing, through which water flows from a waterway inlet to a waterway outlet, the discrete annular waterway being laterally enclosed by the housing along a length of the annular waterway from the waterway inlet to the waterway outlet, the waterway outlet being coincident with the housing outlet and aligned with the housing outlet and the open first end of the circular receptacle, and the inlet being proximate the open second end of the circular receptacle, the open second end being open to the exterior of the housing; and a second device defining an outer surface and being removably supported in the circular receptacle, the second device being insertable into the circular receptacle through the open first end and extending through the open second end beyond the annular waterway, the second device including one of an entertainment device, a light source, a time keeping device, and a dispenser, wherein the wall separates the discrete annular waterway from the discrete circular receptacle.

20. The assembly of claim 1, wherein the axis is a central axis of the annular waterway.

21. The assembly of claim 1, wherein the portion of the passage extends along a passage axis offset from the axis.

22. The assembly of claim 1, wherein the portion of the passage extends in a passage direction parallel with the axis.

23. The assembly of claim 11, wherein the device housing is separated from the annular waterway by the wall.

24. The assembly of claim 19, wherein when the second device is supported in the circular receptacle, the annular waterway is separated from the outer surface of the second device by the housing surface.

* * * * *